United States Patent
Raymont et al.

(10) Patent No.: US 11,807,549 B2
(45) Date of Patent: **\*Nov. 7, 2023**

(54) MOBILE PROCESSING SYSTEM FOR HAZARDOUS AND RADIOACTIVE ISOTOPE REMOVAL

(71) Applicant: Veolia Nuclear Solutions, Inc., Westminster, CO (US)

(72) Inventors: John Raymont, New Port Beach, CA (US); James Fredrickson, Irvine, CA (US); Joshua Leighton Mertz, West Richland, WA (US); David Carlson, Knoxville, TN (US); Mark Denton, Oak Ridge, TN (US); Gary Hofferber, Richland, WA (US); Ja-Kael Luey, Kennewick, WA (US); Zechariah James Fitzgerald, Kennewick, WA (US); Ronald Merritt Orme, West Richland, WA (US); Eric Vincent Penland, Benton City, WA (US)

(73) Assignee: Veolia Nuclear Solutions, Inc., Lafayette, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/534,764

(22) Filed: Aug. 7, 2019

(65) Prior Publication Data
US 2020/0002209 A1    Jan. 2, 2020

Related U.S. Application Data

(60) Continuation of application No. 15/950,519, filed on Apr. 11, 2018, now Pat. No. 10,689,281, which is a
(Continued)

(51) Int. Cl.
*C02F 9/00*    (2023.01)
*C02F 1/00*    (2023.01)
(Continued)

(52) U.S. Cl.
CPC ............... *C02F 9/00* (2013.01); *C02F 1/001* (2013.01); *C02F 1/008* (2013.01); *C02F 1/28* (2013.01);
(Continued)

(58) Field of Classification Search
CPC .... C02F 9/00; C02F 1/008; C02F 1/28; C02F 1/001; C02F 2209/005; C02F 2209/05;
(Continued)

(56) References Cited

U.S. PATENT DOCUMENTS 3,407,571 A    10/1968 Sherwood
3,865,688 A    2/1975 Kleimola
(Continued)

FOREIGN PATENT DOCUMENTS

CN    101229949 A    7/2008
CN    101229949 A    7/2008
(Continued)

OTHER PUBLICATIONS

Machine Translation of JP2012-0247212A (Masuo) Dec. 2012. Retrieved on Mar. 20, 2012 from <https://www.j-platpat.inpit.go.jp/>. (Year: 2012).*
(Continued)

*Primary Examiner* — Magali P Slawski
*Assistant Examiner* — Bernadette Karen McGann
(74) *Attorney, Agent, or Firm* — FisherBroyles, LLP

(57) ABSTRACT

A mobile processing system is disclosed for the removal of radioactive contaminants from nuclear process waste water. The system is fully scalable, modular, and portable allowing the system to be fully customizable according the site-specific remediation requirements. It is designed to be both transported and operated from standard sized intermodal containers or custom designed enclosures for increased mobility between sites and on-site, further increasing the
(Continued)

speed and ease with which the system may be deployed. Additionally, the system is completely modular wherein the various different modules perform different forms or stages of waste water remediation and may be connected in parallel and/or in series. Depending on the needs of the particular site, one or more different processes may be used. In some embodiments, one or more of the same modules may be used in the same operation.

23 Claims, 28 Drawing Sheets

Related U.S. Application Data division of application No. 14/748,535, filed on Jun. 24, 2015, now Pat. No. 9,981,868.

(60) Provisional application No. 62/016,517, filed on Jun. 24, 2014.

(51) Int. Cl.
| G21F 9/04 | (2006.01) |
| G21F 9/12 | (2006.01) |
| C02F 9/20 | (2023.01) |
| C02F 1/28 | (2023.01) |
| C02F 101/00 | (2006.01) |
| C02F 1/42 | (2023.01) |
| C02F 1/44 | (2023.01) |

(52) U.S. Cl.
CPC .............. *C02F 9/20* (2023.01); *G21F 9/04* (2013.01); *G21F 9/12* (2013.01); *B01D 2311/25* (2013.01); *B01D 2311/251* (2022.08); *C02F 1/281* (2013.01); *C02F 1/42* (2013.01); *C02F 1/441* (2013.01); *C02F 1/444* (2013.01); *C02F 2101/006* (2013.01); *C02F 2201/005* (2013.01); *C02F 2201/007* (2013.01); *C02F 2201/008* (2013.01); *C02F 2209/001* (2013.01); *C02F 2209/003* (2013.01); *C02F 2209/005* (2013.01); *C02F 2209/05* (2013.01); *C02F 2209/40* (2013.01); *C02F 2301/046* (2013.01); *C02F 2301/08* (2013.01); *Y02E 30/00* (2013.01); *Y02E 30/30* (2013.01); *Y02W 10/37* (2015.05)

(58) Field of Classification Search
CPC ............ C02F 2201/005; C02F 2301/08; C02F 1/281; C02F 1/441; C02F 2201/007; C02F 2209/40; C02F 1/42; C02F 1/444; C02F 2201/008; C02F 2209/001; C02F 2209/003; C02F 2101/006; G21F 9/04; G21F 9/12; Y02W 10/37
See application file for complete search history.

(56) References Cited

U.S. PATENT DOCUMENTS

| 4,190,515 | A |   | 2/1980 | Butler et al. | |
| 4,383,920 | A |   | 5/1983 | Muller et al. | |
| 4,494,965 | A |   | 1/1985 | Ali-Khan et al. | |
| 5,080,693 | A |   | 1/1992 | Bourne et al. | |
| 5,171,519 | A | * | 12/1992 | Corpora | G21D 1/02 |
|   |   |   |   |   | 376/310 |
| 5,366,634 | A |   | 11/1994 | Vijayan et al. | |
| 5,645,518 | A |   | 7/1997 | Wagh et al. | |
| 5,972,216 | A |   | 10/1999 | Acernese et al. | |
| 5,987,910 | A | * | 11/1999 | Kothe | B65D 90/06 |
|   |   |   |   |   | 62/239 |
| 5,994,608 | A |   | 11/1999 | Pal et al. | |
| 6,131,605 | A | * | 10/2000 | Kothe | F16K 15/042 |
|   |   |   |   |   | 137/433 |
| 6,332,914 | B1 |   | 12/2001 | Lee | |
| 6,348,153 | B1 |   | 2/2002 | Patterson et al. | |
| 6,977,038 | B2 |   | 12/2005 | Jowett | |
| 8,148,594 | B2 |   | 4/2012 | Denton et al. | |
| 9,365,911 | B2 |   | 6/2016 | Denton | |
| 9,714,457 | B2 |   | 7/2017 | Denton et al. | |
| 10,940,437 | B2 | * | 3/2021 | Denton | B01D 59/12 |
| 2002/0141916 | A1 |   | 10/2002 | Graham | |
| 2002/0153324 | A1 |   | 10/2002 | Lynch | |
| 2005/0139530 | A1 |   | 6/2005 | Heiss | |
| 2005/0218077 | A1 |   | 10/2005 | Brunsell et al. | |
| 2009/0050572 | A1 |   | 2/2009 | McGuire et al. | |
| 2011/0224473 | A1 |   | 9/2011 | Denton | |
| 2011/0224474 | A1 |   | 9/2011 | Denton | |
| 2011/0243834 | A1 |   | 10/2011 | Denton | |
| 2012/0285894 | A1 | * | 11/2012 | Smiddy | C02F 1/686 |
|   |   |   |   |   | 210/723 |
| 2013/0153473 | A1 | * | 6/2013 | Brunsell et al. | C02F 9/00 |
|   |   |   |   |   | 210/194 |
| 2013/0199918 | A1 |   | 8/2013 | Jones et al. | |
| 2013/0264273 | A1 |   | 10/2013 | Denton | |
| 2013/0313191 | A1 | * | 11/2013 | Wolf | C02F 9/00 |
|   |   |   |   |   | 210/638 |
| 2013/0336870 | A1 |   | 12/2013 | Denton et al. | |
| 2014/0091041 | A1 |   | 4/2014 | Nielsen | |
| 2014/0263008 | A1 |   | 9/2014 | Barker et al. | |
| 2014/0263073 | A1 | * | 9/2014 | Barker et al. | B01J 47/022 |
|   |   |   |   |   | 210/660 |
| 2015/0166385 | A1 |   | 6/2015 | Boerm et al. | |
| 2015/0368136 | A1 |   | 12/2015 | Raymont et al. | |
| 2015/0380117 | A1 |   | 12/2015 | Brunsell et al. | |
| 2016/0310898 | A1 |   | 10/2016 | Denton et al. | |
| 2016/0314865 | A1 |   | 10/2016 | Mertz et al. | |

FOREIGN PATENT DOCUMENTS

| CN |   | 101229949 | B | * | 9/2011 |   |   |
| EP |   | 0173484 | A2 |   | 8/1985 |   |   |
| EP |   | 1736439 | A2 |   | 12/2006 |   |   |
| JP |   | 2004-045371 | A |   | 2/2004 |   |   |
| JP |   | 2004-233307 | A |   | 8/2004 |   |   |
| JP |   | 2008-026023 | A |   | 2/2008 |   |   |
| JP |   | 2008-076054 | A |   | 4/2008 |   |   |
| JP |   | 2012-247212 | A |   | 12/2012 |   |   |
| JP |   | 2013-253856 | A |   | 12/2013 |   |   |
| WO |   | WO-2004035489 | A1 | * | 4/2004 |   | B01J 47/002 |
| WO |   | WO2008064249 | A2 |   | 5/2008 |   |   |
| WO |   | WO-2012038902 | A1 | * | 3/2012 |   | B01D 61/025 |
| WO |   | WO2013085644 | A1 |   | 6/2013 |   |   |
| WO |   | WO2014172360 | A |   | 10/2014 |   |   |

OTHER PUBLICATIONS

Machine generated translation of CN 101229949 B (Year: 2011).*
European Patent Office Extended Search Report for Application No. 19178396.8 dated Aug. 22, 2019 (12 pages).
Drake, Robert H., "Recovery of Tritium from Tritiated Waste Water Cost-Effectiveness Analysis," Jun. 1996 <http://www.fas.org/spg/othergov/doe/lan/llb-www/la-pubs/000326809.pdf>, 12 pages.
Huang et al., "Hydrophobic platinum-polytetrafluoroethylene catalyst for hydrogen isotope separation," International Journal of Hydrogen Energy, 2010, vol. 25, pp. 6108-6112, Abstract, Fig. 4, Fig. 5.
Iaea, "Management of Waste Containing Tritium and Carbon-14," Technical Reports Series No. 421, <http://www-pub.iaea.org/MTCD/publications/PDF/TRS421_web.pdf>, Jun. 1996 on Jul. 2011, 120 pages.
Ionita, G. et al, "An assessment on hydrogen isotopes separation by liquid phase catalytic exchange process," Journal of Radioanalytical and Nuclear chemistry, Jul. 2015, vol. 305, Issue 1, pp. 117-126, Apr. 28, 2015 (Apr. 8, 2015), pp. 117-126, XP055335410.
U.S. Department of Energy, Small Column Ion Exchange Technology at Savannah River Site, Nov. 2011, retrieved from the Internet

(56) References Cited

OTHER PUBLICATIONS on Jul. 18, 2017 <https://energy.gov/sites/prod/files/em/SCIXTRAFinancialReportNov2011.pdf> 112 pages.
European Patent Office Search Report for Application No. 15810926.4 dated Mar. 23, 2018 (10 pages).
Japanese Patent Office Action for Application No. 2016-575122 dated May 14, 2019 (12 pages, English translation included).
International Search Report and Written Opinion for Application No. PCT/US2015/037401 dated Sep. 23, 2015 (5 pages).
Mobile contaminated water treatment system SARRY-Aqua ®, IHI Corporation, Feb. 17, 2013 (16 pp.).
U.S. Appl. No. 16/534,764, filed Aug. 7, 2019, Veolia Nuclear Solutions, Inc., Mobile Processing System for Hazardous and Radioactive Isotope Removal.
U.S. Pat. No. 10,689,281 U.S. Appl. No. 15/950,519, Oct. 18, 2018 filed Apr. 11, 2018, Kurion, Inc., Mobile Processing System for Hazardous and Radioactive Isotope Removal.
U.S. Pat. No. 9,981,868 U.S. Appl. No. 14/748,535, Dec. 24, 2015 filed Jun. 24, 2015, Kurion, Inc., Mobile Processing System for Hazardous and Radioactive Isotope Removal.
Communication from corresponding EP Pat. App. 19178396.8, dated Jul. 2, 2020 (4 pp.).
Decision Refusing Application from corresponding EP Pat. App. 19178396.8, Oct. 14, 2021 (7 pp.).
European Search Report from corresponding EP Pat. App. 21214105.5, dated Mar. 15, 2022 (7 pp.).
Mobile Type Treatment of Radioactively Contaminated Water on a Business Trip!, IHI Corporation, IHI Technical Report, vol. 53, No. 1, 2013 (8 pp.).
Notice of Reasons for Refusal from corresponding JP Pat. App. 2016-575122, dated Apr. 14, 2020 (4 pp.).
Notice of Reasons for Refusal from corresponding JP Pat. App. 2020-204456, dated Oct. 26, 2021 (4 pp.).
Summons to Attend Oral Proceedings from corresponding EP Pat. App. 19178396.8, Apr. 23, 2021 (6 pp.).
U.S. Appl. No. 17/662,219, filed May 5, 2022, Mobile Processing System for Hazardous and Radioactive Isotope Removal.
About Mobile Strontium Removal Equipment, Tokyo Electric Power Company, Inc., Feb. 27, 2014 (7 pp.).
Mobile Type Treatment of Radioactively Contaminated Water on a Business Trip!, IHI Technical Report, vol. 53 No. 1, pp. 4-7, Jan. 4, 2013 (8 pp.).
Notice of Reasons for Refusal from counterpart JP Pat. App. 2020-204456, dated May 24, 2022 (3 pp.).
Examiner's Requisition from counterpart CA Pat. App. 3,148,050, dated Feb. 10, 2023 (6 pp.).
IAEA, "Mobile Processing Systems for Radioactive Waste Management," available online at https://www.iaea.org/publications/10438/mobile-processing-systems-for-radioactive-waste-management, May 14, 2014 (119 pp.).
U.S. Appl. No. 17/662,219, 2022/0289609, filed May 5, 2022, Mobile Processing System for Hazardous and Radioactive Isotope Removal.
U.S. Appl. No. 16/534,764, 2020/0002209, filed Aug. 7, 2019, Mobile Processing System for Hazardous and Radioactive Isotope Removal.
U.S. Appl. No. 15/950,519, 2018/0297878, filed Apr. 11, 2018, Mobile Processing System for Hazardous and Radioactive Isotope Removal.
U.S. Appl. No. 14/748,535, 2015/0368136, filed Jun. 24, 2015, Mobile Processing System for Hazardous and Radioactive Isotope Removal.
Examiner's Requisition from counterpart CA Pat. App. 3,148,050, dated Sep. 11, 2023 (5 pp.).
U.S. EPR Final Saftey Analysis Report, AREVA Application Public, Rev 3—Chapter 11, Section 11.2, Waste Management System, Mar. 22, 2012 (63 pp.)

\* cited by examiner

PIPING/EQUIPMENT:

- BALL VALVE
- GATE VALVE
- BUTTERFLY VALVE
- GAUGE VALVE
- CHECK VALVE
- MAGNETIC FLOW METER
- FILTER
- VARIABLE FREQUENCY DRIVE
- DIAPHRAGM
- SAMPLE PORT
- MOTOR
- PRESSURE OR VACUUM RELIEF
- MECHANICAL VIBRATOR
- SOLIDS FEEDER
- IN-LINE SILENCER
- BASKET STRAINER
- HOSE CONNECTION
- PIPE CAP
- PIPE FLANGE
- QUICK CONNECT
- DRY DISCONNECT
- RUPTURE DISC
- HOPPER
- ROTARY VALVE
- EDUCTOR
- SURGE SUPPRESSOR
- CENTRIFUGAL PUMP
- POSITIVE DISPLACEMENT BLOWER
- SAMPLER VALVE ASSY

LINES:

- PRIMARY PIPING
- INSTRUMENTATION OR OTHER PIPING
- TANKS/PITS/BUILDINGS
- ELECTRICAL POWER OR SIGNAL
- SKID BOUNDARY
- DATA LINK
- FLEX HOSE

ABBREVIATIONS:

| | |
|---|---|
| AG | AGITATOR |
| B | POSITIVE DISPLACEMENT BLOWER |
| CV | CHECK VALVE |
| DN | DRAIN |
| DR | AIR DRYER/DEHUMIDIFIER |
| DV | DISCONNECT VALVE |
| ED | EDUCTOR |
| FAI | FAIL AS-IS |
| FC | FAIL CLOSE |
| FDR | SOLIDS FEEDER |
| FH | FLEX HOSE |
| FLT | FILTER |
| FO | FAIL OPEN |
| GV | GAUGE VALVE |
| H | INTERCONNECTING HOSE |
| LC | LOCKED CLOSED |
| LO | LOCKED OPEN |
| MOV | MOTOR OPERATED VALVE |
| MVD | MANUAL VALVE DOUBLE |
| NC | NORMALLY CLOSED |
| NO | NORMALLY OPEN |
| P | PUMP |
| P&ID | PIPING AND INSTRUMENTATION DIAGRAM |
| PRV | PRESSURE RELIEF VALVE |
| PSE | PRESSURE SAFETY ELEMENT |
| RV | ROTARY VALVE |
| S | SAMPLE PORT |
| T | TANK |
| V | VALVE |
| VIB | MECHANICAL VIBRATOR |
| VSL | ION EXCHANGE VESSEL |

FIGURE CONTINUATIONS:

CONTROL & SOLIDS FEED SKID
140

SKID-2
SAMPLE ENCLOSURE

ABBREVIATIONS:

| | |
|---|---|
| AE | Analyzer Sensor |
| AI | Analyzer Indicator |
| AT | Analyzer Transmitter |
| CE | Conductivity Sensor |
| CI | Conductivity Indicator |
| CT | Conductivity Transmitter |
| FI | Flow Indicator |
| FIC | Flow Indicating Controller |
| FIT | Flow Indicating Transmitter |
| HI | Hand Indicator |
| LAH | Level Alarm High |
| LAL | Level Alarm Low |
| LDA | Leak Detection Alarm |
| LDT | Leak Detection Transmitter |
| LIC | Level Indicating Controller |
| LSH | Level Switch High |
| LSI | Level Switch Indicator |
| LSL | Level Switch Low |
| MI | Moisture Indicator |
| MIC | Moisture Indicating Controller |
| PDI | Pressure Differential Indicator |
| PDIT | Pressure Differential Indicating Transmitter |
| PI | Pressure Indicator |
| PIT | Pressure Indicating Transmitter |
| RDT | Radiation Detection Transmitter |
| RI | Radiation Indicator |
| SC | Speed Controller |
| TI | Temperature Indicator |
| TT | Temperature Transmitter |
| WT | Weight/Force Transmitter |
| YC | Event Controller |
| YI | Event Indicator |

INSTRUMENT INTERLOCKS:

- I1 — SHUT DOWN ALL PUMPS ON LEAK DETECTION
- I2 — PUMP SHUT DOWN ON HIGH LEVEL
- I3 — PUMP SHUT DOWN ON LOW LEVEL
- I4 — DE-ENERGIZE VALVE ON LEAK DETECTION

INSTRUMENT SYMBOLS:

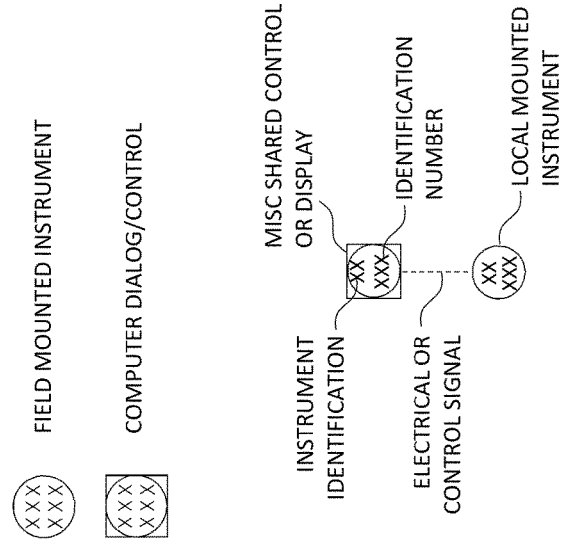

FIG. 18

SKID-5
CONTROL & SOLIDS FEED

TOP VIEW

TOP VIEW

SIDE VIEW

TOP VIEW

MOBILE PROCESSING SYSTEM FOR HAZARDOUS AND RADIOACTIVE ISOTOPE REMOVAL

CROSS-REFERENCE TO RELATED APPLICATIONS

The present application is a continuation of U.S. Ser. No. 15/950,519, filed Apr. 11, 2018, entitled: MOBILE PROCESSING SYSTEM FOR HAZARDOUS AND RADIOACTIVE ISOTOPE REMOVAL, which is a divisional of U.S. Ser. No. 14/748,535, filed Jun. 24, 2015, entitled: MOBILE PROCESSING SYSTEM FOR HAZARDOUS AND RADIOACTIVE ISOTOPE REMOVAL, which claims priority to U.S. Provisional Ser. No. 62/016,517, filed Jun. 24, 2014, entitled: MOBILE PROCESSING SYSTEM FOR HAZARDOUS AND RADIOACTIVE ISOTOPE REMOVAL, which are both herein incorporated by reference in their entireties.

The following related applications are expressly incorporated by reference in their entirety: U.S. application Ser. No. 13/850,890, filed Mar. 26, 2013 entitled SUBMERSIBLE FILTERS FOR USE IN SEPARATING RADIOACTIVE ISOTOPES FROM RADIOACTIVE WASTE MATERIALS, and provisional application 61/615,516, filed Mar. 26, 2012, to which Ser. No. 13/850,890 claims priority; U.S. application Ser. No. 13/850,908, filed Mar. 26, 2013 entitled SELECTIVE REGENERATION OF ISOTOPE-SPECIFIC MEDIA RESINS IN SYSTEMS FOR SEPARATION OF RADIOACTIVE ISOTOPES FROM LIQUID WASTE MATERIALS, which also claims the benefit of 61/615,516 previously listed above; U.S. application Ser. No. 13/863,206, filed Apr. 15, 2013 entitled ADVANCED TRITIUM SYSTEM FOR SEPARATION OF TRITIUM FROM RADIOACTIVE WASTES AND REACTOR WATER IN LIGHT WATER SYSTEMS, and provisional application 61/320,515, filed Apr. 2, 2010, and U.S. application Ser. No. 13/079,331, PATENT APPLICATION Provisional filed Apr. 4, 2011 entitled ADVANCED TRITIUM SYSTEM AND ADVANCED PERMEATION SYSTEM FOR SEPARATION OF TRITIUM FROM RADIOACTIVE WASTES AND REACTOR WATER both to which Ser. No. 13/863, 206 claims priority; and U.S. Provisional Application 62/016,517, filed Jun. 24, 2014 entitled MOBILE PROCESSING SYSTEM FOR HAZARDOUS AND RADIOACTIVE ISOTOPE REMOVAL, to which the present application also claims priority.

Applicant believes that some of the above-incorporated material constitutes "essential material" within the meaning of 37 CFR 1.57(c)(1)-(3), applicants have amended the specification to expressly recite the essential material that has been incorporated by reference as allowed by the applicable rules.

FIELD OF THE INVENTION

This invention relates generally to nuclear waste remediation, specifically a mobile processing system for the removal of radioactive contaminants from nuclear process waste water. The mobile system is fully scalable, able to accommodate massive-scope industrial nuclear waste water cleanup projects worldwide, and transportable on conventional national and international transportation infrastructure.

BACKGROUND

With a worldwide need for abundant and inexpensive energy production, nuclear generated power is increasing exponentially along with world population growth. The first commercial nuclear power stations started operation in June 1954. Since then, nuclear power generation has increased such that there are over 443 commercial nuclear power reactors operable in 31 countries, with over 375,000 MWe total capacity. Currently, as of 2015, there are about 66 more reactors under construction. Increased nuclear power production requires an increase in nuclear waste-water remediation.

With the present state of the art, nuclear waste water is typically containerized and stored indefinitely at specialized storage facilities. What is needed in the art is a mobile, modular, and scalable waste water treatment system designed to be both transported and operated from an intermodal shipping container for increased mobility, modularity, and scalability between sites and on-site, further increasing the speed, flexibility, and ease with which the system may be deployed. Additionally, a complete modular waste water treatment system is needed wherein various different modules for performing different forms of waste water remediation may be connected in parallel and/or in series in order to perform all of the waste water remediation requirements and process time requirements for any given site. It would also be advantageous for additional modules to be available for further processing of the contaminants removed from the water during the waste water remediation process(es) such that the contaminants do not need to be transported from the site for further processing prior to final disposition. An all-in-one mobile, modular, and scalable waste water remediation and contaminant post-processing system as described in this disclosure would be advantageous for providing a complete solution for any given site, reducing transportation of hazardous materials, reducing implementation costs, and diminishing overall complexity of standard existing practices.

Mobile water processing is well known in the art. However, most existing mobile water processing systems are comprised of merely one specific process, or multiple processes within a single transportable module. Sites requiring waste water remediation are diverse in their specific requirements, topography, and the location. Natural disaster, terrorist attacks, and malfunctions often require rapid deployment of aid to mitigate overall damage to the environment and adverse effect to people living in the region surrounding the site. Current water remediation systems are not sufficient to perform this task. What is needed is a highly mobile, easily transportable, scalable, modular system that can be deployed quickly (often within 24 hours depending on site location, topography, and remediation requirements) and cost-effectively. The system should be highly adaptable to differing remediation requirements, scalable to maximize efficiency, and modular to perform all remediation needs including outputting water within safety standards as well as processing the removed contaminants to final disposition standards.

So as to reduce the complexity and length of the Detailed Specification, and to fully establish the state of the art in certain areas of technology, Applicant(s) herein expressly incorporate(s) by reference all of the following publications identified below. Applicant(s) expressly reserve(s) the right to swear behind any of the incorporated materials.

KUR-5P12-SDD-001 "Kurion Mobile Processing System" (KMPS), System Level Design Description, formerly marked Kurion Confidential, Document Issued Feb. 9, 2014, filed Jun. 24, 2014 as U.S. Provisional Application 62/016, 517, which is herein incorporated by reference in its entirety.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

DESCRIPTION OF RELATED ART

In a discussion of prior art, CN. Patent No. 101229949 issued Sep. 7, 2011, titled MOBILE RADIOACTIVE LIQUID WASTE TREATMENT EQUIPMENT generally describes a movable treatment device for radioactive waste water, which comprises a protecting vehicle, a heat preservation cabin, a treatment system of waste water, a PLC controlling system and an external connecting pipeline, wherein, the treatment system of waste water consists of a liquid and solid separator, a pre-filter, an ultra-filter, a security filter, a reverse osmosis filter of two levels and a combined adsorption device; the PLC system consists of a PLC, a flow meter, a conductivity meter, a radioactivity detector and a pressure controlling device. The invention solves the contradiction between the low interception and adsorption efficiency of nuclide and small size under the condition of large flow, meanwhile, which solves the problems of integration of a plurality of techniques and protection of the movable treatment device of radioactive waste water and realizes automatic operation, safety and reliability in the overall process. What this patent does not disclose is a mobile treatment system designed to be both transported and operated from a standard sized intermodal container for increased mobility between sites and on-site, modularity in the ability to perform multiple different waste water remediation processes within separate modules, and system scalability of adding multiple process-specific modules for quicker system process times required for a given project.

In a discussion of prior art, U.S. Pat. No. 5,972,216 issued Oct. 26, 1999, titled PORTABLE MULTI-FUNCTIONAL MODULAR WATER FILTRATION UNIT generally describes a portable multi-functional modular water filtration unit having configurable modules that can be adapted to render environmental water potable or to isolate contaminants from groundwater or water from other sources such as backwash from reverse osmosis water purification units (ROWPU) or shower and laundry water ("gray water") such that the water may be recycled or discharged in full compliance with applicable laws. Plural treatment tanks as well as inlet and outlet filters may be coupled via pressure gauge bearing quick connect fittings in series and parallel arrangements, to allow changes of filter elements (for replacement or substitution of a different active material) and to accommodate flow in filtration arrays. The water purification system specifically addresses the changing water purifying needs that arise during troop deployment, training and maneuvers, disaster relief and environmental cleanup. What this patent does not disclose is a mobile treatment system designed to be both transported and operated from a standard sized intermodal container for increased mobility between sites and on-site, modularity in the ability to perform multiple different waste water remediation processes within separate modules, and system scalability of adding multiple process-specific modules for quicker system process times required for a given project.

In a discussion of prior art, U.S. patent application Ser. No. 14/041,474 filed Sep. 30, 2013, titled MOBILE WATER FILTRATION UNIT AND CONTROL SYSTEM, AND RELATED DEVICES, COMPONENTS, SYSTEMS AND METHODS generally describes a standardized, modular mobile water purification unit for the production of safe potable water and for treatment of wastewater is disclosed to fulfill the water need for humans, animals and households. In one embodiment, the unit can be based on a standardized climate-controlled container that is robust both physically and functionally, can be easily transported and quickly set up in remote regions and disaster areas. The unit may work for purification of water of brackish, sea or polluted surface water, and of wastewater, and can be customized to the given water type based on easy changeable treatment modules. The unit includes a rigid frame that can be removed from the container, and also includes a control system for remote monitoring and control of the unit. This application teaches away from operating a water treatment system from within an intermodal container.

BRIEF SUMMARY OF THE INVENTION

Although the best understanding of the present invention will be had from a thorough reading of the specification and claims presented below, this summary is provided in order to acquaint the reader with some of the new and useful features of the present invention. Of course, this summary is not intended to be a complete litany of all of the features of the present invention, nor is it intended in any way to limit the breadth of the claims, which are presented at the end of the description of this application.

The mobile processing system as disclosed is designed to be both transported and operated from standard sized intermodal containers or custom designed enclosures for increased mobility between sites and on-site, further increasing the speed and ease with which the system may be deployed. Additionally, the system is completely modular wherein the various different modules perform different forms of waste water remediation and may be connected in parallel and/or in series in order to perform all of the remediation requirements for any given site. A further advantage of the mobile processing system is the availability of additional modules for further processing of the contaminants removed from the water during the waste water remediation process(es) such that the contaminants do not need to be transported from the site for further processing prior to final disposition. An all-in-one mobile, modular waste water remediation and contaminant post-processing system is extremely advantageous for providing a complete solution for any given site, reducing transportation of hazardous materials, implementation costs, and overall complexity of standard existing practices.

The mobile processing system encompasses multiple forms of waste water processing. Depending on the needs of the particular site, one or more different processes may be used. In some embodiments, one or more of the same modules may be used in the same operation. For instance, two or more separate ISM modules may be used in series wherein each module is operative to remove a specific isotope (radioisotope) from the waste stream. Another example is placing two of the same module in parallel to handle an increased flow capacity or to bring one module online while another is brought offline for maintenance. For processes that take more time, such as feed/blend, it may be advantageous to place one or more modules in parallel to reduce overall processing time.

In an embodiment, systems and methods are disclosed for a Mobile Processing System (MPS) (alternatively referred to a mobile nuclear waste processing system) water treatment process to remove radioactive contaminants from nuclear process waste water and contaminated groundwater.

In an embodiment, systems and methods are disclosed for utilizing modified transportable intermodal containers (one example: ISO containers) or custom designed containers (hereinafter all enclosure containers are referred to as skids unless otherwise specified) which contain components of various sub-systems of the processing system. Skids may remain on, and be operated from the trailers that were used for transporting the system to the treatment site, or they may be offloaded and placed adjacent each other or stacked. An example of an intermodal container for use with the system is a modified ISO shipping container; however, other containers that comply with regulations for conventional intermodal freight transport may be used.

In an embodiment, systems and methods are disclosed where the skids can be connected in a variety of configurations to provide different operating modes or capacities as required to process a particular nuclear process waste water. As mentioned, each skid consists of an enclosed, modified intermodal container, which is further configured with a drip pan and leak detection. Process lines between skids may consist of hoses with double containment for the prevention of spills to the environment.

In an embodiment, a system and method is provided for in situ (on-site) removal of radioactive material from nuclear facility process water using a fully scalable, portable, and modular system. In general, the design of the system and method can prevent the radioactive material from leaking to the environment. Should the radioactive material be leaked from a train, dam installation, leak detector installation, or piping installed in or outside the reactor building, etc., the system will have a design that can prevent the radioactive material from diffusing, such as leak protection of the joints, etc. The design can prevent the retention of flammable gas, such as hydrogen gas, if such retention is a matter of concern. The process system is designed for ease of transfer from one site to another with flexibility for operating in different modes of filtration and ion removal.

In an embodiment, systems and methods are disclosed for modularity and scalability of the system. Skids (process-specific modules) may be added or removed allowing for a phased approach to site remediation. Quicker process times may be achieved by adding multiples of specific skids, depending on deadline requirements.

Aspects and applications of the invention presented here are described below in the attachments and description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for, and will also recite the word "function" (i.e., will state "means for performing the function of . . . ", without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 4 is a legend describing mechanical component symbols.

FIG. 18 is a legend describing instrumentation symbols.

Figure 1:
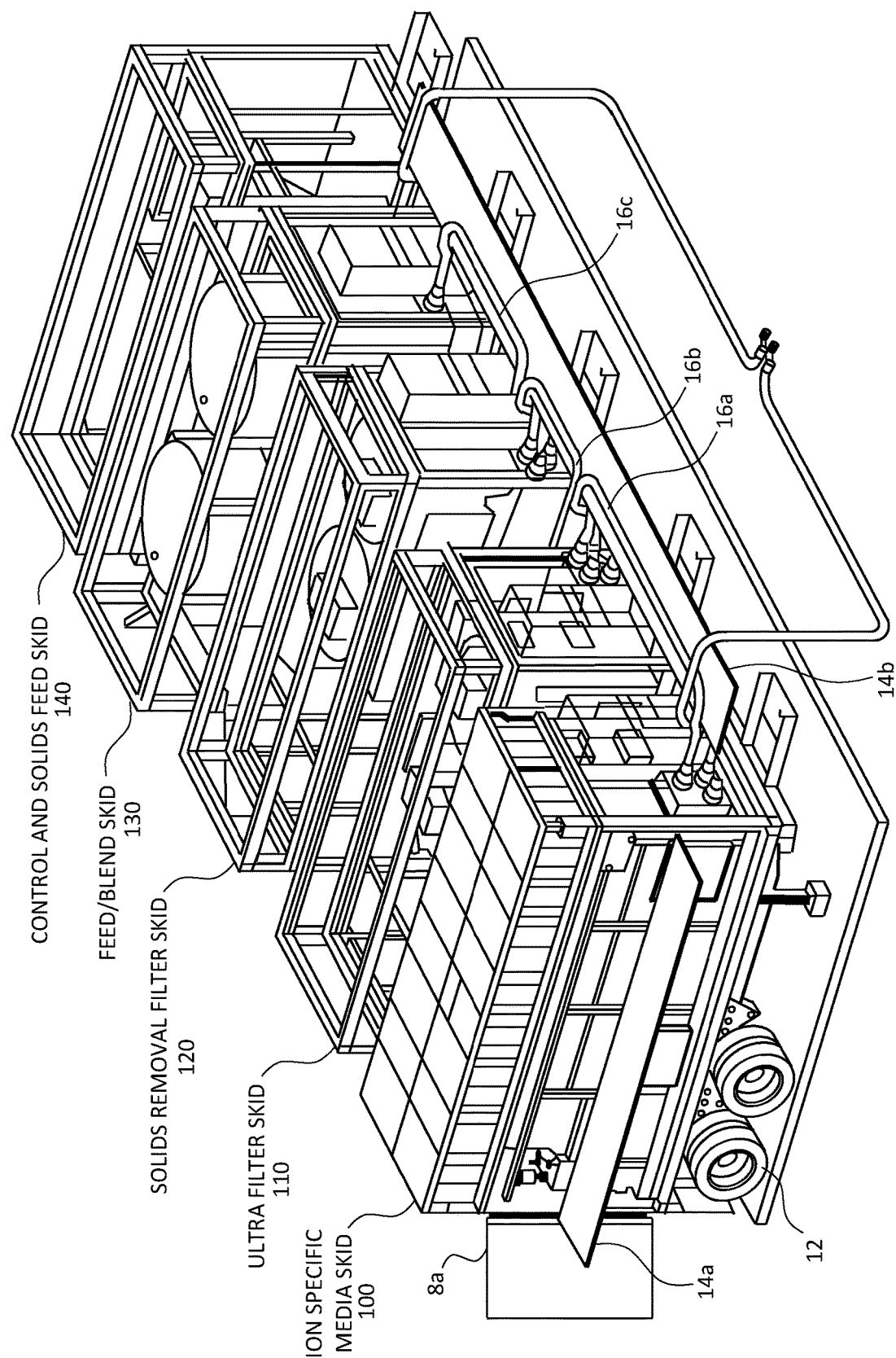
FIG. 1 is an isometric view of an example embodiment Mobile Processing System comprising five separate skids.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally in order to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the embodiments, references are made to the various embodiments in which the invention may be practiced. It is to be understood that other embodiments may be utilized and structural and functional changes may be made without departing from the scope of the invention.

System Overview

As previously discussed, the MPS equipment is contained in intermodal containers or skids. Example containers are ISO shipping containers, which are widely used standardized containers that can be quickly and easily transported to sites around the world, as needed, on existing infrastructure including truck, rail, ship, plane, and other conventional industrial transportation mediums. Additionally, custom designed enclosures may be used. For purposes of this disclosure, the MPS container(s) is (are) hereinafter referred to as a skid or skids.

Each skid is modified or customized to hold the process equipment, allow for connection of interconnecting hoses, power and signal cables, and allow for removal of lids for filter and ISM vessels replacement. The skids may be operated while mounted on transport trailers. Elevated access platforms may be installed to allow disconnect of filters and ISM vessels for replacements, hydrogen venting, sampling, access to the control room, and placement of interconnecting hoses. Crane access will be required for routine operational replacement of solids removal filters, ultra filters, and ISM vessels (alternatively referred to as ion exchange vessels). Alternatively, openings in the sidewalls of skids, with or without doors, may be provided to afford forklift, or equivalent, access to filters and ISM vessels for the purpose of routine operational replacement. Additionally, these skids can be mounted on, and operated from, trailers on site to be easily moved around, or rearranged, as needed. If custom designed containers are used, the resulting skid may have integral wheels and towing fixtures, thereby not relying on transport trailers for mobility. In addition to integral wheels, a custom designed skid may include a built in transport-power-source and vehicle operating controls, i.e. a skid that is drivable under its own power for purposes of mobility to and around the site. In some embodiments, the system will be implemented as a permanent installation on the site.

Modularity

Modularity is a key aspect to effective, efficient, flexible, deployable remediation systems. Containing separate processes within separate modules allows for better remediation customization—allowing only the necessary processes to be brought on-site thus reducing shipping and process costs. At any time, processes may be added or removed allowing for a phased approach to site remediation. Mobile processing modules are simpler to transport, setup, and are more cost-efficient. Standard shipping sizes, such as intermodal containers, allow easy stacking for simple cost-effective transport. Modularity also allows for simpler setup, as processes may be set up in any configuration as required by the topography of the region, including stacking. Modularity also allows for easy skid replacement or simple phase out for skid maintenance. Each module is equipped with standard sized quick disconnects for quick and simple connection/disconnection between any skids in any configuration.

Scalability

Size of Module:

Scalability is another key aspect to effective, efficient, deployable remediation systems. Using scaled modules that are appropriate for the needs of a specific remediation site reduces costs of transport, setup, and operation. The modules in the depicted embodiment have been designed to fit in 6.1 m (20 ft) intermodal containers; however, other container sizes are possible.

Number of Modules in Operation:

Some waste remediation sites may have tighter process time requirements to meet deadlines. Sometimes, the scope of a given remediation project may be so massive that conventional configurations will not be capable of meeting the time constraints. In these situations, it would be beneficial to bring in additional modules. It may even be beneficial to bring in more than one complete system to be used in unison either entirely separately or in parallel to increase processing rates and meet remediation deadlines.

Another distinguishing aspect of the mobile processing system is that it can be used as a complete remediation solution. The mobile processing system isn't just for water remediation—it also includes the capability of processing the contaminants that are removed from the water during the remediation process. There are many technologies available for preparing the removed contaminants for final disposition that are described in detail in co-owned, co-pending patent applications which are described below and incorporated by reference herein in their entirety.

One such technology is vitrification. With vitrification, or glassification, frit is added to the contaminant or contaminant laden slurry that is output from the water remediation process, as disclosed in U.S. patent application Ser. No. 12/985,862 ('862), filed Jan. 6, 2011, entitled Microwave-Enhanced System for Pyrolysis and Vitrification of Radioactive Waste, which is hereby incorporated by reference in its entirety, and U.S. patent application Ser. No. 13/036,809 ('809), filed Feb. 28, 2011, entitled Advanced Microwave System for Treating Radioactive Waste, which is hereby incorporated by reference in its entirety.

Another technology for further processing of contaminants removed from waste water is volume reduction by separating ions from an ion exchange resin with an elution agent and running through an inorganic ISM column, as disclosed in U.S. patent application Ser. No. 13/850,908 ('908), filed Mar. 26, 2013, entitled Selective Regeneration of Isotope-Specific Media Resins in Systems for Separation of Radioactive Isotopes from Liquid Waste Materials, which is herein incorporated by reference in its entirety.

For purposes of the present disclosure, the systems and methods disclosed in the '862, '809, and '908 US Patent Applications could be included in one or more intermodal containers or skids as described, and used in combination with skids disclosed herein.

For the following discussions, normal operations are termed "Mode D" as identified in Table 1. In an embodiment, this mode has all five of the treatment skids installed and operational.

FIG. 1 is an isometric view of an embodiment of a Mobile Processing System (VIPS) comprising separate skids: a Control and Solids Feed skid 140, a Feed/Blend skid 130, a Solids Removal Filter skid 120, an Ultra Filter skid 110, and an Ion Specific Media (ISM) skid 100. The skids can include doors 8, wheels 12, access platforms 14a and 14b, and interconnecting hoses 16a, 16b, and 16c.

In an embodiment, the five skids depicted in FIG. 1 can be arranged in five different operation modes that allow for flexibility in accommodating specific processing needs. In the depicted embodiment, control and solids feed functionalities are combined into a Control and Solids Feed Skid 140. In some embodiments there are six skids where the control and solids feed functionalities are split in a Control skid and a separate Solids Feed skid. Control may occur entirely on site, remotely, or both. On-site control may occur entirely within a Control skid or within a combined Control and Solids Feed Skid 140. Additionally, control may be augmented with one or more of remote control from a remotely located control station or from mobile devices such as smart phones, tablets, and laptop computers. The five operation modes are listed in Table 1. All operation modes are operated and monitored by a control system.

TABLE 1

Operation Modes and Active Modules

| Operation Mode | Modules | Description |
|---|---|---|
| MODE A | Solids Removal Filter skid 120<br>Pump (P-250) Enabled<br>Ultra Filter skid<br>Pump (P-350) Enabled | RO reject water is routed to the SRF and Ultra Filter skids, and then directly back to the storage tanks. |
| MODE B | Solids Feed skid 140<br>Feed/Blend skid 130<br>Pump (P-150) Enabled<br>Pump (P-152) Enabled<br>Solids Removal Filter skid 120<br>Pump (P-250) Disabled<br>Ultra Filter skid 110<br>Pump (P-350) Enabled | RO reject water is routed through the Feed/Blend system where media is added. Then it is routed through the filtration skids and back to the storage tanks. |
| MODE C | Solids Removal Filter skid 120<br>Pump (P-250) Enabled<br>Ultra Filter skid 110<br>Pump (P-350) Enabled<br>ISM skid 100<br>Pump (P-450) Enabled | RO reject water is routed directly to the filtration skids, then the ISM vessel and back to the storage tanks. |
| MODE D | Solids Feed skid 140<br>Feed/Blend skid 130<br>Pump (P-150) Enabled<br>Pump (P-152) Enabled<br>Solids Removal Filter skid 120<br>Pump (P-250) Disabled<br>Ultra Filter skid 110<br>Pump (P-350) Enabled<br>ISM skid 100<br>Pump (P-450) Enabled | RO reject water is routed through all of the systems with media addition, filtration and ISM vessel |
| MODE E | ISM skid 100<br>Pump (P-450) Enabled | RO reject water is routed directly through the ISM vessel and then to the storage tanks. |

In the configuration depicted in an embodiment of FIG. 1, the skids are arranged in operation mode D to perform a water treatment process to remove radioactive contaminants from nuclear process waste water. Influent water from storage tanks is treated with a sorbent, filtered, and finally polished in columns using an ion specific media (ISM) to remove any residuals.

The mixed process water is then passed to the Solids Removal Filter skid where it is filtered through a solids removal filter (SRF) (alternatively referred to as a solids removal filter module) that collects all of the sorbent solids and part of the waste solids. The filtered water is then passed to the Ultra Filter skid where it is filtered again through an ultra-filter that collects the remainder of the colloidal suspended solids. Finally, the ultra-filtered water is sent to the ISM skid where it is passed through ISM vessels that remove specific ions from the feed water. After the water has been treated it is returned to the storage tanks.

In an embodiment, a specialized ion exchange media or sorbent additive is used to control the chemical properties of the process water entering the ISM vessels. In some embodiments the additive is in powder form. The chemical properties of process water can vary significantly between different batches entering the system. The underlying chemical process in the ISM vessels is reliant on equilibrium therefore when the chemical properties of the influent to the ISM vessels changes, the column efficiency could fluctuate. The quantity and type of sorbent additive can be adjusted to normalize the concentration of an ion (Sr or Ca, for example) such that the chemical conditions in the ISM vessels remain stable. In some embodiments, the chemical properties of the solution going into the ISM vessels is monitored, automatically and/or manually, and the amount of sorbent additive is adjusted incrementally to stabilize any fluctuations. In alternative embodiments, in order to minimize the system adjustment response time, the chemical properties of the influent process water is monitored, automatically and/or manually, and the amount of sorbent additive is adjusted stoichiometrically. The chemical properties in the ISM vessels may also be monitored to confirm/fine tune the effect of the sorbent additive adjustment.

In an example embodiment, the MPS is used to treat reverse osmosis (RO) reject water containing strontium (Sr-90). A powdered sorbent (or other ion exchange material in powder form) is fed from the Control/Solids Feed skid 140 into the Feed/Blend skid 130. The additive is mixed into the process water and given time to absorb a particular isotope from the solution. The sorption time is dependent on the ISM used and the targeted isotope to be removed. In the example embodiment, to remove Sr-90 from the RO reject water, the sorption time is about forty minutes. In an alternative embodiment, other nuclear waste components besides Sr-90 can be removed, and other waste water besides RO reject water can be treated.

In some embodiments, each skid includes climate control and shock absorption to prevent damage to the hardware during transport, setup, and usage.

The depicted embodiment is an example of the preferred skid arrangement wherein the skids are situated proximately on a level surface in a single layer (i.e. not stacked). For certain sites, the topography of the region may render the preferred skid arrangement unfeasible, therefore elevation, distance, and system footprint need to be considered. At these certain sites the skids may need to be placed at one or more of different elevations, farther distances apart, or stacked. In some embodiments additional pumps may be situated between the skids, hose diameters may be increased or decreased, and/or other system component settings may be altered to achieve the desired pressure and flow conditions. In some embodiments, differences in elevation may be used as a gravitational advantage to reduce pumping requirements and thus save on energy costs.

In one embodiment, for skids containing pumps, two or more pumps may be placed in parallel at each pump location wherein each pump is configured for a differing range of pressures. Depending on the skid arrangement at the particular site, the appropriate pump will be utilized. Placing two or more pumps in parallel allows for a more highly mobile and modular system allowing the system to function at appropriate flow conditions for a wider range of differing site topographies and skid arrangements.

Figure 2:
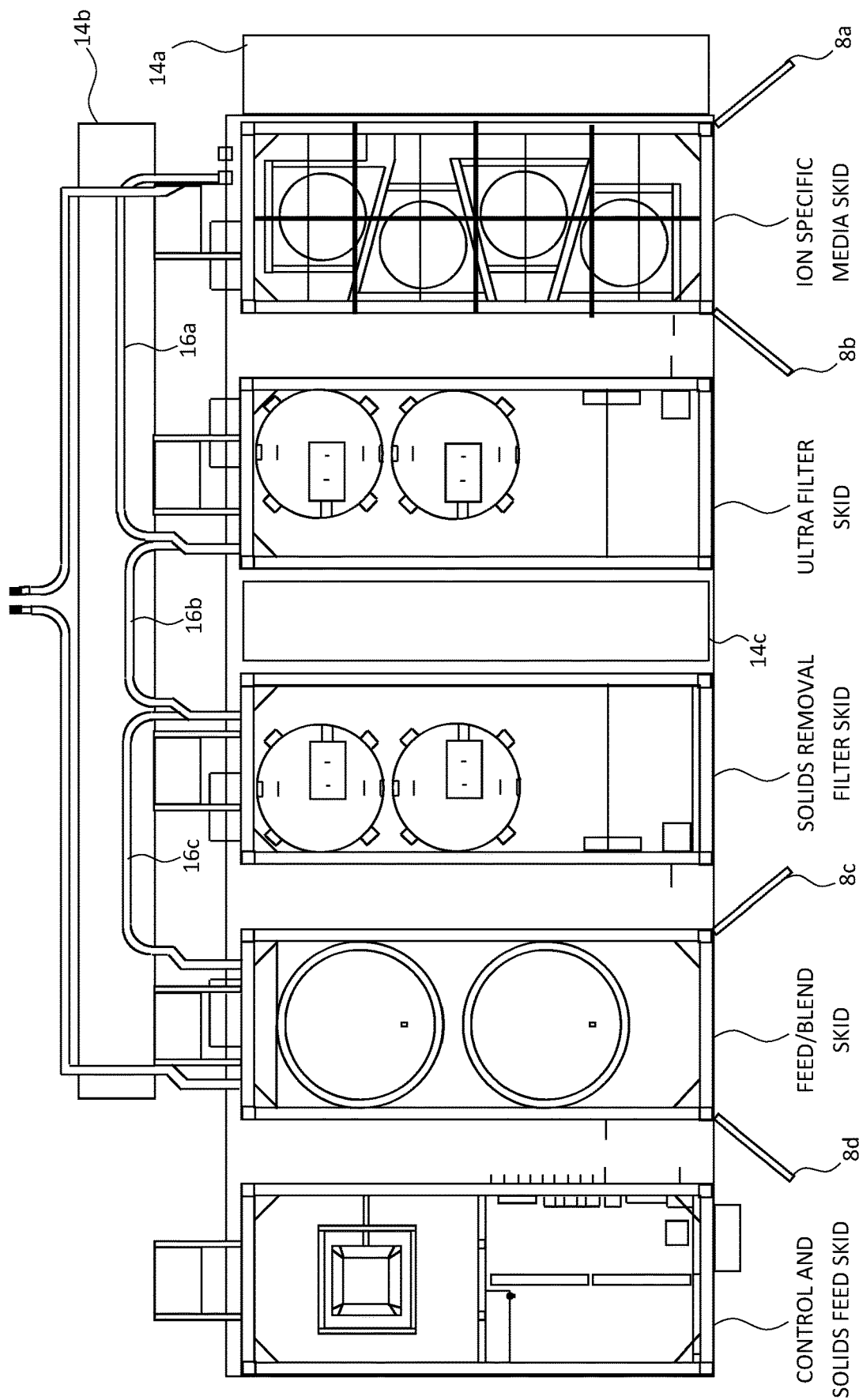
FIG. 2 is a top view of the example embodiment system of FIG. 1.

FIG. 2 is a top view of the system of FIG. 1 in operation mode D. In an embodiment, the five skids are depicted side by side but do not necessarily have to be in this configuration on site. In an embodiment, the skids will need to be connected in the order shown to operate in operation mode D, but may be positioned as required by the topography of the site. The skids include doors 8, access platforms 14*a*, 14*b*, and 14*c*, and interconnecting hoses 16*a*, 16*b*, and 16*c*.

Figure 3:
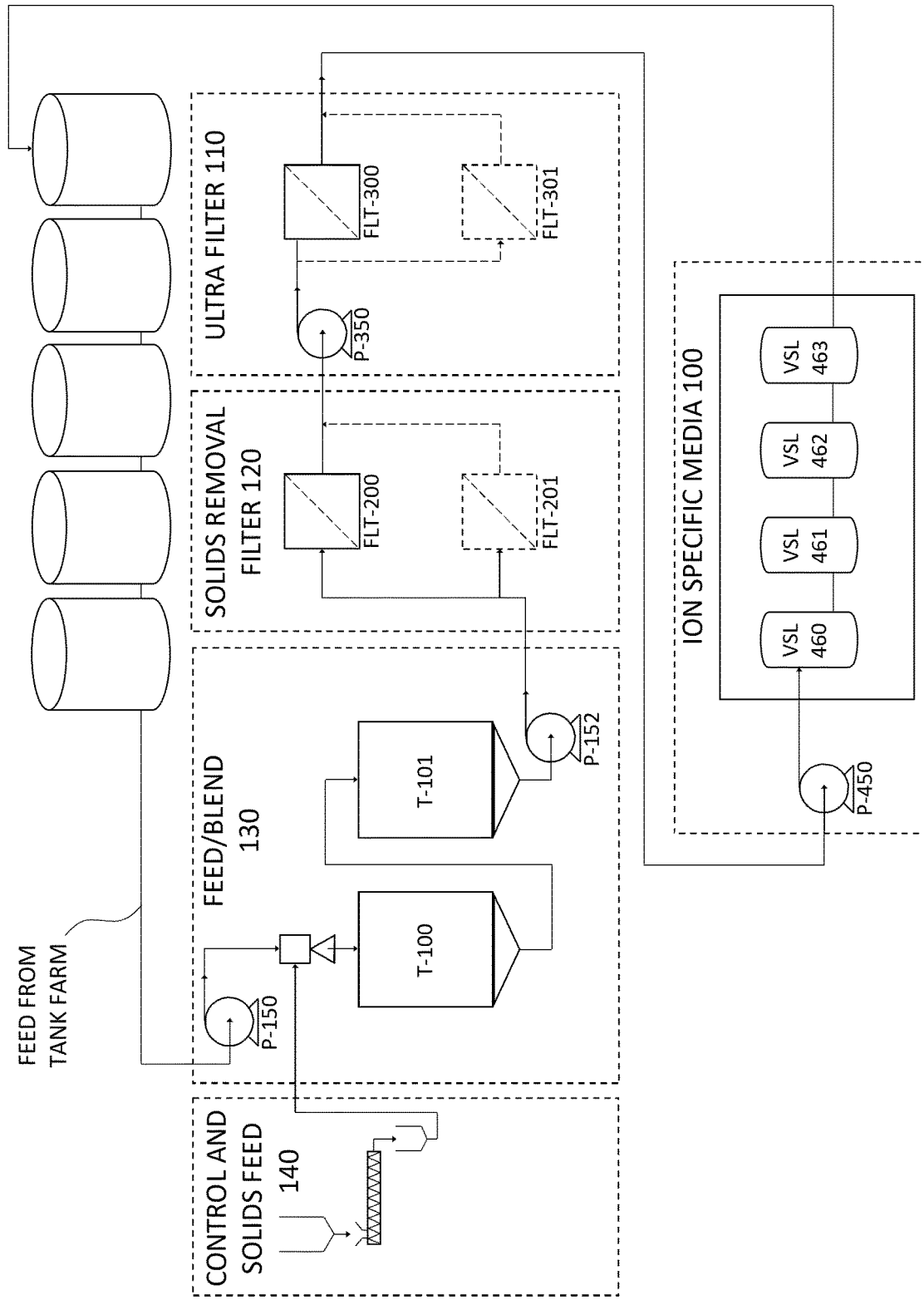
FIG. 3 is a general diagram depicting the primary mechanical components of the example embodiment system of FIG. 1.

FIG. 3 is a general diagram depicting the primary mechanical components of the system of FIG. 1. In an embodiment, the process is generally continuous, as shown. The water to be treated is piped from the storage tanks into the Feed/Blend skid 130 through pump P-150. A powdered sorbent or ion exchange material is fed from the Control and Solids Feed skid 140 into the Feed/Blend skid 130. In the depicted embodiment the sorbent is fed from a Super Sack® (or equivalent industrial sack, bag or other packaging) into the hopper. From the hopper it is directed into an auger to control feed rate into another hopper which directs it to the Feed/Blend skid 130.

In an embodiment, a first tank T-100 and second tank T-101 tank are connected in series. A pre-determined quantity of the sorbent and a pre-determined quantity of the contaminated water are combined in the first feed/blend tank T-100 and remain in first feed/blend tank T-100, with or without agitation, for a pre-determined period of time calculated to allow the contaminant to be sorbed by the sorbent. In order to convert this batch process into a continuous process, the contents of first feed/blend tank T-100 are transferred to the second feed/blend tank T-101 providing the source of a continuous flow of treated water to be pumped from the Feed/Blend skid 130 through pump P-152 into the Solids Removal Filter skid 120. Alternatively, the treated water may be transferred directly into the Solids Removal Filter skid 120 through pump P-152 while the second feed/blend tank T-101 is being processed in parallel. In an alternative embodiment (not shown), feed/blend tanks T-100 and T-101 are connected in parallel. A pre-determined quantity of the sorbent and a pre-determined quantity of the contaminated water are combined in the first feed/blend tank T-100 and remain in first feed/blend tank T-100, with or without agitation, for a pre-determined period of time calculated to allow the contaminant to be sorbed by the sorbent. The treated water in first feed/blend tank T-100 is pumped at a rate calculated to provide a continuous flow from the Feed/Blend skid 130 into the Solids Removal Filter skid 120. At the time the treated water starts to flow from first feed/blend tank T-100, the filling process is started for second feed/blend tank T-101. The alternating use of feed/blend tanks T-100 and T-101 provides a steady and continuous flow of treated water to the Solids Removal Filter skid 120. Regardless of whether the tanks are configured in parallel or in series, the treated water delivered to the Solids Removal Filter skid 120 passes through a first solids removal filter FLT-200 or a second solids removal filter FLT-201 (depending on which filter is online) to remove the sorbent and any other solids. Next the treated water is pumped through pump P-350 into the Ultra Filter skid 110 where it is further filtered by a first ultra filter FLT-300 or a second ultra filter FLT-301 (depending on which filter is online).

Continuing with an embodiment description, from the Ultra Filter skid 110 the process water is pumped through pump P-450 into the Ion Specific Media skid 100 where it is passed through one or more ion specific media (ISM) vessels containing ion exchange media specific to the removal requirements of the site. The depicted embodiment shows four ISM vessels VSL-460, VSL-461, VSL-462, and VSL-463, where three are online at a time and the fourth is in standby. Every five days, or on a different pre-determined maintenance schedule, the next vessel down the line is taken offline and the standby vessel is put online. After passing through one or more of the ISM vessels VSL-460, VSL-461, VSL-462, and VSL-463 the water is either returned to the storage tanks for further disposition or run through the system continuously until it meets purity standards.

FIG. 4 is a legend describing the line types, mechanical component symbols, and abbreviations used in the subsequent figures.

Figure 5:
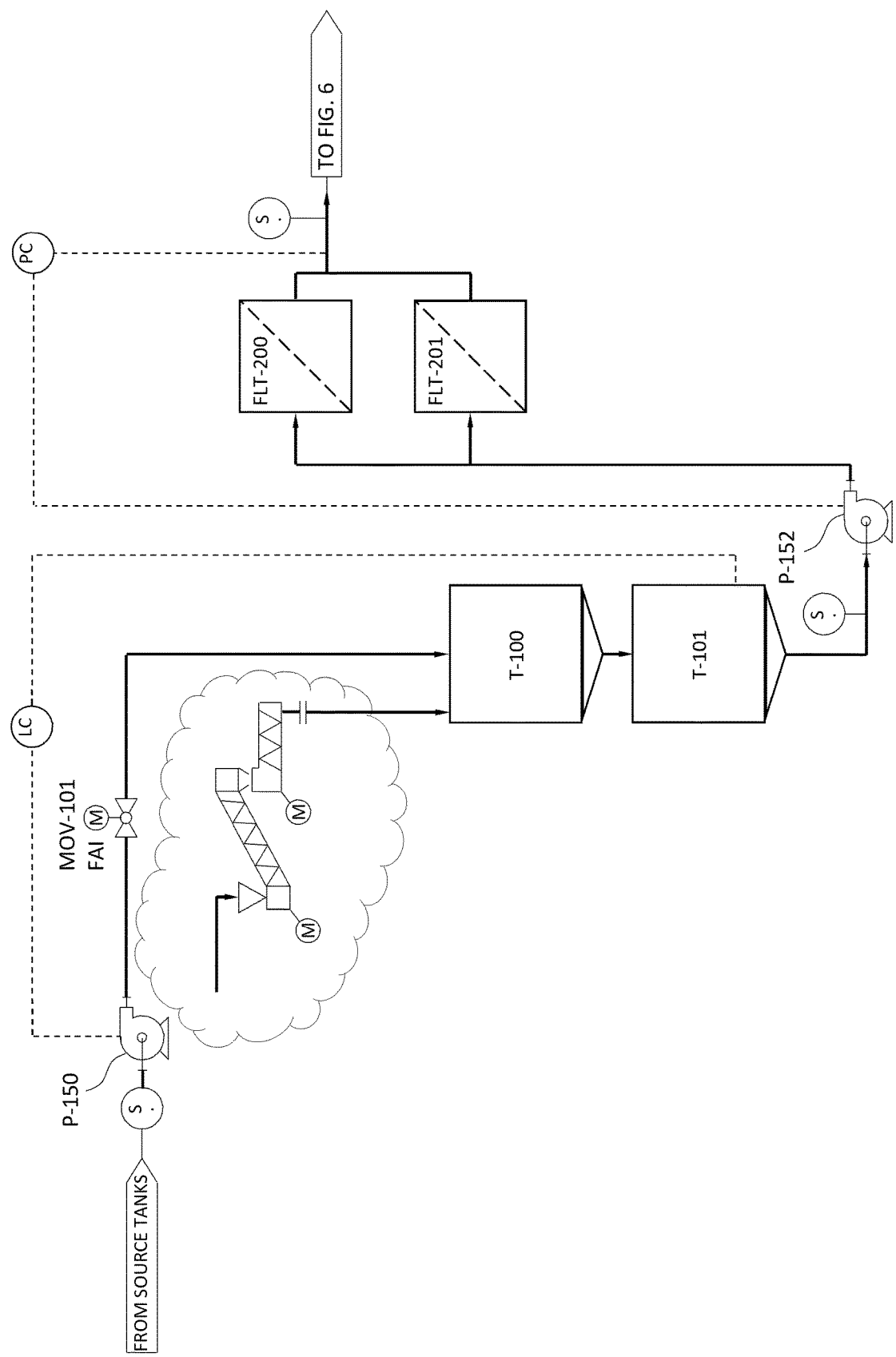
FIG. 5 is a more detailed diagram depicting the primary mechanical components of the example embodiment system of FIG. 1.
Figure 6:
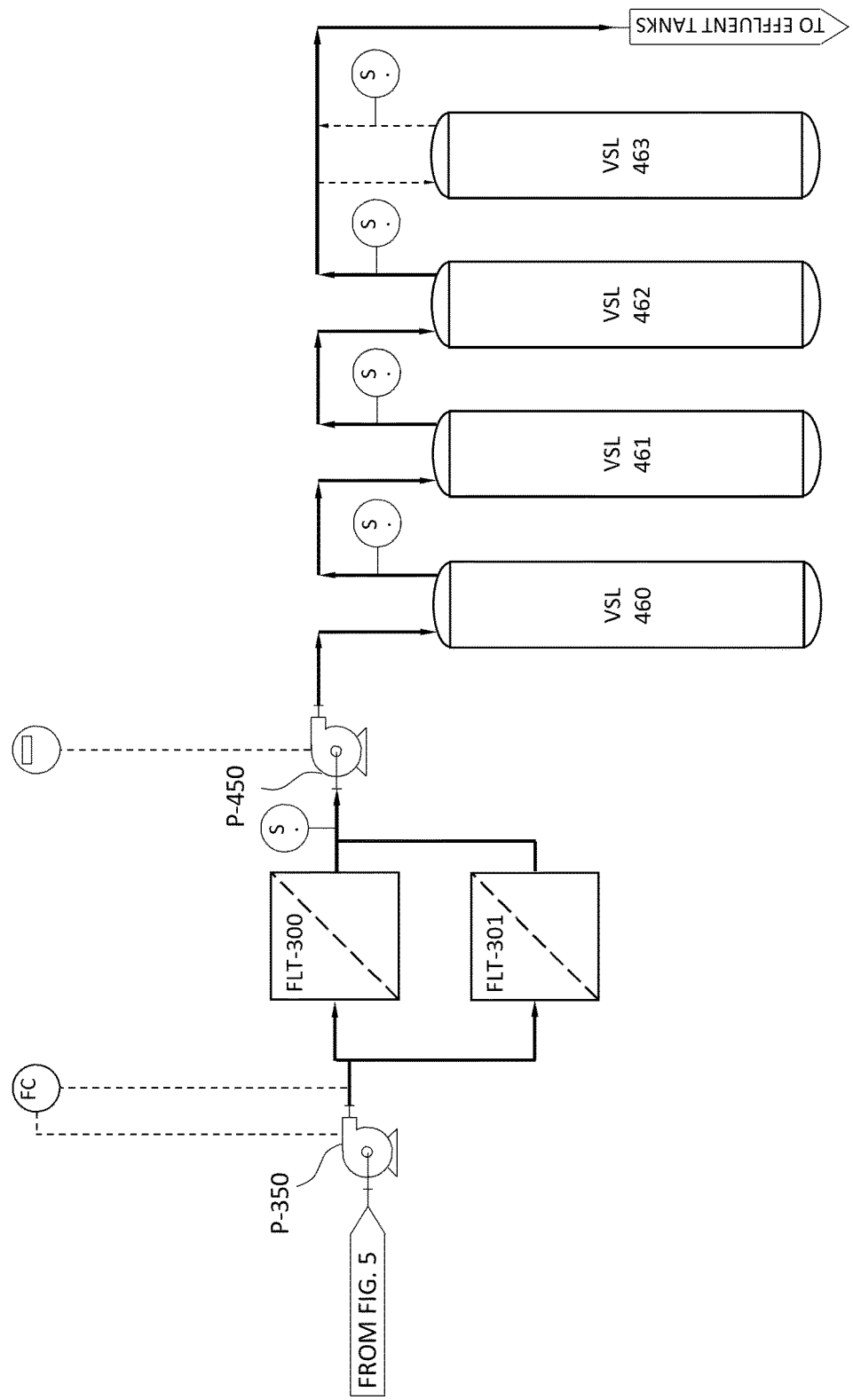
FIG. 6 is a continuation of FIG. 5.

FIGS. 5 and 6 depict a more detailed diagram of the primary mechanical components of the system of FIG. 1. Circles labeled with "S" indicate locations where samples will be taken. The circles connected with dashed lines indicate instrumentation that may be implemented to provide data for monitoring and control of the system. The water to be treated is pumped P-150 from the storage tanks into a first feed/blend tank T-100. A powdered sorbent or ion exchange material is loaded into a solids feeder which controls the rate of feed into the first feed/blend tank T-100.

The sorbent and the water are combined in a first feed/blend tank T-100 and then in a second feed/blend tank T-101. Next, the treated water is pumped P-152 from the tanks to pass through a first solids removal filter FLT-200 or a second solids removal filter FLT-201 (depending on which is online) to remove the sorbent and any other solids. Next the treated water is pumped P-350 (of FIG. 6) through a first ultra filter FLT-300 or a second ultra filter FLT-301 (depending on which is online).

From the ultra filters the water is pumped P-450 through one or more ion specific media (ISM) vessels containing ion exchange media specific to the removal requirements of the site. In some embodiments the ISM vessels are loaded with a titanosilicate synthetic product, which is a very stable granular material with a high strontium distribution coefficient KdSr, even in high competition (e.g., seawater, Ca and Mg) making it an excellent choice for removal of strontium in column/vessel applications. The depicted embodiment shows four ISM vessels VSL-460, VSL-461, VSL-462, and VSL-463, three of which are online and one which is in standby. After passing through one or more of the ISM vessels the water is either returned to the storage tanks or run through the system continuously until it meets purity standards. In some embodiments, the clean water may be used for system flushing operations.

FIGS. 7 through 16 depict the mechanical systems. Instrumentation and control systems are described in FIGS. 17 through 24.

FIGS. 7 through 12 are detailed piping diagrams for the five example embodiment skids. In the depicted embodiments, every skid is equipped with a sump into which fluid drains before recirculation or in which wastes gather before disposal. In the depicted embodiments, each sump has one or more drains, each preceded by a ball valve. The Control and Solids Feed skid 140 (FIG. 7) depicts one drain DN-01 and one ball valve V-501 (normally locked closed) located at a first end of the skid. The Feed/Blend skid 130 (FIG. 8) sump has three drains DN-02, DN-03, DN-04, one DN-02 at the first end with ball valve V-121 (normally locked open), and two DN-03, DN-04 at the second end with ball valves V-103 and V-122 (both normally locked closed). The Solids Removal Filter skid 120 (FIG. 9) sump has three drains DN-05, DN-06, DN-07, two DN-05, DN-06 at the first end with ball valves V-202 and V-217 (both normally locked closed), and one DN-07 at the second end with ball valve V-218 (normally locked closed). The Ultra Filter skid 110 (FIG. 10) sump has three drains DN-08, DN-09, DN-10, two DN-08, DN-09 at the first end with ball valves V-301 and V-316 (both normally locked closed), and one DN-10 at the second end with ball valve V-317 (normally locked closed). The Ion Specific Media skid 100 (FIGS. 11-12) sump has three drains DN-11, DN-12, DN-13, one DN-11 at the first end with ball valve V-412 (normally locked closed), and two DN-12, DN-13 at the second end with ball valves V-401 and V-413 (both normally locked closed).

Figure 7:
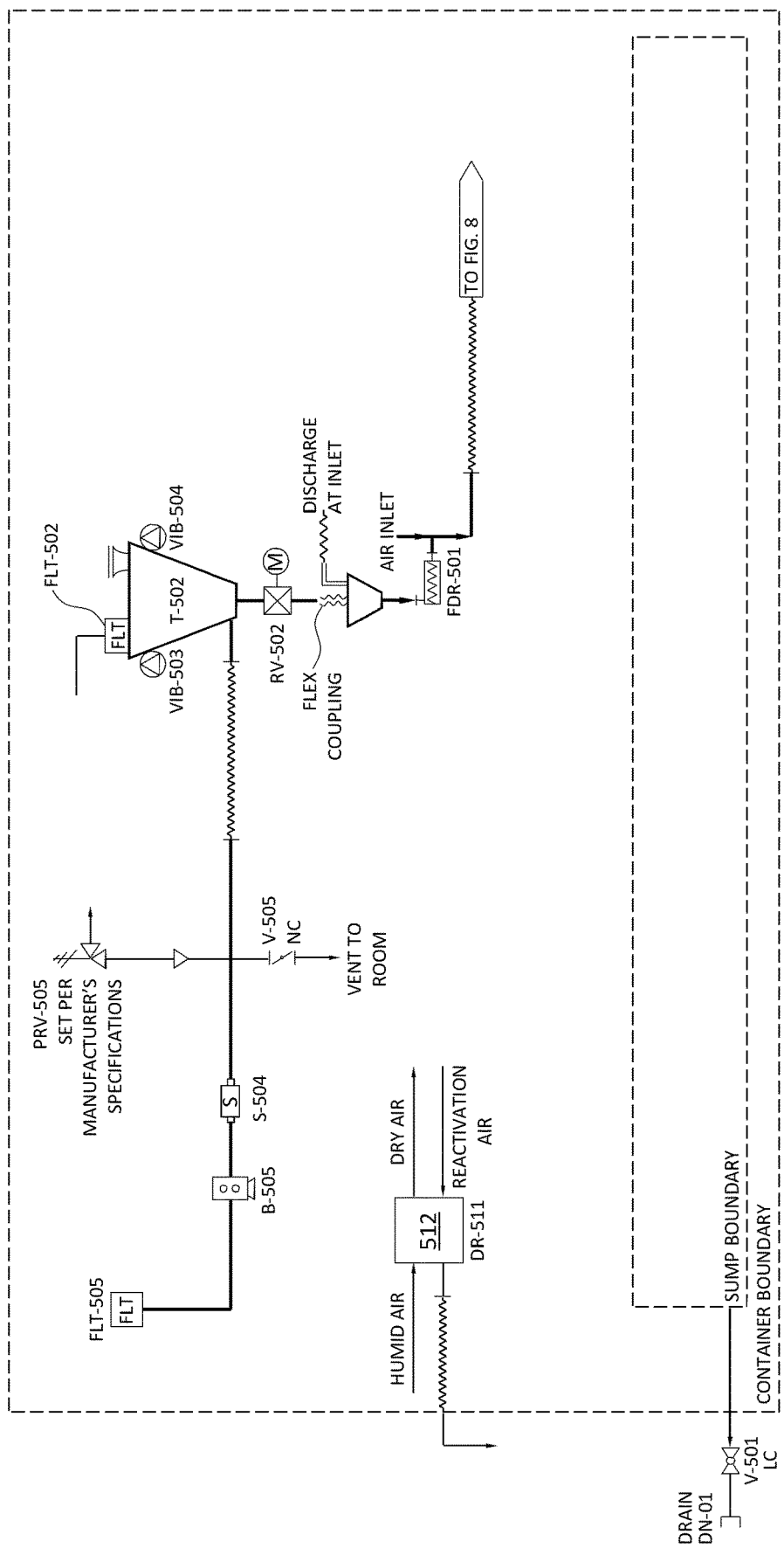
FIG. 7 is a diagram depicting the mechanical components of an example embodiment Control and Solids Feed skid.

FIG. 7 is a diagram depicting the mechanical components of an example embodiment Control and Solids Feed skid 140. The air in the Control and Solids Feed skid 140 is dehumidified by dryer DR-511. Air is passed through filter FLT-505 and passed through blower B-505. The blower B-505 delivers the air at constant speed through a flex hose to the base of a first hopper T-502. An in-line silencer S-504 may be placed after the blower B-505 to reduce noise. Alternative flow paths are provided which may be used, if necessary, to reduce air pressure in the system. One such path vents to the room through a butterfly valve V-505 (normally closed) which is operated manually. The other path vents through a pressure relief valve PRV-505 which will automatically release air when a maximum pressure is reached.

In an embodiment, powdered sorbents or ion exchange materials are delivered in approximately 800 kg Super Sacks® or similar industrial sacks, hereinafter referred to as industrial sacks. The industrial sacks are unloaded through filter FLT-502 into the hopper T-502. Two mechanical vibrators VIB-503 and VIB-504 on either side of the hopper T-502 are used to aid the solid material in traveling to the base of the hopper T-502. At the base of the hopper T-502 a rotary valve RV-502 controls the rate of flow of the solids through a flex coupling into second smaller hopper. The second hopper has a discharge at the inlet which allows excess solids to flow out of the hopper in the event the hopper is overfilled. From the small hopper the solids travel into a solids feeder FDR-501 which uses an auger to control the feed rate of the solids. After the solids feeder FDR-501 stage, the sorbent is joined by air and sent through a flex hose out of the Control and Solids Feed skid 140 to the Feed/Blend skid 130.

Figure 8:
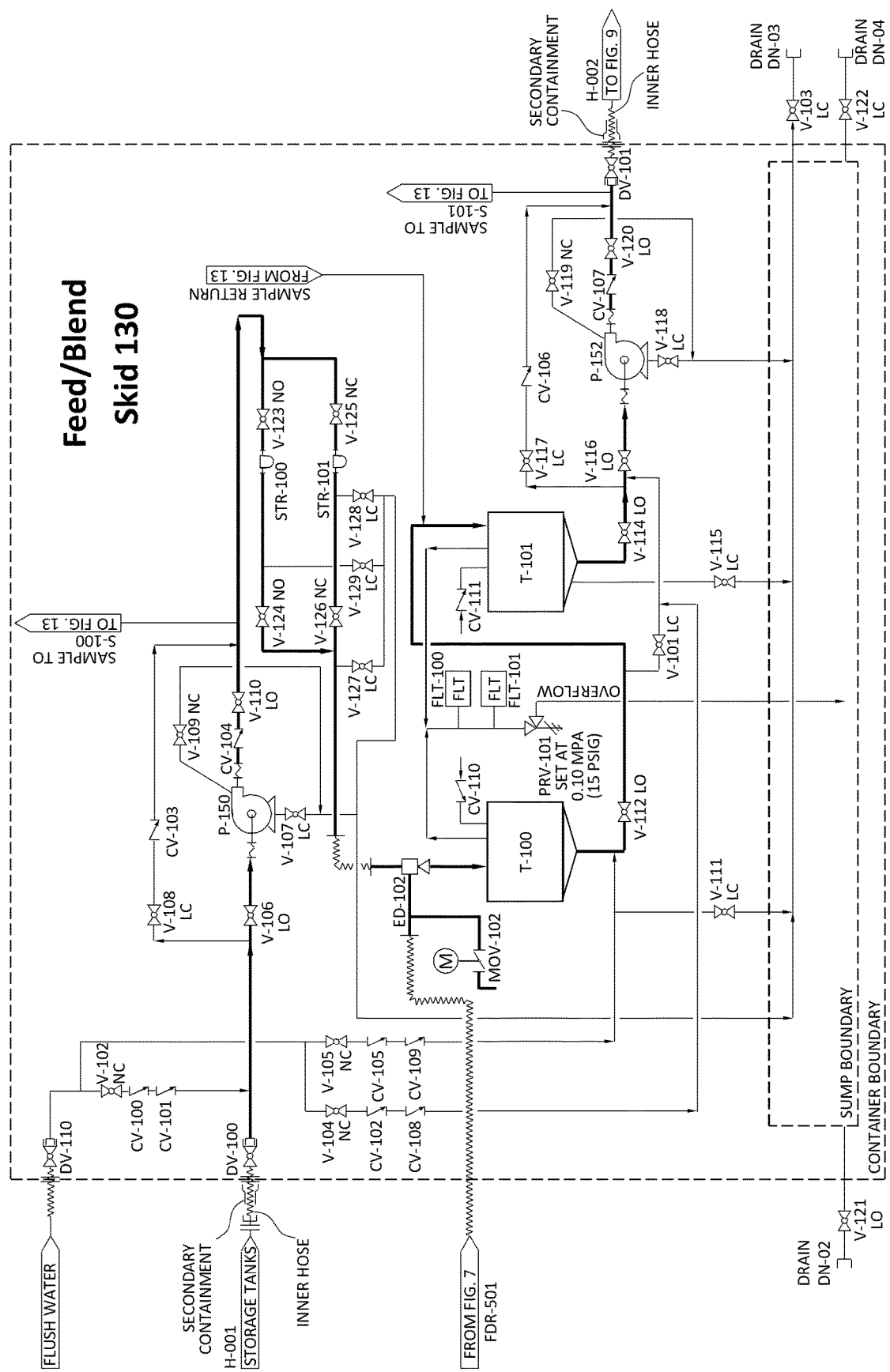
FIG. 8 is a diagram depicting the mechanical components of an example embodiment Feed/Blend skid.

In an embodiment, the Feed/Blend skid 130, FIG. 8, has three inlets. Continuing with an embodiment depicted in FIG. 8, flush water may enter the Feed/Blend skid 130 at a first inlet where it passes through disconnect valve DV-110. Flush water is usually used at system startup and to clean the pipes at system shutdown. Depending on which valve or valves are open, the flush water may travel directly to one, two, or three different locations in the skid. To deliver the flush water to the beginning of the primary piping, ball valve V-102 (normally closed) may be opened in which case the flush water will flow through ball valve V-102 and check valves CV-100 and CV-101. To deliver flush water to the primary piping just before the first tank T-100, ball valve V-105 (normally closed) may be opened in which case the flush water will flow through ball valve V-105 and check valves CV-105 and CV-109. Another flow path is provided to the sump if ball valve V-111 (normally locked closed) is opened. To deliver flush water to the secondary piping between the outlets of the first and second tanks T-100 and T-101, ball valve V-104 (normally closed) may be opened in which case the flush water will travel through ball valve V-104 and checks valves CV-102 and CV-108. The ball valves may be fully opened or opened partially to control the rate of flow. Depending on which valves are opened or closed, the flush water can travel through any or all of the pipes in the skid. Check valves are used to prevent flush water from flowing back to the source. Redundant check valves are used to increase the safety factor in the event pressure buildup compromises the first check valve.

At a second inlet RO reject water (or other nuclear process waste feed water) is gravity fed into the system from the waste water storage tanks through double contained transfer hose H-001. The feed water is passed through a disconnect valve DV-100. Most or all of the feed water will continue through the primary piping, through ball valve V-106 (normally locked open) and into a first feed/blend pump P-150, which is variable speed. A portion of the feed water may travel through secondary piping if ball valve V-108 (normally locked closed) is opened, and then travel through check valve CV-103 to bypass the first feed/blend pump P-150 and join the primary flow. The first feed/blend pump P-150 has two additional outlets with ball valves V-109 (normally closed) and V-107 (normally locked closed) which direct excess water to the sump when one or both valves are opened.

Water exits the first feed/blend pump P-150 where it passes through check valve CV-104 and ball valve V-110 (normally locked open). The feed water continues down the pipeline to a split where one path is normally closed and the other is open. On the normally open path, the feed water passes through ball valve V-123, is strained at basket strainer STR-100 to remove particulates, and through ball valve V-124. If the normally closed path is opened, the feed water passes through ball valve V-125, basket strainer STR-101, and ball valve V-126. The normally open and the normally closed paths converge prior to joining the powdered sorbent or ion exchange material flow into the eductor ED-102. Three alternative paths are provided for water flow to the sump which is blocked by valves that are normally locked closed. Ball valve V-128 controls flow on the alternative path from the normally closed primary line, ball valve V-129 controls flow on the alternative path from the normally open primary line, and ball valve V-127 controls flow on the alternative path just after the convergence of the normally open and normally closed primary lines.

Continuing with an embodiment description, at a third inlet powdered sorbent or ion exchange material is provided from the Control and Solids Feed skid 140 of FIG. 7 to the Feed/Blend Skid 130 of FIG. 8. The powdered sorbents or ion exchange materials travel through a flex hose to eductor ED-102 where it joins the feed water. A motor operated butterfly valve MOV-102 serves as a vacuum break when delivery of the sorbent material is discontinued. This valve is normally closed during operation and fails in position. When the absorbent material flow is stopped, MOV-102 is opened to break the vacuum and prevent any further material from being drawn into the system. The movement of the feed water in the eductor ED-102 creates a suction which draws the powdered sorbent or ion exchange materials into the first feed/blend tank T-100. The level in the first feed/blend tank T-100 will be automatically controlled through modulation of the speed of first feed/blend pump P-150. The level in the first feed/blend tank T-100 is controlled so the inlet feed flow will match the outlet flow. The powdered sorbent or ion exchange material dosing rate is set proportionately to the feed flow rate to maintain the proper ratio of sorbent powder to feed water. The mixed process water flows down through the first feed/blend tank T-100, out through ball valve V-112 (normally locked open) and flows into the second feed/blend tank T-101. An alternative path allows for bypass of the second feed/blend tank T-101 if ball valve V-101 (normally locked closed) is opened. Both tanks T-100 and T-101 have overflow runoff paths at the top. The overflow is filtered through filters FLT-100 and FLT-101, passed through pressure relief valve PRV-101, which releases pressure when the pressure exceeds 0.10 MPA (15 PSIG), and proceeds to the sump. The second feed/blend tank T-101 has a second alternative flow path, which, if ball valve V-115 (normally locked closed) is opened, will allow for flow into the sump.

Figure 10:
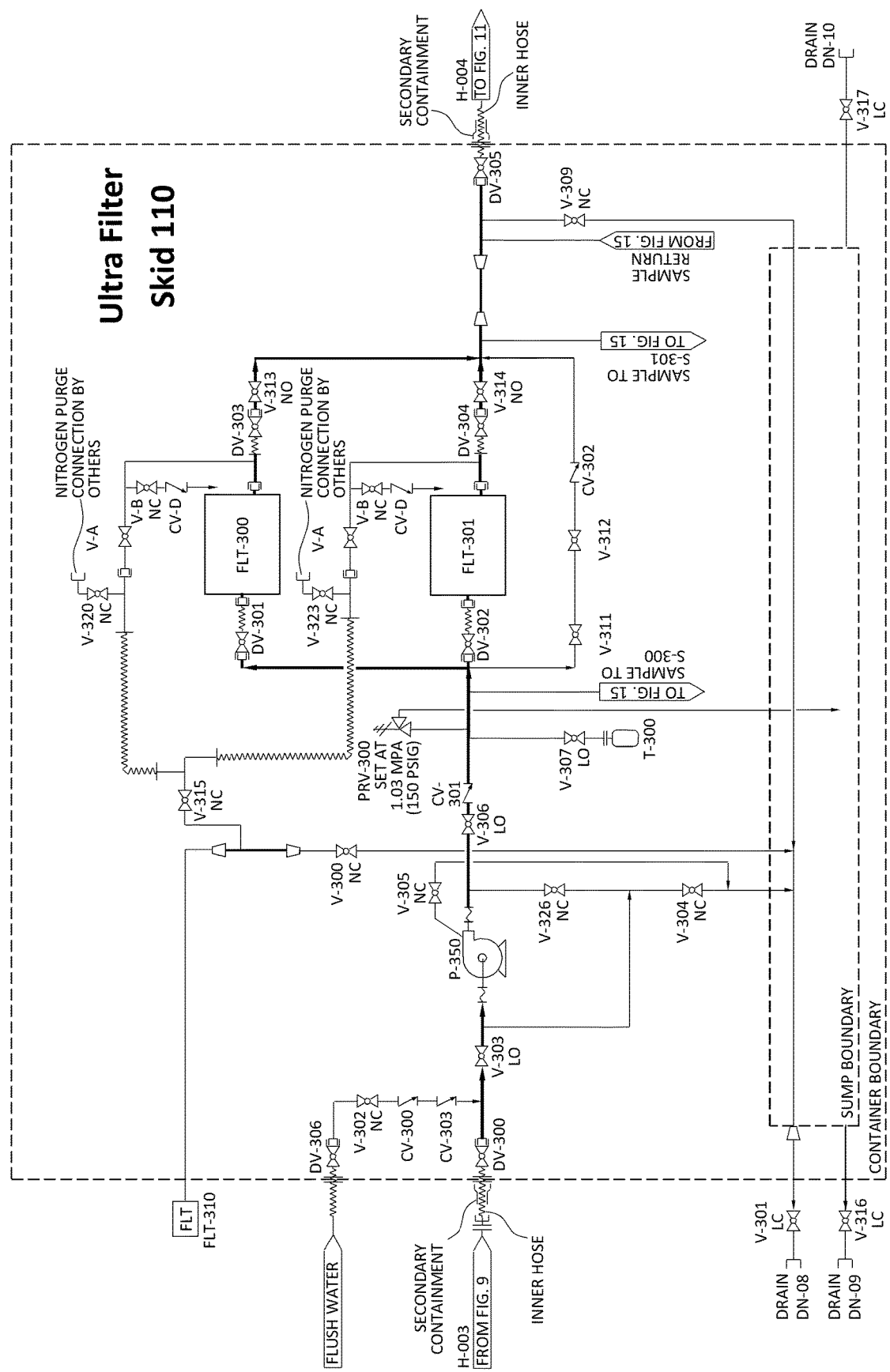
FIG. 10 is a diagram depicting the mechanical components of an example embodiment Ultra Filter skid.

The process water leaves the second feed/blend tank T-101 through the bottom and through ball valve V-114 (normally locked open). Most or all of the process water will continue through the primary piping, through ball valve V-116 (normally locked open) and into a second feed/blend pump P-152, which is variable speed. The speed of the second feed/blend pump P-152 (FIG. 8) is modulated to maintain a constant pressure at the inlet to the ultra filter pump P-350 (FIG. 10). As the solids removal filter is loaded, its differential pressure will increase and the speed of the second feed/blend pump P-152 (FIG. 8) will increase accordingly to maintain a constant pressure downstream of the solids removal filter. By maintaining a constant pressure at the inlet to ultra filter pump P-350 (FIG. 10), the flow through the solids removal filter must match the flow rate of ultra filter pump P-350 (FIG. 10). This also ensures positive pressure is maintained on the suction side of ultra filter pump P-350 (FIG. 10).

Continuing with the example embodiment of FIG. 8, a portion of the process water may travel through secondary piping if ball valve V-117 (normally locked closed) is opened, and then travel through check valve CV-106 to bypass the second pump P-152 and rejoin the primary flow downstream of the pump. The second feed/blend pump P-152 has two additional outlets with ball valves V-119 (normally closed) and V-118 (normally locked closed) which direct excess water to the sump when one or both valves are opened. The process water is then pumped through disconnect valve DV-101 and into double contained transfer hose H-002 to the Solids Removal Filter skid 120.

Figure 9:
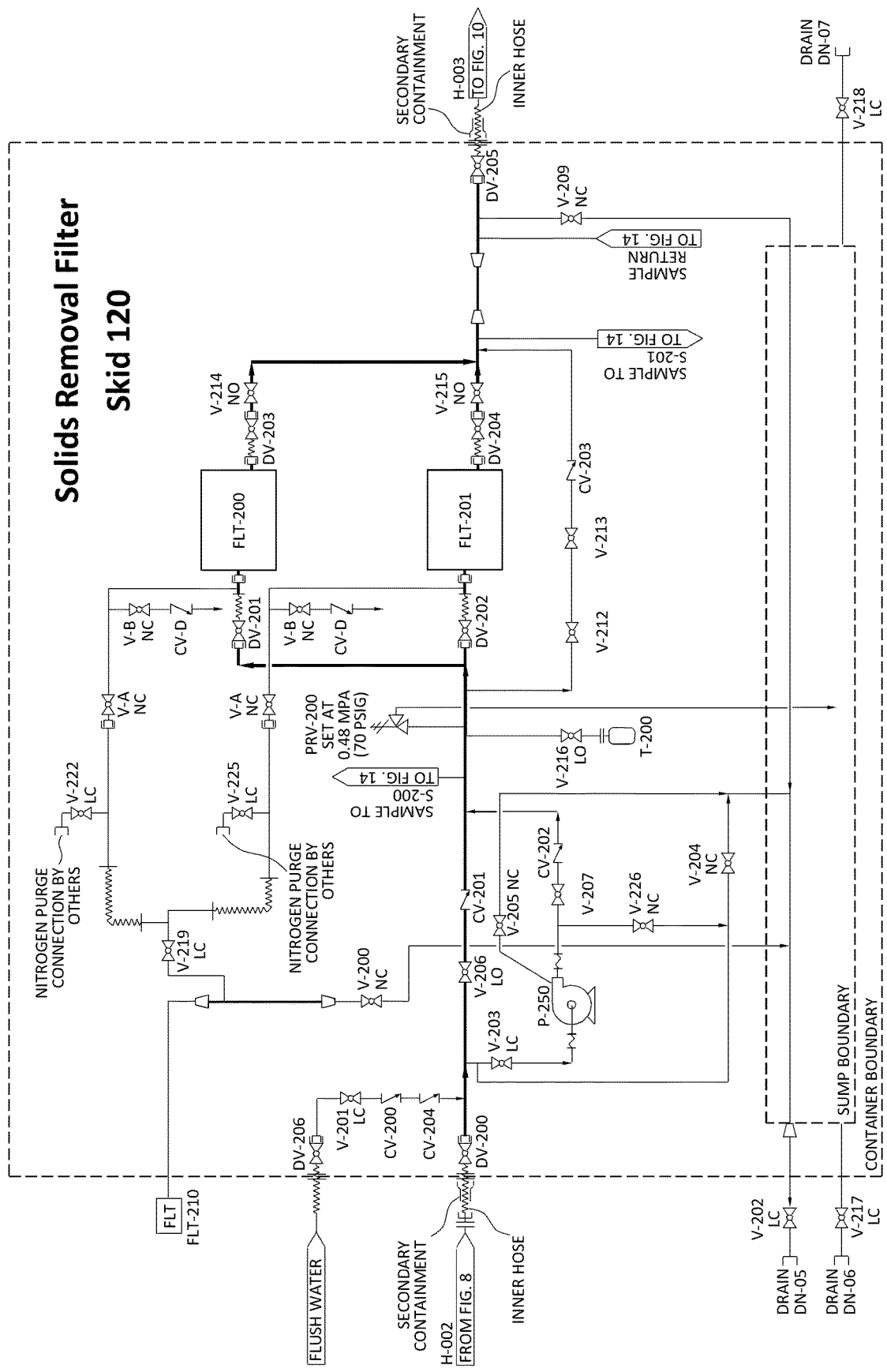
FIG. 9 is a diagram depicting the mechanical components of an example embodiment Solids Removal Filter skid.

In an example embodiment, the Solids Removal Filter skid 120, depicted in FIG. 9, has two inlets. At the first inlet, flush water may proceed through disconnect valve DV-206, ball valve V-201 (normally locked closed) and check valves CV-200 and CV-204. The flush water may travel along any of the paths through the system depending on which valves are open or closed.

Hydrogen and other gases may be vented from the filtering system just before each filter. The hydrogen or other gases may pass through ball valve V-A (normally closed), through flex hose, through ball valve V-219 (normally locked closed), and then either to the sump through ball valve V-200 (normally closed) or to the environment outside the skid through filter FLT-210. Alternatively, the hydrogen or other gases may travel through ball valve V-B (normally closed) and check valve CV-D to the environment. Nitrogen may be purged at either ball valve V-222 (normally locked closed) or ball valve V-225 (normally locked closed) depending on which filter is currently in use.

At a second inlet, process water travels via double contained transfer hose H-002 from the Feed/Blend skid 130 of FIG. 8. The process water travels through disconnect valve DV-200. Most or all of the process water will continue through the primary piping, through ball valve V-206 (normally locked open) and check valve CV-201. Some of the process water may flow to the sump if ball valve V-204 (normally closed) is opened. If ball valve V-203 (normally locked closed) is opened, some, or all, of the process water may proceed into a solids removal filter pump P-250. Generally, solids removal filter pump P-250 will be bypassed.

If ball valve V-203 (normally locked closed) is opened, all or a portion of the process water will travel through secondary piping to the solids removal filter pump P-250. The solids removal filter pump P-250 has an additional outlet with ball valve V-205 (normally closed) which allows excess process water to flow to the sump when it is opened. Additionally, just after the primary outlet, excess process water may flow to the sump if ball valve V-226 (normally closed) is opened. However, most of the water will proceed through ball valve V-207 (normally open) and check valve CV-202 back to the primary piping.

Along the primary pipeline, before the filters FLT-200 and FLT-201, there is a pressure relief valve PRV-200 which will relieve any pressure over 0.48 MPA (70 PSIG), or any pressure deemed crucial for proper system operation. There is also a surge suppressor T-200 preceded by ball valve V-216 (normally locked open) on a secondary line. The pressure relief valve PRV-200 dumps process water to the sump when the maximum pressure is exceeded. The process water may either proceed through the first filter FLT-200 or the second filter FLT-201 depending on which one is online. The filters FLT-200 and FLT-201 remove most of the contaminant-bearing powdered sorbent or ion exchange material and small particulates containing contaminants from the process water. Two filters are provided with one online and one in standby or going through a replacement or maintenance procedure. The online filter remains online until the high differential pressure limit is reached. The standby filter is then placed online and the loaded filter can be replaced.

Continuing with an embodiment in FIG. 9, each filter FLT-200 and FLT-201 is preceded by a disconnect valve DV-201 and DV-202, respectively, and followed by a disconnect valve DV-203 and DV-204, respectively, to allow for simple removal and replacement. Disconnect valves DV-203 and DV-204 are followed by ball valves V-214 (normally open) and V-215 (normally open), respectively. Alternatively, the filters FLT-200 and FLT-201 may be bypassed entirely. If ball valves V-212 (normally locked closed) and V-213 (normally locked closed) are both opened, the process water can proceed along a secondary line through both valves and check valve CV-203 to the primary piping downstream of the filters FLT-200 and FLT-201. After the filters FLT-200 and FLT-201, if ball valve V-209 (normally closed) is open, some of the process water may proceed to the sump. Generally, the process water will proceed through disconnect valve DV-205 into flex hose H-003 for transport to the Ultra Filter skid 110 (FIG. 10).

In an embodiment, the Ultra Filter skid 110, FIG. 10, operates much like the Solids Removal Filter skid 120 (FIG. 9) except that the pump is on the primary line instead of a secondary line. As mentioned previously, the speed of the ultra filter feed pump P-350 will be modulated to maintain a constant flow through the ultra filters FLT-300 and FLT-301 using a magnetic flow meter. As the filter is loaded and the trans-membrane pressure increases, the ultra filter feed pump P-350 speed will increase in order to maintain the flow rate set point. Ultra filter pump P-350 will be sized to ensure positive pressure is maintained at the inlet to the ISM feed pump P-450 of FIG. 11.

In an embodiment, the Ultra Filter skid 110 as shown in FIG. 10, has two inlets. At the first inlet, flush water may proceed through disconnect valve DV-306, ball valve V-302 (normally locked closed), and check valves CV-300 and CV-303. The flush water may travel along any of the paths through the system depending on which valves are open or closed.

Hydrogen and other gases may be vented from the filtering system just after each filter placement in the process line. The hydrogen or other gases may pass through ball valve V-A (normally closed), through flex hose, through ball valve V-315 (normally closed), and then either to the sump through ball valve V-300 (normally closed) or to the environment outside the skid through filter FLT-310. Alternatively, the hydrogen or other gases may travel through ball valve V-B (normally closed) and check valve CV-D to the environment. Nitrogen may be purged at either ball valve V-320 (normally closed) or ball valve V-323 (normally closed) depending on which filter is currently in use.

At a second inlet, process water travels via double contained transfer hose H-003 from the Solids Removal Filter skid 120 of FIG. 9. Continuing with an embodiment of FIG. 10, the process water travels through disconnect valve DV-300 and through ball valve V-303 (normally locked open) to the ultra filter pump P-350. The ultra filter pump P-350 has an additional outlet with ball valve V-305 (normally closed) which allows excess process water to flow to the sump when it is opened. Additionally, just after the primary outlet, excess process water may flow to the sump if ball valves V-326 (normally closed) and V-304 (normally closed) are opened. If ball valve V-304 (normally closed) is opened, process water may bypass the pump and travel to the sump. However, most of the water will proceed through ball valve V-306 (normally locked open) and check valve CV-301 back to the primary piping.

Along the primary pipeline, before the filters FLT-300 and FLT-301, there is a pressure relief valve PRV-300 which will relieve any pressure over 1.03 MPA (150 PSIG), or any pressure deemed crucial for proper system operation. There is also a surge suppressor T-300 preceded by ball valve V-307 (normally locked open) on a secondary line. The pressure relief valve PRV-300 dumps process water to the sump when the pressure is exceeded. The process water may either proceed through the first filter FLT-300 or the second filter FLT-301 depending on which one is online. The filters FLT-300 and FLT-301 remove most of the remaining contaminant bearing solids and small particulate containing contaminants from the process water. Two filters are provided with one online and one in standby or being replaced. The online filter remains online until the high differential pressure limit is reached. The standby filter is then placed online and the loaded filter can be replaced.

Further with an embodiment of FIG. 10, each of the filters FLT-300 and FLT-301 are preceded by a disconnect valve DV-301 and DV-302, respectively, and followed by a disconnect valve DV-303 and DV-304, respectively, to allow for simple removal and replacement. Disconnect valves DV-303 and DV-304 are followed by ball valves V-313 (normally open) and V-314 (normally open), respectively. Alternatively, the filters FLT-300 and FLT-301 may be bypassed entirely. If ball valves V-311 (normally locked closed) and V-312 (normally locked closed) are both opened, the process water can proceed along a secondary line through both valves and check valve CV-302 to the primary piping at the other side of the filters FLT-300 and FLT-301. After the filters FLT-300 and FLT-301, if ball valve V-309 (normally closed) is open, some of the filtered process water may proceed to the sump. Generally, the filtered process water will proceed through disconnect valve DV-305 into flex hose H-004 for transport to the Ion Specific Media skid 100 of FIG. 11.

Figure 11:
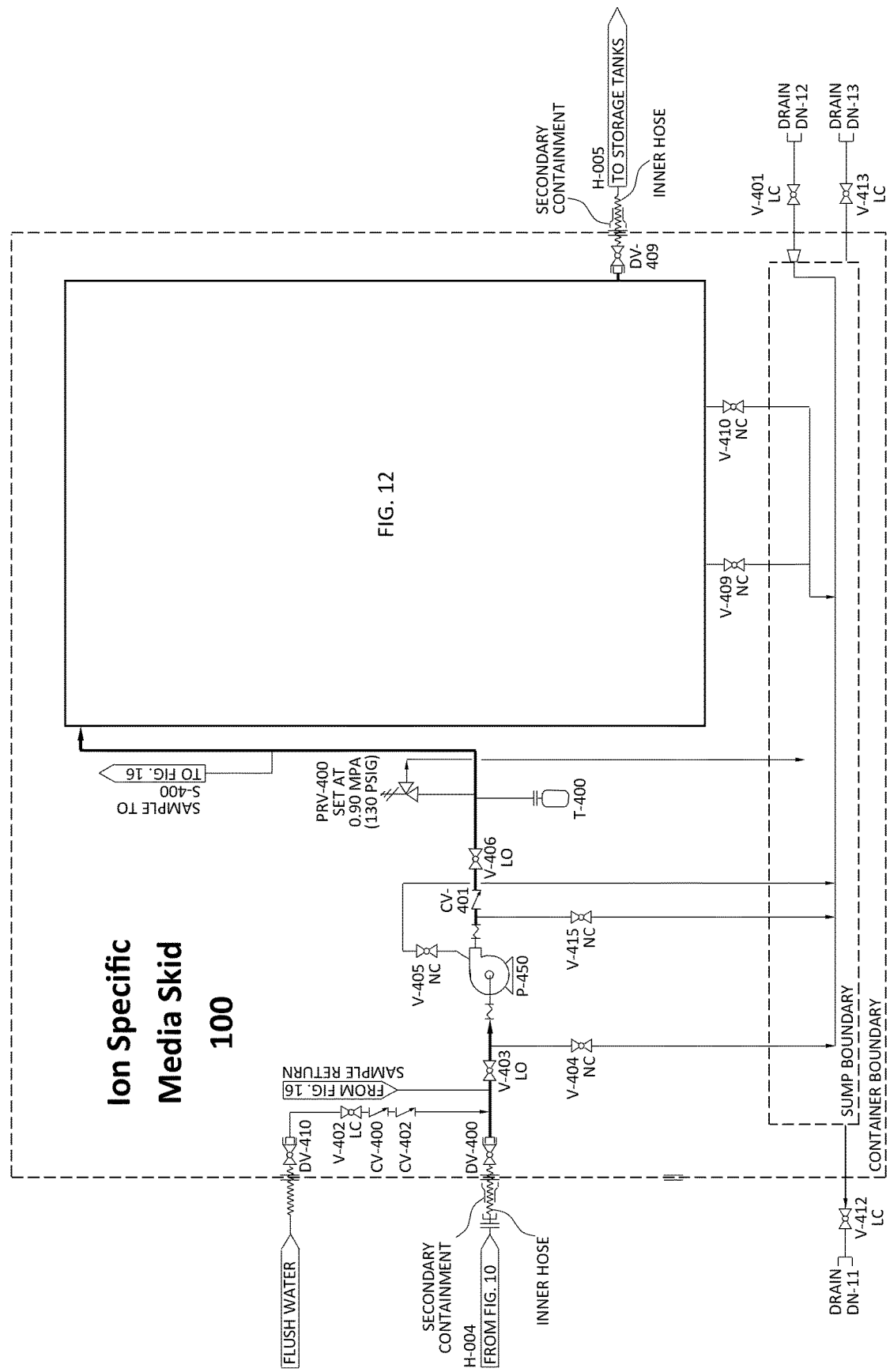
FIG. 11 is a diagram depicting the mechanical components of an example embodiment Ion Specific Media skid.
Figure 12:
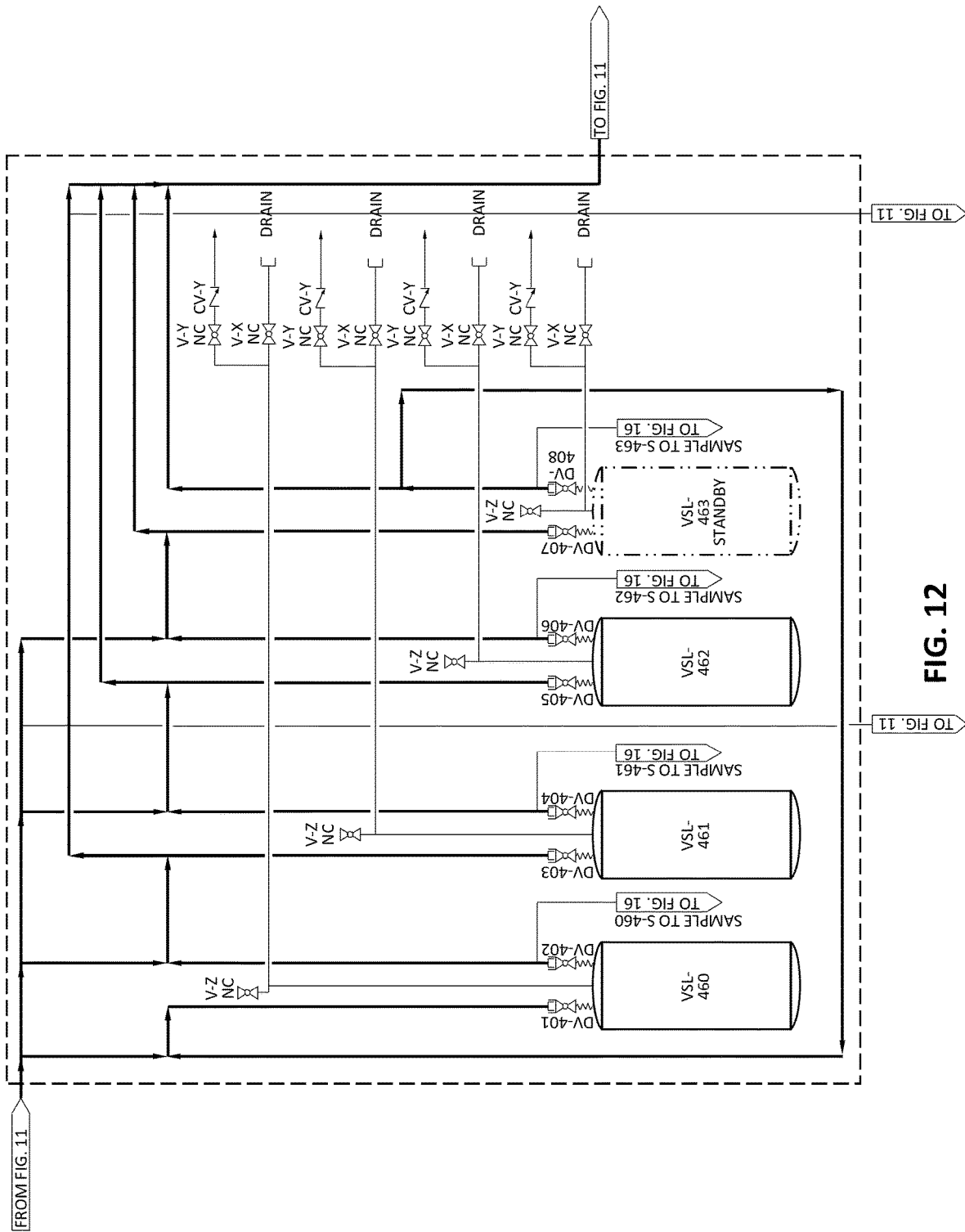
FIG. 12 is a diagram depicting the mechanical components of the Ion Specific Media vessel portion of the example embodiment Ion Specific Media skid of FIG. 11.

The Ion Specific Media skid 100, depicted in an embodiment in FIGS. 11 and 12, has two inlets. In an embodiment, at the first inlet, flush water may proceed through disconnect valve DV-410, ball valve V-402 (normally locked closed), and check valves CV-400 and CV-402. The flush water may travel along any of the paths through the system depending on which valves are open or closed.

At a second inlet, filtered process water travels via double contained transfer hose H-004 from the Ultra Filter skid 110 of FIG. 10. The filtered process water travels through disconnect valve DV-400 and through ball valve V-403 (normally locked open) to the ISM feed pump P-450. If ball valve V-404 (normally closed) is opened, filtered process water may travel to the sump. The pump P-450 has an additional outlet with ball valve V-405 (normally closed) which allows excess filtered process water to flow to the sump when it is opened. Additionally, just after the primary outlet, excess filtered process water may flow to the sump if ball valve V-415 (normally closed) is opened. Generally, the filtered process water will proceed through check valve CV-401 and ball valve V-406 (normally locked open) back to the primary piping.

The ISM feed pump P-450 is a constant speed pump, with variable speed capability, sized for transfer through the ISM vessels and for return to the storage tanks. The speed of the ISM feed pump P-450 will be adjusted manually from the control system to ensure sufficient head is available for the transfer function. Variable speed capability allows for flexibility of operation in different modes or for different transfer lengths. The pressure differential through the ISM vessels and back to the feed tanks does not generally change significantly, therefore setting the ISM feed pump P-450 at a constant speed reduces the complexity of the control system. Sufficient pressure and flow instrumentation is included to provide proportional feedback control on the ISM feed pump P-450, if desired based on operating experience.

Along the primary pipeline, before the ISM vessels, there is a pressure relief valve PRV-400 which will relieve any pressure over 0.90 MPA (130 PSIG), or any pressure deemed crucial for proper system operation. There is also a surge suppressor T-400 on a secondary line. The pressure relief valve PRV-300 dumps filtered process water to the sump when the pressure is exceeded. The filtered process water proceeds to the ISM vessels (FIG. 12). Two points in the ISM vessel pipe configuration allow for excess filtered process water to flow to the sump if ball valve V-409 (normally closed) and/or ball valve V-410 (normally closed) are open. After the filtered process water has gone through the ISM vessels it flows through a disconnect valve DV-409 and through flex hose H-005 back to the storage tanks.

In an embodiment, FIG. 12 depicts the ISM vessels on the Ion Specific Media skid 100 of FIG. 11. Generally, three of the four ISM vessels are online at one time and the fourth column is in standby or being exchanged with a fresh vessel. The standby ISM vessel is selected from the control system and the motor operated valves are automatically aligned. In one embodiment, the system is operated with three ISM vessels on line at one time (alternative day/time on line configurations may be used based on media used, conditions to be treated, and system design), after which the next ISM vessel in sequence is selected as the standby ISM vessel. The standby ISM vessel is then replaced with a fresh ISM vessel. In the depicted embodiment ISM vessel VSL-463 is in standby. The length of time each ISM vessel is in use is dependent on the particular ISM used and the targeted isotope to be removed.

Continuing with an embodiment of FIG. 12, each ISM vessel (four tanks denoted in FIG. 12 as VSL-xxx) is connected to the pipes with disconnect valves for quick removal and replacement. ISM vessel VSL-460 is connected with disconnect valves DV-401 and DV-402. ISM vessel VSL-461 is connected with disconnect valves DV-403 and DV-404. ISM vessel VSL-462 is connected with disconnect valves DV-405 and DV-406. ISM vessel VSL-463 is connected with disconnect valves DV-407 and DV-408. Each vessel is connected to ball valve V-Z (normally closed), ball valve V-Y (normally closed) followed by check valve CV-Y, and ball valve V-X (normally closed) followed by a drain.

Filtered process water is pumped into the ISM vessel system from ISM feed pump P-450. The filtered process water flows into each ISM vessel. After each ISM vessel the filtered process water flows either to the next ISM vessel or out of the ISM vessel system to FIG. 11. The flow through the ISM vessel system is heavily controlled with motor operated ball valves (depicted in FIG. 24).

FIGS. 13 through 16 are piping diagrams for example embodiment depicting Sample Enclosures for each of the skids.

Figure 13:
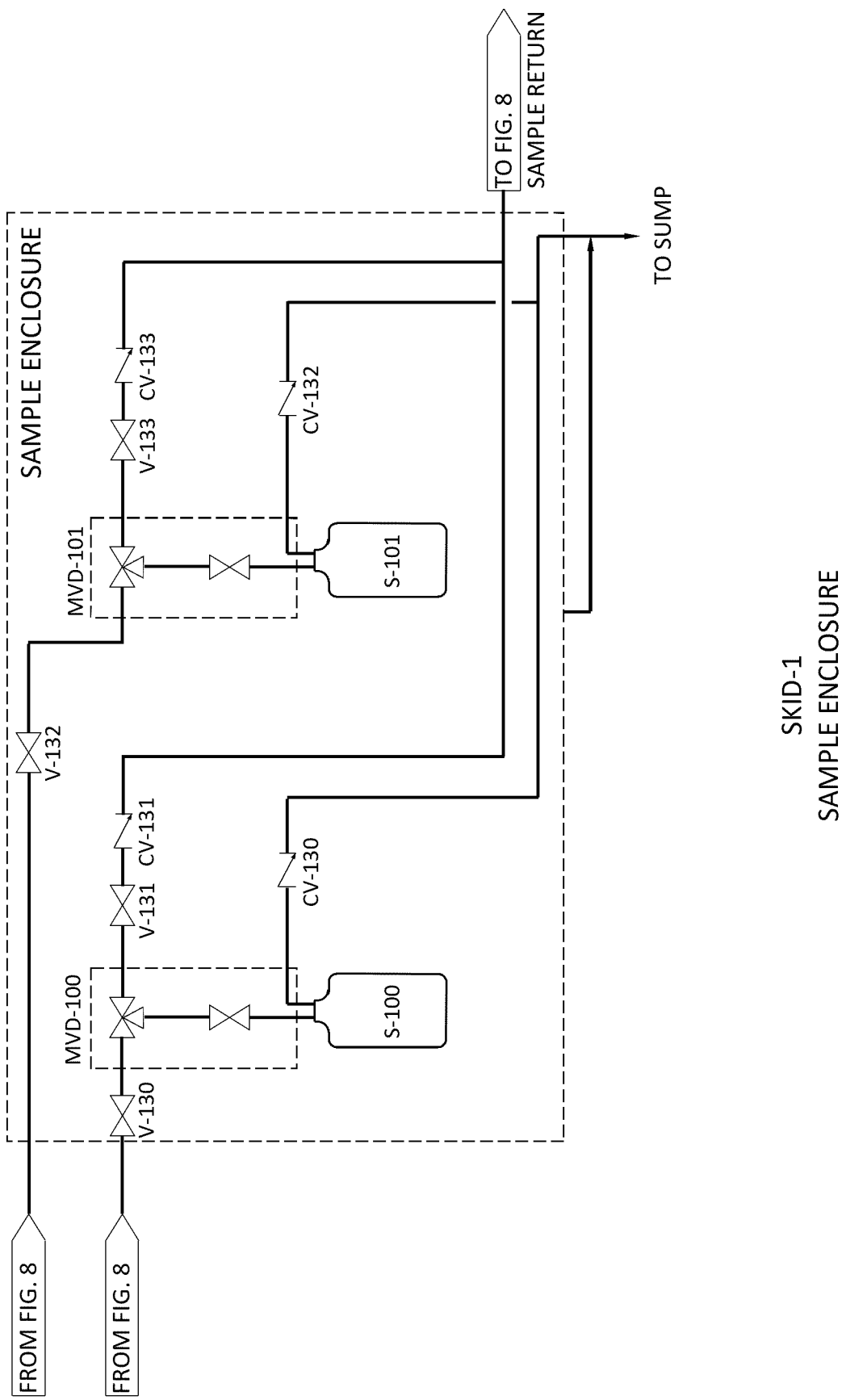
FIG. 13 is a diagram depicting the mechanical components in an example embodiment Sample Enclosure for an example Feed/Blend skid.

FIG. 13 is a diagram depicting the mechanical components in an example embodiment Sample Enclosure for an example embodiment Feed/Blend skid. In the embodiment, a first sample is taken downstream from the first feed/blend pump P-150 (of FIG. 8). The sample is sent through gate valve V-130 and through the sample valve assembly MVD-100. A portion of the sample is directed to sample port S-100 then through check valve CV-130 and finally out to the sump. The remainder of the sample is sent to a gate valve V-131, a check valve CV-131 and then returned to the primary piping just upstream of the second feed/blend tank T-101 (of FIG. 8). A second sample is taken downstream from the second feed/blend pump P-152 (of FIG. 8). Continuing with an embodiment of FIG. 13, the sample is sent through gate valve V-132 and through the sample valve assembly MVD-101. A portion of the sample is directed to sample port S-101 then through check valve CV-132 and finally out to the sump. The remainder of the sample is sent to a gate valve V-133, a check valve CV-133 and then returned to the primary piping just before the second feed/blend tank T-101.

Figure 14:
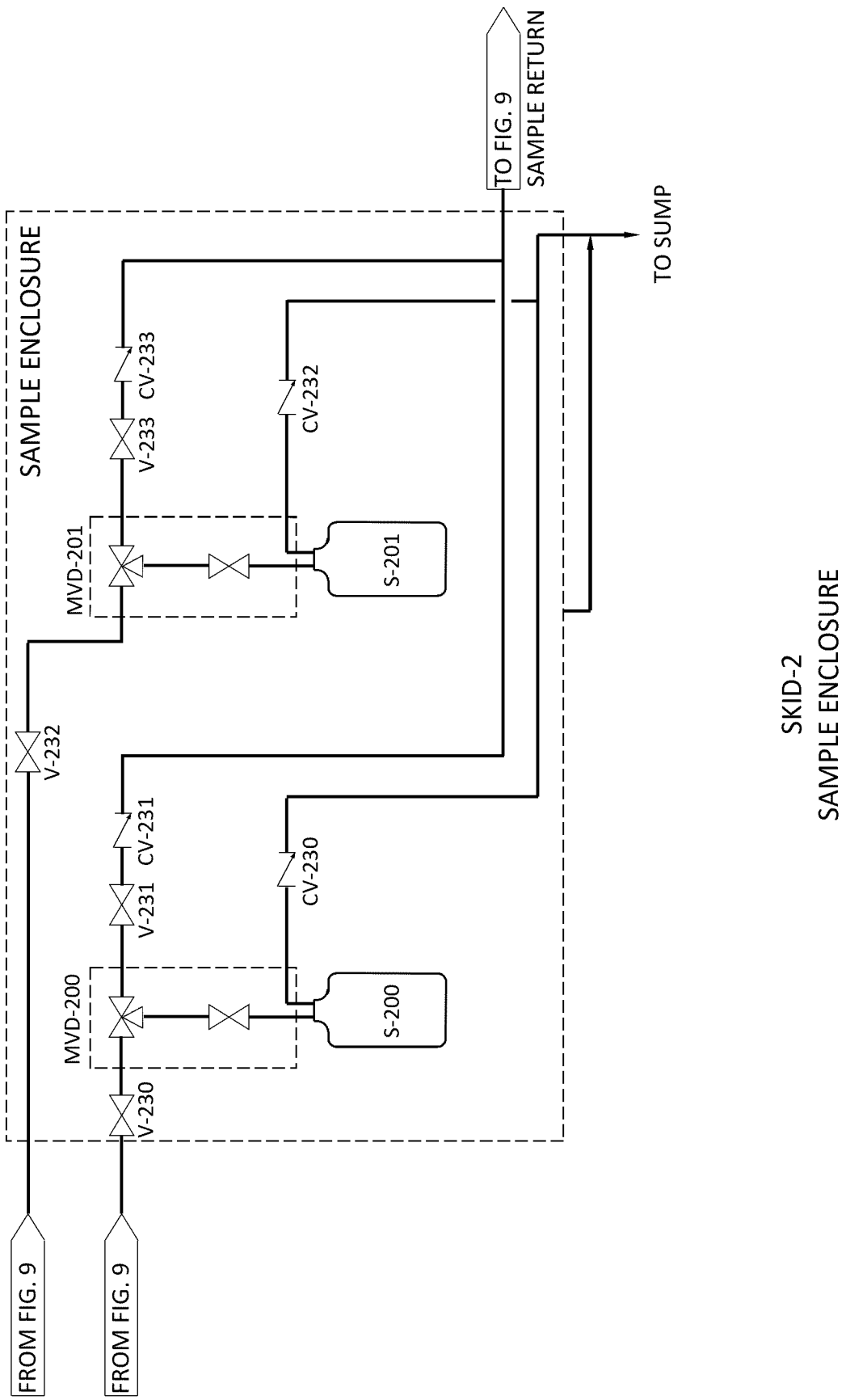
FIG. 14 is a diagram depicting the mechanical components in an example embodiment Sample Enclosure for an example embodiment Solids Removal Filter skid.

FIG. 14 is a diagram depicting the mechanical components in an example embodiment Sample Enclosure for an example embodiment Solids Removal Filter skid 120. A first sample is taken downstream of the Solids Removal Filter pump P-250 (of FIG. 9) before the filters FLT-200 and FLT-201 (both of FIG. 9). Continuing with an embodiment of FIG. 14, the sample is sent through gate valve V-230 and through the sample valve assembly MVD-200. A portion of the sample is directed to sample port S-200 then through check valve CV-230 and finally out to the sump. The remainder of the sample is sent to a gate valve V-231, a check valve CV-231 and then returned to the primary piping at the second end of the skid (depicted in an embodiment of FIG. 9). A second sample is taken just after the filters FLT-200 and FLT-201 (of FIG. 9). The sample is sent through gate valve V-232 and through the sample valve assembly MVD-201. A portion of the sample is directed to sample port S-201 then through check valve CV-232 and finally out to the sump. The remainder of the sample is sent to a gate valve V-233, a check valve CV-233 and then returned to the primary piping at the second end of the skid (depicted in an embodiment of FIG. 9).

Figure 15:
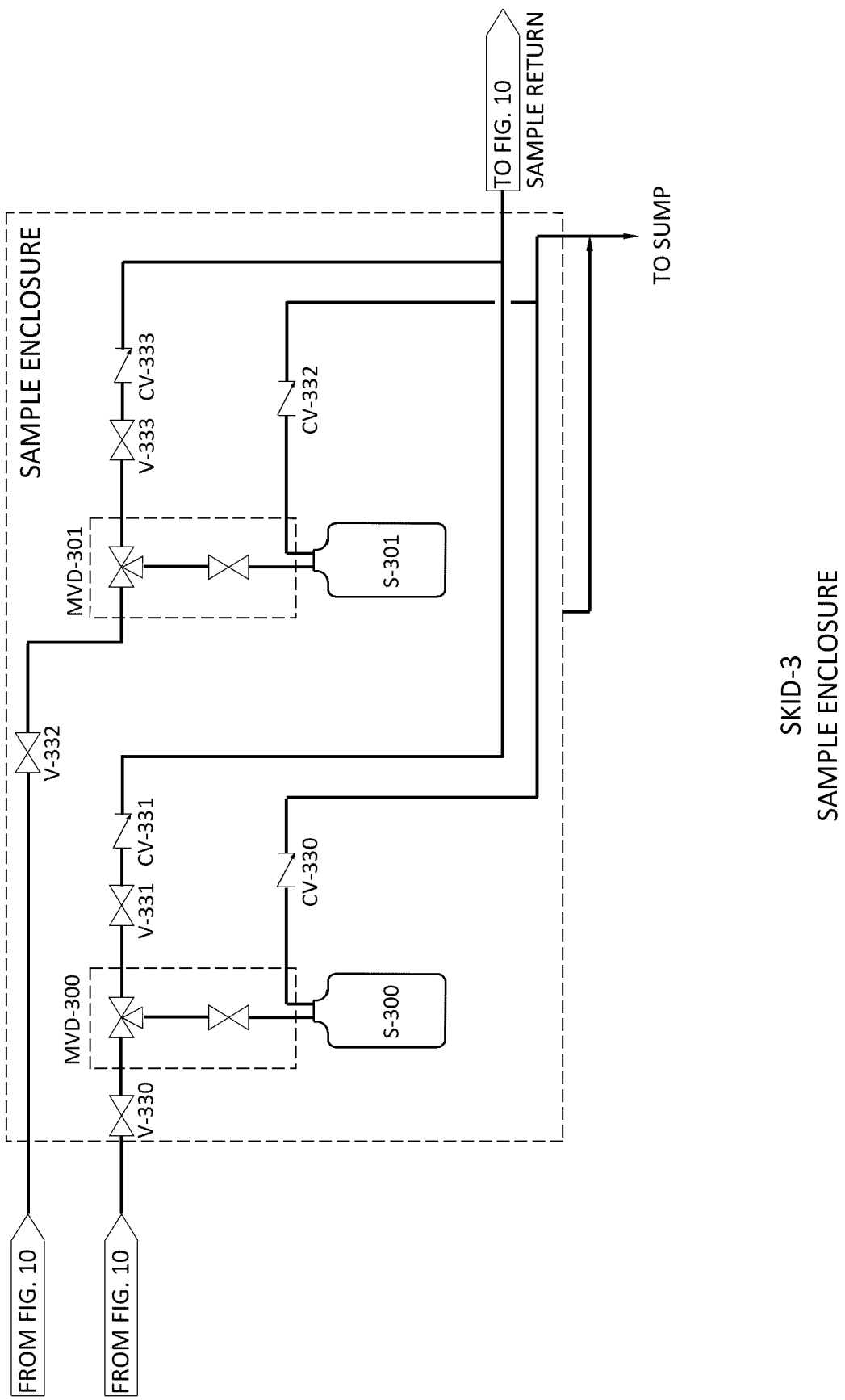
FIG. 15 is a diagram depicting the mechanical components in an example embodiment Sample Enclosure for an example Ultra Filter skid.

FIG. 15 is a diagram depicting the mechanical components in an example embodiment Sample Enclosure for an example embodiment Ultra Filter skid 110. A first sample is taken downstream of the ultra filter pump P-350 before the filters FLT-300 and FLT-301 (of FIG. 10). The sample is sent through gate valve V-330 and through the sample valve assembly MVD-300. A portion of the sample is directed to sample port S-300 then through check valve CV-330 and finally out to the sump. The remainder of the sample is sent to a gate valve V-331, a check valve CV-331 and then returned to the primary piping at the second end of the skid (depicted in an embodiment of FIG. 10). A second sample is taken just downstream of the filters FLT-300 and FLT-301 (of FIG. 10). The sample is sent through gate valve V-332 and through the sample valve assembly MVD-301. A portion of the sample is directed to sample port S-301 then through check valve CV-332 and finally out to the sump. The remainder of the sample is sent to a gate valve V-333, a check valve CV-333 and then returned to the primary piping at the second end of the skid (depicted in FIG. 10).

Figure 16:
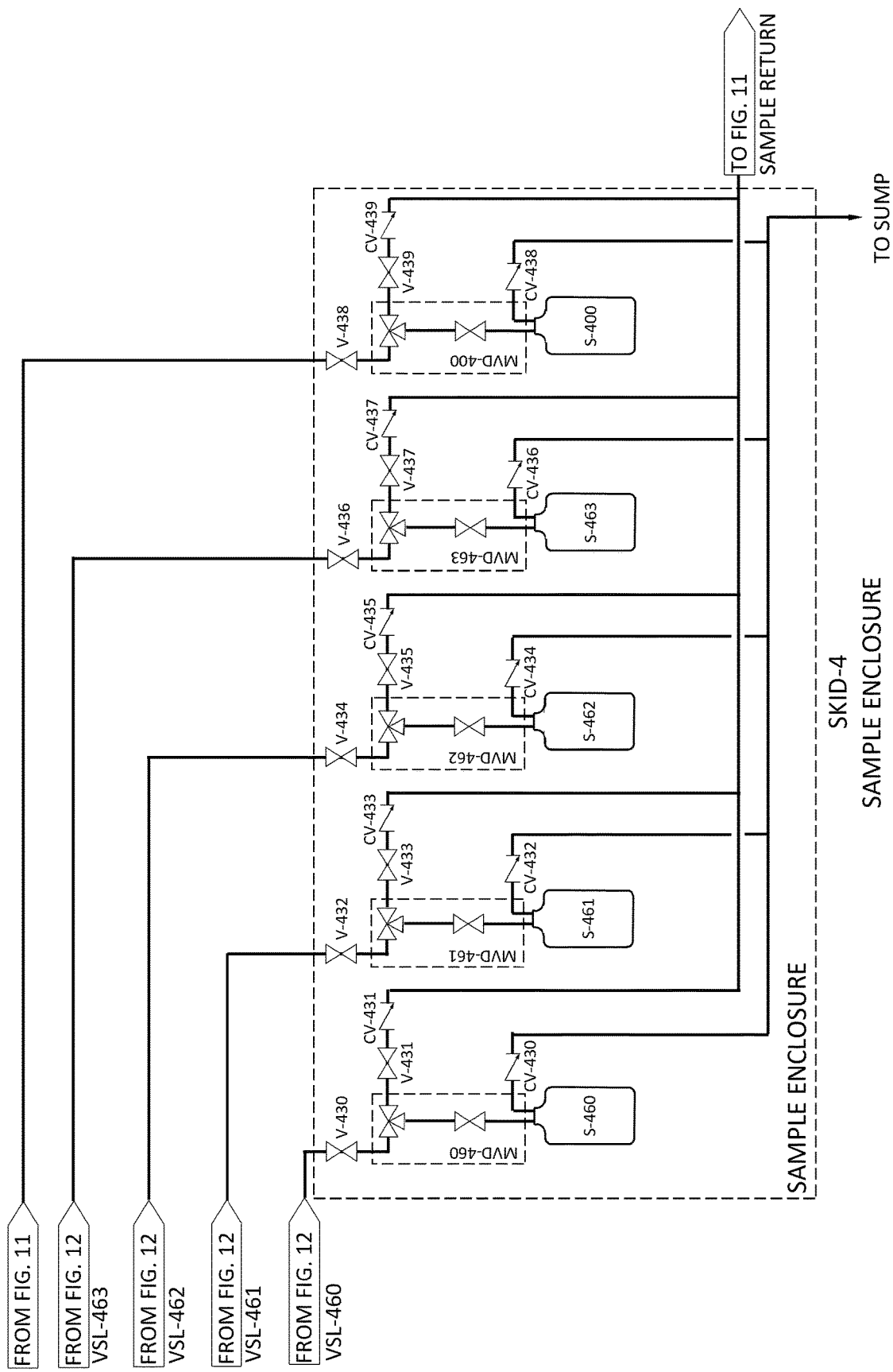
FIG. 16 is a diagram depicting the mechanical components in an example embodiment Sample Enclosure for an example embodiment Ion Specific Media skid.

FIG. 16 is an example embodiment piping diagram for the Sample Enclosure for the Ion Specific Media skid 100. A sample is taken just before entering the ISM vessel assembly of FIG. 12. This sample is sent through gate valve V-438 and through the sample valve assembly MVD-400. A portion of the sample is directed to sample port S-400 then through check valve CV-438 and finally out to the sump. The remainder of the sample is sent to a gate valve V-439, a check valve CV-439 and then returned to the primary piping at the first end of the skid (depicted in FIG. 11). Additional samples are taken just downstream of each ISM vessel (depicted in FIG. 12).

Continuing with an embodiment of FIG. 16, the sample from ISM vessel VSL-460 (of FIG. 12) is sent through gate valve V-430 to sample valve assembly MVD-460. A portion of the sample is directed to sample port S-460 then through check valve CV-430 and finally out to the sump. The remainder of the sample is sent to a gate valve V-431, a check valve CV-431 and then returned to the primary piping at the first end of the skid (depicted in FIG. 11). The sample from ISM vessel VSL-461 (of FIG. 12) is sent through gate valve V-432 to sample valve assembly MVD-461. A portion of the sample is directed to sample port S-461 then through check valve CV-432 and finally out to the sump. The remainder of the sample is sent to a gate valve V-433, a check valve CV-433 and then returned to the primary piping at the first end of the skid (depicted in FIG. 11). The sample from ISM vessel VSL-462 (of FIG. 12) is sent through gate valve V-434 to sample valve assembly MVD-462. A portion of the sample is directed to sample port S-462 then through check valve CV-434 and finally out to the sump. The remainder of the sample is sent to a gate valve V-435, a check valve CV-435 and then returned to the primary piping at the first end of the skid (depicted in FIG. 11). The sample from ISM vessel VSL-463 is sent through gate valve V-436 to sample valve assembly MVD-463. A portion of the sample is directed to sample port S-463 then through check valve CV-436 and finally out to the sump. The remainder of the sample is sent to a gate valve V-437, a check valve CV-437 and then returned to the primary piping at the first end of the skid (depicted in FIG. 11).

Controls/Instrumentation

In an embodiment, the Control and Solids Feed skid 140 (FIGS. 7 and 19) houses the control system. This system utilizes an Allen-Bradley, or comparable, Compact Logix Programmable Logic Controller (PLC) to provide process logic for the entire system. The touchscreen HMI mounted to the face of the control panel provides access to the entire control system. However, the advanced logic allows a very simple start and stop to the process. This system provides both the local interface for monitoring and control operations at the control skid and also a remote control room interface for monitoring only. In addition to skid operational controls and interlocks, the control system provides data recording and reporting, radiation detection monitoring, and video camera monitoring for each skid. Operational space for the controls require one half of the available space of the physical skid. The other half houses the solids feed system as depicted in FIG. 7. In the depicted embodiment, the Control Skid is combined with the Solids Feed Skid to form the Control and Solids Feed Skid 140. In some embodiments, the Control Skid and the Solids Feed Skid are separate. Control may occur entirely on site, remotely, or both. On-site control may occur entirely within a Control Skid, within a combined Control and Solids Feed Skid 140, or it may be augmented with either remote control from a remotely located control station or from mobile devices such as smart phones, tablets, and laptop computers.

General Instrumentation

Figure 17:
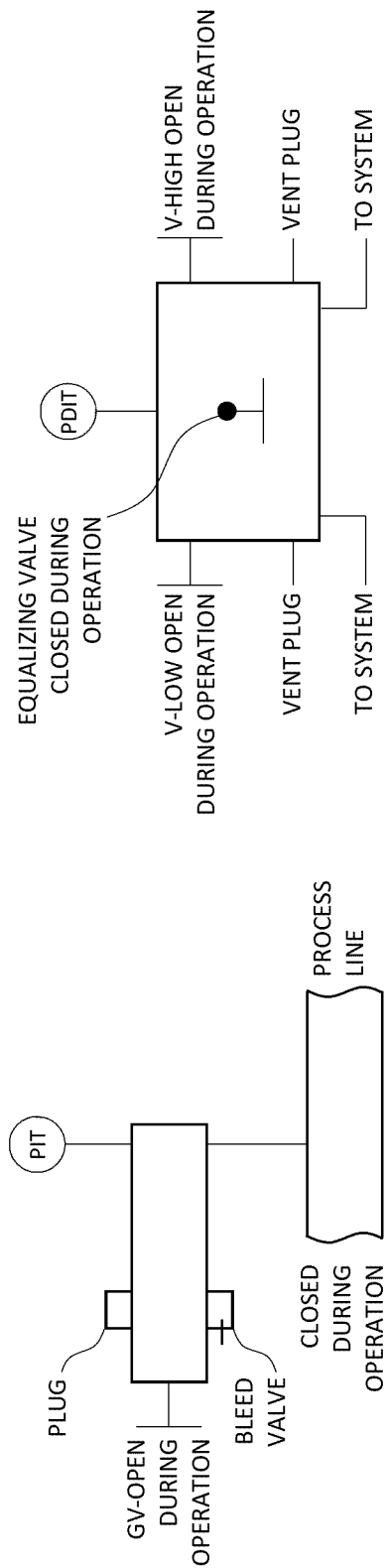
FIG. 17 depicts a typical gauge valve and PDIT manifold.

FIG. 17 depicts a typical gauge valve and pressure differential indicating transmitter (PDIT) manifold.

FIG. 18 is a legend describing instrumentation symbols. Instrument interlocks are used to prevent operators and/or machinery from being harmed in the event of a leak or other failure. Interlock 1 I1 shuts down all pumps on leak detection, interlock 2 I2 shuts down pumps on high level, interlock 3 I3 shuts down pumps on low level, and interlock I4 de-energizes the associated valve on leak detection. Circles indicate field-mounted instruments and circles within squares indicate computer dialog or control elements. A dashed line indicates an electrical or control signal. Each instrument is labeled with a two or three digit abbreviation and a three digit number. The abbreviations used are listed in the figure.

FIGS. 19 through 24 show example instrumentation for the five example skids.

Sump Instrumentation

In an embodiment, every skid has a sump and every sump has at least one leak detection transmitter which transmits to a leak detection alarm in the event a leak is detected. Each leak detection data line has at least one interlock. In an embodiment, the Control and Solids Feed skid 140 (FIG. 19) has one leak detection transmitter LDT-500 which is connected to leak detection alarm LDA-500 equipped with interlock I1. The Feed/Blend skid 130 (FIG. 20) has two leak detection transmitters LDT-100 and LDT-101 which are connected to leak detection alarms LDA-100 and LDA-101, respectively, both equipped with interlocks I1 and I4. In an embodiment, the Solids Removal Filter skid 120 (FIG. 21) has two leak detection transmitters LDT-200 and LDT-201 which are connected to leak detection alarms LDA-200 and LDA-201, respectively, both equipped with interlocks I1 and I4. The Ultra Filter skid 110 (FIG. 22) has two leak detection transmitters LDT-300 and LDT-301 which are connected to leak detection alarms LDA-300 and LDA-301, respectively, both equipped with interlocks I1 and I4. The Ion Specific Media skid 100 (FIGS. 23-24) has two leak detection transmitters LDT-400 and LDT-401 which are connected to leak detection alarms LDA-400 and LDA-401, respectively, both equipped with interlocks I1 and I4.

Environmental Monitoring Instrumentation

In an embodiment, every skid is also equipped with at least one temperature transmitter and at least one radiation detection transmitter. The Control and Solids Feed skid 140 (FIG. 19) uses a temperature transmitter TT-502 in the solids loading room to transmit the ambient temperature to a hand indicator HI-502, moisture indicator MI-502, and temperature indicator TI-502. A radiation detection transmitter RDT-510 is used in the control room to transmit radiation levels to a radiation indicator RI-510. The Feed/Blend skid 130 (FIG. 20) has a temperature transmitter TT-102 that transmits ambient skid temperature data to temperature indicator TI-102 and moisture indicator MI-102. Radiation levels are monitored by radiation detection transmitter RDT-110 and transmitted to radiation indicator RI-110.

In an embodiment, the Solids Removal Filter skid 120 (FIG. 21) has a temperature transmitter TT-202 that transmits ambient skid temperature data to temperature indicator TI-202 and moisture indicator MI-202. Skid radiation levels are monitored by radiation detection transmitter RDT-210 and transmitted to radiation indicator RI-210. Additionally, radiation levels are monitored by radiation detection transmitters RDT-200 and RDT-201 which are placed in proximity to filters FLT-200 and FLT-201, respectively. Radiations levels are transmitted to radiation indicators RI-200 and RI-201, respectively.

In an embodiment, the Ultra Filter skid 110 (FIG. 22) has a temperature transmitter TT-302 that transmits ambient skid temperature data to temperature indicator TI-302 and moisture indicator MI-302. Skid radiation levels are monitored by radiation detection transmitter RDT-310 and transmitted to radiation indicator RI-310. Additionally, radiation levels are monitored by radiation detection transmitters RDT-300 and RDT-301 which are placed in proximity to filters FLT-300 and FLT-301, respectively. Radiations levels are transmitted to radiation indicators RI-300 and RI-301, respectively.

In an embodiment, ambient skid temperature for the Ion Specific Media skid 100 (FIGS. 23-24) is sensed by temperature transmitter TT-402 and sent to moisture indicator MI-402 and temperature indicator TI-402. A radiation detecting transmitter RDT-460, RDT-461, RDT-462, and RDT-463 is placed in proximity to each ISM vessel. Each radiation detecting transmitter is connected to a corresponding radiation indicator RI-460, RI-461, RI-462, and RI-463.

Flow Controls

In an embodiment, all of the skids except the Control and Solids Feed skid 140 (FIG. 19) have motor operated ball valves for regulating flow into and out of the skid, as well as within the skid.

In an embodiment, the Feed/Blend skid 130 (FIG. 20) has motor operated ball valve MOV-100 (fails closed), equipped with interlock I4, at the first end of the skid at the water feed point controlled by event controller YC-100. Flow out of the skid is regulated by motor operated ball valve MOV-101 (fails as-is) which is controlled by event controller YC-101. A motor operated butterfly valve MOV-102 serves as a vacuum break when delivery of the sorbent material is discontinued. This valve is normally closed during operation and fails in position. When the absorbent material flow is stopped, MOV-102 is opened to break the vacuum and prevent any further material from being drawn into the system. MOV-102 is controlled by event controller YC-102.

Figure 20:
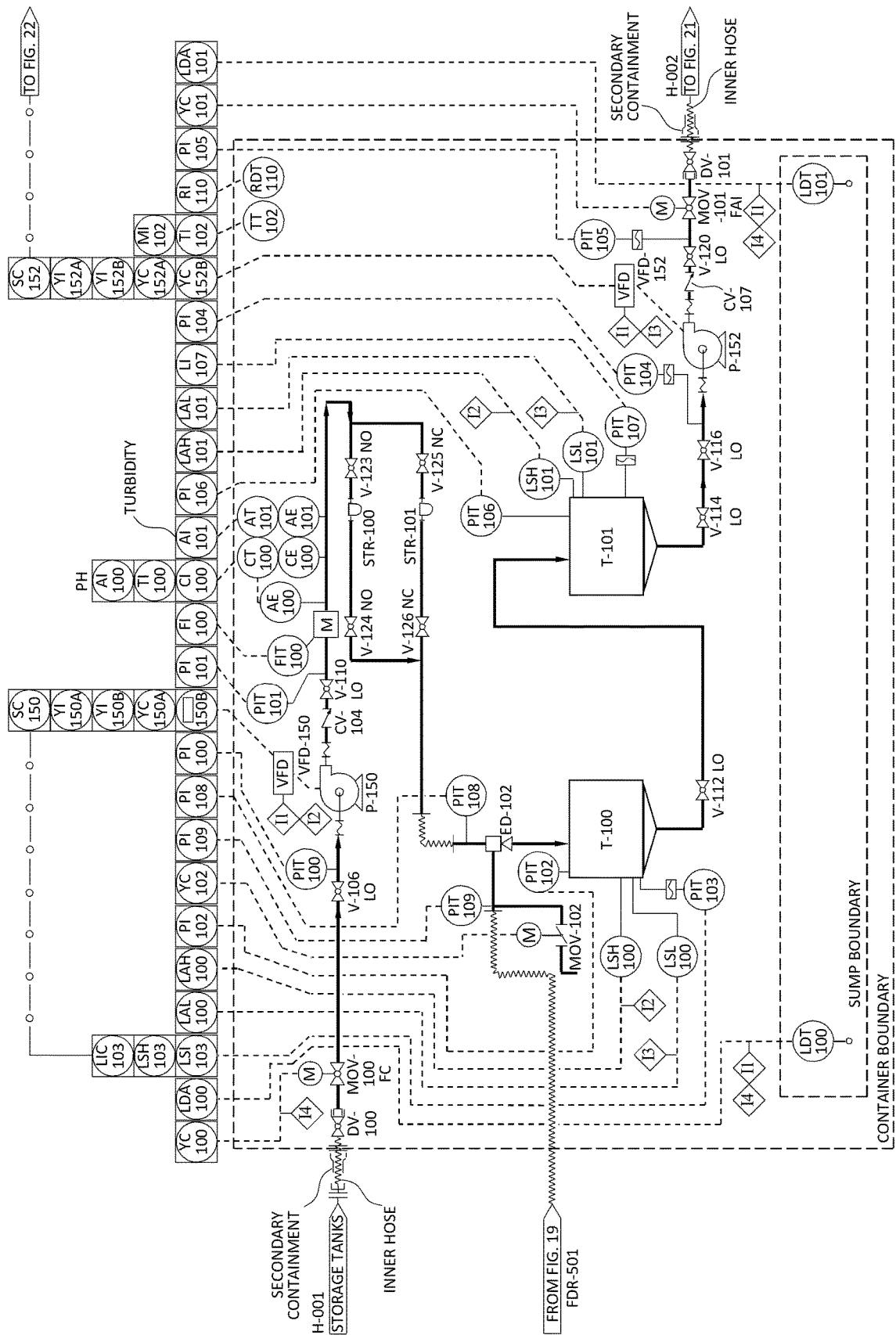
FIG. 20 is a diagram depicting instrumentation and control of an example embodiment Feed/Blend skid.

In an embodiment, the Solids Removal Filter skid 120 (FIG. 21) has motor operated ball valve MOV-200 (fails as-is), controlled by event controller YC-200, at the inlet of the skid to regulate incoming flow from the Feed/Blend skid 130 (FIG. 20). Flow out of the skid is regulated by motor operated ball valve MOV-203 (fails as-is) which is controlled by event controller YC-203. Motor operated ball valves MOV-201 and MOV-202 (both fail as-is) are used to regulate the flow before each filter FLT-200 and FLT-201, respectively. Motor operated ball valves MOV-201 and MOV-202 are controlled by event controllers YC-201 and YC-202, respectively.

Figure 21:
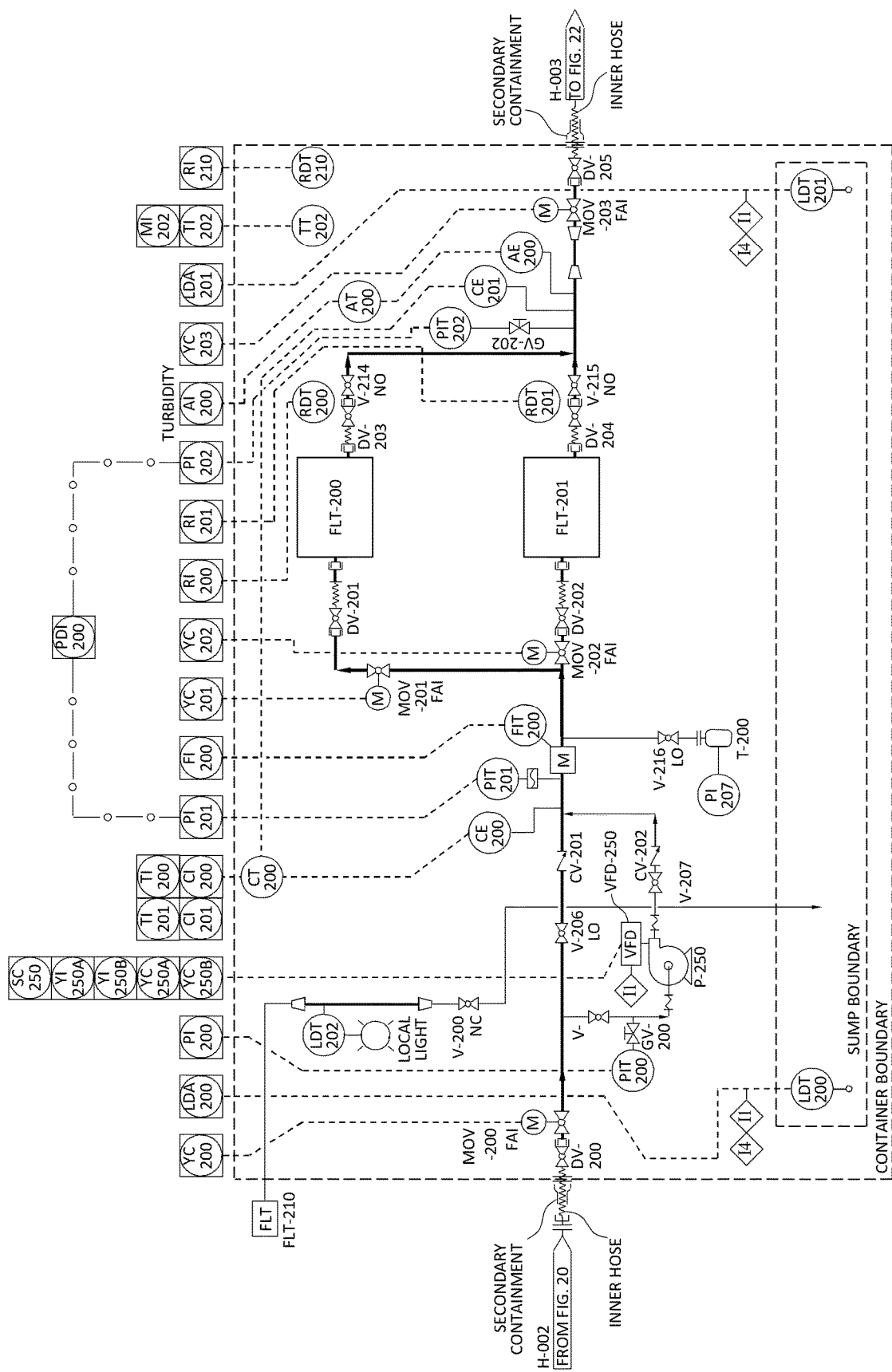
FIG. 21 is a diagram depicting instrumentation and control of an example embodiment Solids Removal Filter skid.

In an embodiment, the Ultra Filter skid 110 (FIG. 22) has motor operated ball valve MOV-300 (fails as-is), controlled by event controller YC-300, at the inlet of the skid to regulate incoming flow from the Solids Removal Filter skid (FIG. 21). Flow out of the skid is regulated by motor operated ball valve MOV-303 (fails as-is) which is controlled by event controller YC-303. Motor operated ball valves MOV-301 and MOV-302 (both fail as-is) are used to regulate the flow before each filter FLT-300 and FLT-301, respectively. Motor operated ball valves MOV-301 and MOV-302 are controlled by event controllers YC-301 and YC-302, respectively.

Figure 22:
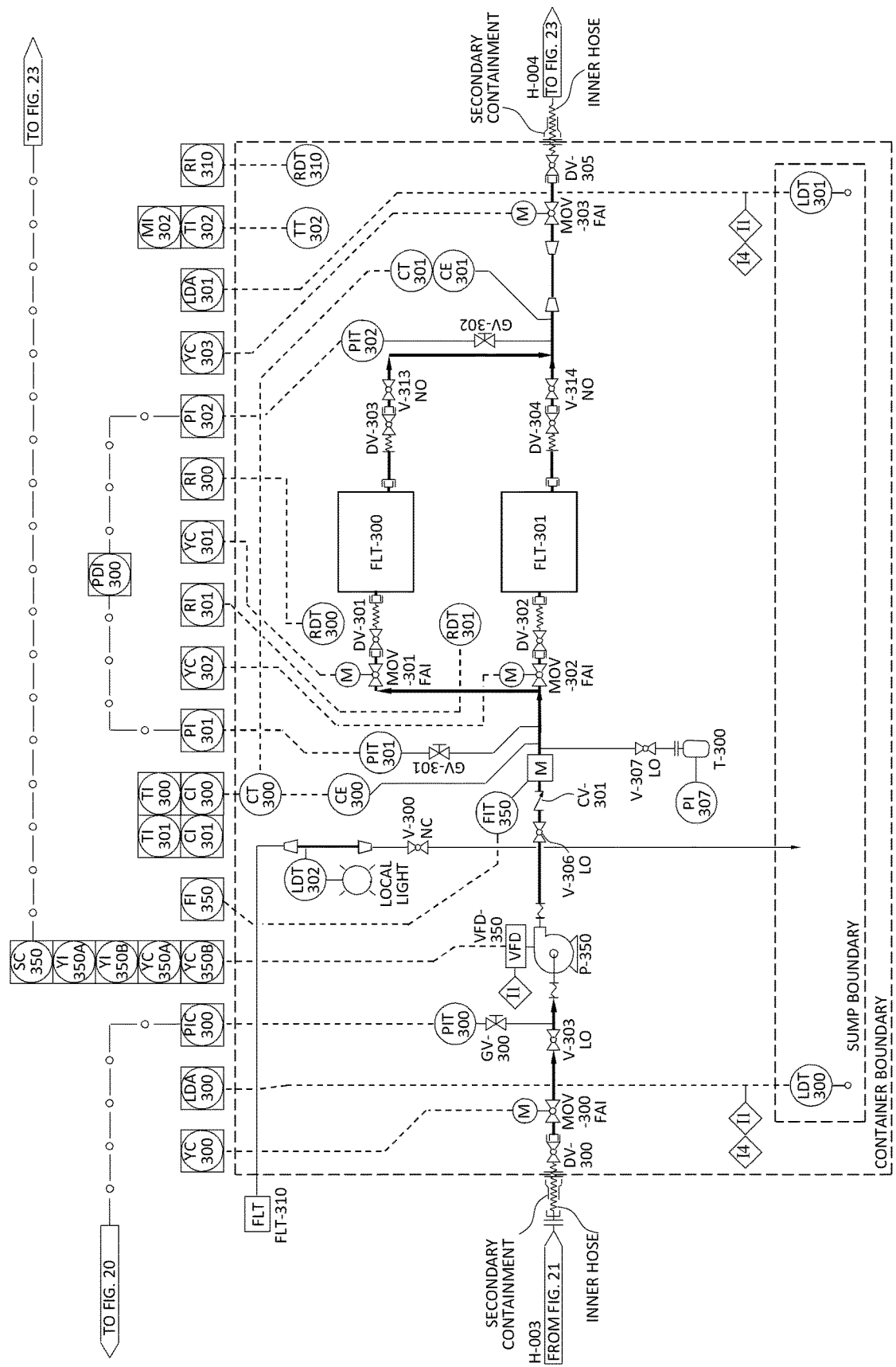
FIG. 22 is a diagram depicting instrumentation and control of an example embodiment Ultra Filter skid.

In an embodiment, the Ion Specific Media skid (FIGS. 23-24) has motor operated ball valve MOV-400 (fails as-is), controlled by event controller YC-400, at the inlet of the skid to regulate incoming flow from the Ultra Filter skid (FIG. 22). Motor operated ball valves MOV-401 through MOV-421 (all fail as-is) are positioned throughout the ISM vessel system as shown. Each motor operated ball valve is controlled with an event controller YC-401 through YC-421 where the motor operated ball valve and event controller share identification numbers. Motor operated ball valve MOV-422 (fails as-is), controlled by event controller YC-422, is used to regulate flow leaving the skid.

In an embodiment, downstream from the first pump on each skid a magnetic flow meter is used to monitor flow out of the pump. In the Feed Blend skid 130 (FIG. 20) the magnetic flow meter is connected to a flow indicating transmitter FIT-100 which is further connected to a flow indicator FI-100. In the Solids Removal Filter skid 120 (FIG. 21) the magnetic flow meter is connected to a flow indicating transmitter FIT-200 which is further connected to a flow indicator FI-200. In the Ultra Filter skid 110 (FIG. 22) the magnetic flow meter is connected to a flow indicating transmitter FIT-350 which is further connected to a flow indicator FI-350. In the Ion Specific Media skid 100 (FIGS. 23-24) the magnetic flow meter is connected to a flow indicating transmitter FIT-400 which is further connected to a flow indicator FI-400, which is connected via data link to speed controller SC-450.

Pressure Indicators and Controls

In an embodiment, pressure is monitored at critical points in all of the skids.

In the Feed/Blend skid 130 (FIG. 20) the pressure in the feed/blend tanks T-100 and T-101 is monitored by pressure indicating transmitters PIT-102 and PIT-106, respectively. PIT-102 and PIT-106 are connected to pressure indicators PI-102 and PI-106, respectively. Pressure is monitored just before the eductor ED-102 at both inputs with pressure indicating transmitters PIT-108 and PIT-109 which are connected to pressure indicators PI-108 and PI-109, respectively. Pressure is monitored upstream and downstream of the first feed/blend pump P-150 by pressure indicating transmitters PIT-100 and PIT-101 which are connected to pressure indicators PI-100 and PI-101, respectively. Pressure is monitored upstream and downstream of the second feed/blend pump P-152 by pressure indicating transmitters PIT-104 and PIT-105, both connected to diaphragms, which are connected to pressure indicators PI-104 and PI-105, respectively.

In the Solids Removal Filter skid 120 (FIG. 21) the pressure upstream of the solids removal filter pump P-250 is monitored by pressure indicating transmitter PIT-200, connected to gauge valve GV-200. PIT-200 is connected to pressure indicator PI-200. Pressure is monitored both upstream and downstream of the filters by pressure indicating transmitters PIT-201, connected to a diaphragm, and PIT-202, connected to gauge valve GV-202. PIT-201 and PIT-202 are connected to pressure indicators PI-201 and PI-202, respectively. PI-201 and PI-202 are both connected via data link to pressure differential indicator PDI-200. Additionally, pressure is monitored at the surge suppressor by pressure indicator PI-207.

In the Ultra Filter skid 110 (FIG. 22) pressure is monitored just before the ultra filter pump P-350 using pressure indicating transmitter PIT-300, connected to gauge valve GV-300. PIT-300 is connected to pressure indicating controller PIC-300 which is further connected by data link to the second feed/blend pump P-152 (FIG. 20) controls. Pressure is monitored both upstream and downstream of the filters by pressure indicating transmitters PIT-301, connected to gauge valve GV-301, and PIT-302, connected to gauge valve GV-302. PIT-301 and PIT-302 are connected to pressure indicators PI-301 and PI-302, respectively. PI-301 and PI-302 are both connected via data link to pressure differential indicator PDI-300. Additionally, pressure is monitored at the surge suppressor by pressure indicator PI-307.

In the Ion Specific Media skid 100 (FIGS. 23-24) pressure is indicated both before and after the ISM feed pump P-450. Before the ISM feed pump P-450, pressure indicating transmitter PIT-400, connected to gauge valve GV-400 is connected to pressure indicating controller PIC-400 which is connected via a data link to ultra filter feed pump P-350 controls. After the ISM feed pump P-450, pressure indicating transmitter PIT-401 connected to gauge valve GV-401, is connected to pressure indicator PI-401. A pressure indicator PI-407 is connected to surge suppressor T-400. Four pressure differential indicating transmitters PDIT-400, PDIT-401, PDIT-402, and PDIT-403 are situated between the inlet and outlet of each ISM vessel. PDIT-400, PDIT-401, PDIT-402, and PDIT-403 are connected to pressure differential indicators PDI-400, PDI-401, PDI-402, and PDI-403, respectively. A pressure indicating transmitter PIT-402 is located just before motor operated ball valve MOV-422 and is connected to a pressure indicator PI-402.

Pump Controls

In an embodiment, the Feed/Blend skid 130 (FIG. 20) has two pumps. The first feed/blend pump P-150 is connected to variable frequency drive VFD-150, equipped with interlocks I1 and I2. Variable frequency drive VFD-150 is connected to event controllers YC-150A and YC-150B, event indicators YI-150A and YI-150B, and speed controller SC-150. The first feed/blend pump P-150 controls are connected via data link to the level controls of the first feed/blend tank T-100. The level in the first feed/blend tank T-100 will be automatically controlled through modulation of the speed of the first feed/blend pump P-150. The level in the first feed/blend tank T-100 is controlled so the inlet feed flow will match the outlet flow.

The second feed/blend pump P-152 is connected to variable frequency drive VFD-152, equipped with interlocks I1 and I3. Variable frequency drive VFD-152 is connected to event controllers YC-152A and YC-152B, event indicators YI-152A and YI-152B, and speed controller SC-152. The second feed/blend pump P-152 controls are connected via data link to the pressure indicating controller PIC-300 (FIG. 22) that indicates and controls pressure just upstream of the ultra filter pump P-350 (FIG. 22).

In an embodiment, the speed of the second feed/blend pump P-152 is modulated to maintain a constant pressure at the inlet to the ultra filter pump P-350 (FIG. 22). As the solids removal filter is loaded, its differential pressure will increase and the speed of the second feed/blend pump P-152 will increase accordingly to maintain a constant pressure downstream of the solids removal filter. By maintaining a constant pressure at the inlet to ultra filter pump P-350 (FIG. 22), the flow through the solids removal filter must match the flow rate of ultra filter pump P-350 (FIG. 22). This also ensures positive pressure is maintained on the suction side of ultra filter pump P-350 (FIG. 22).

In an embodiment, within the Solids Removal Filter skid 120 (FIG. 21) the solids removal filter pump P-250 will generally be bypassed. Solids removal filter pump P-250 is connected to variable frequency drive VFD-250, equipped with interlock I1. Variable frequency drive VFD-250 is connected to event controllers YC-250A and YC-250B, event indicators YI-250A and YI-250B, and speed controller SC-250.

Figure 23:
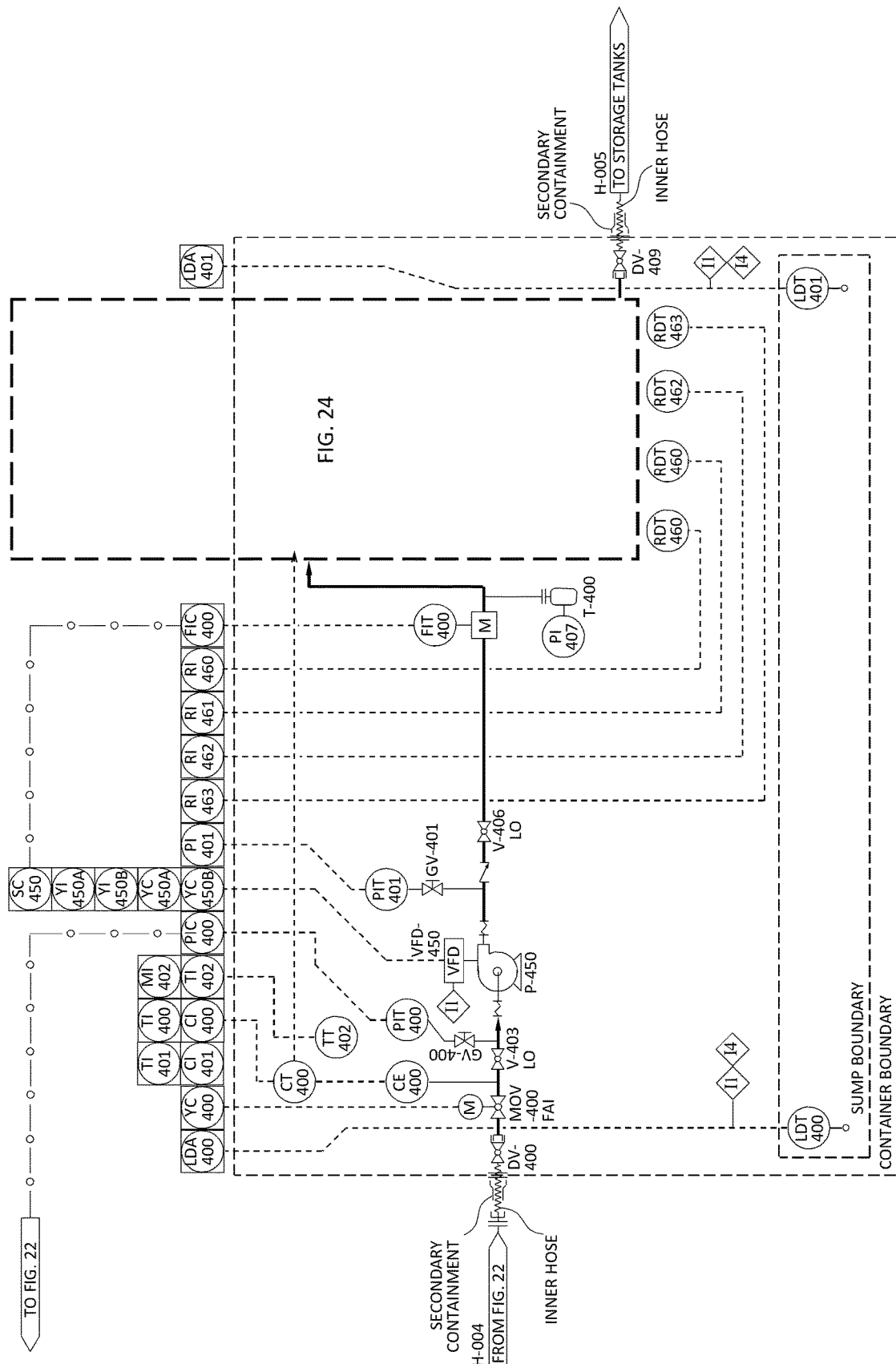
FIG. 23 is a diagram depicting instrumentation and control of an example embodiment Ion Specific Media skid.

In an embodiment, the Ultra Filter skid 110 (FIG. 22) the ultra filter pump P-350 is connected to variable frequency drive VFD-350, equipped with interlock I1. Variable frequency drive VFD-350 is connected to event controllers YC-350A and YC-350B, event indicators YI-350A and YI-350B, and speed controller SC-350. The ultra filter pump controls P-350 are connected via data link to the pressure indicating controller PIC-400 (FIG. 23) that indicates and controls pressure just upstream of the ISM feed pump P-450 (FIG. 23). The speed of the ultra filter pump P-350 will be modulated to maintain a constant flow through the ultra filters FLT-300 and FLT-301 using a magnetic flow meter. As the filter is loaded and the trans-membrane pressure increases, the ultra filter pump P-350 speed will increase in order to maintain the flow rate set point. Ultra filter pump P-350 will be sized to ensure positive pressure is maintained at the inlet to the ISM feed pump P-450 (FIG. 23).

In an embodiment, within the Ion Specific Media skid 100 (FIGS. 23-24) the ISM feed pump P-450 is connected to variable frequency drive VFD-450, equipped with interlock I1. Variable frequency drive VFD-450 is connected to event controllers YC-450A and YC-450B, event indicators YI-450A and YI-450B, and speed controller SC-450. The ISM feed pump P-450 is a constant speed pump, with variable speed capability, sized for transfer through the ISM vessels and for return to the storage tanks. The speed of the ISM feed pump P-450 will be adjusted manually from the control system to ensure sufficient head is available for the transfer duty. Variable speed capability allows for flexibility of operation in different modes or for different transfer lengths. The pressure differential through the ISM vessels and back to the feed tanks does not generally change significantly, therefore setting this pump at a constant speed reduces the complexity of the control system. Sufficient pressure and flow instrumentation is included to provide proportional feedback control on ISM feed pump P-450, if desired based on operating experience.

Other Instrumentation

Figure 19:
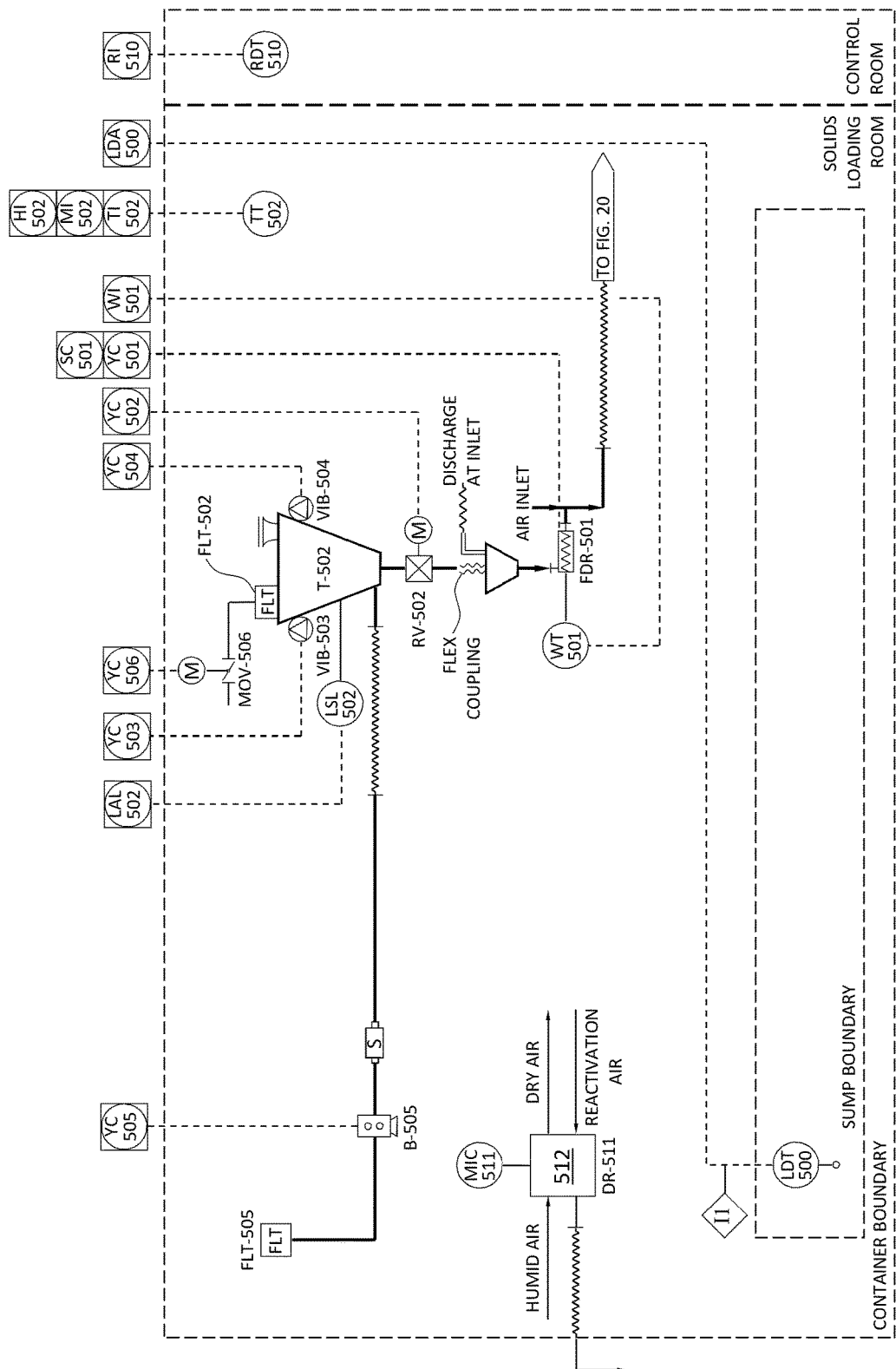
FIG. 19 is a diagram depicting instrumentation and control of an example embodiment Control and Solids Feed skid.

FIG. 19 is a diagram depicting instrumentation of an example embodiment Control and Solids Feed skid 140. The ventilation or climate control system 512 is monitored and controlled by a moisture indicator/controller MIC-511. The blower B-505 is controlled by event controller YC-505. The mass of the powdered sorbent or ion exchange material in the solids feeder FDR-501 is monitored by weight transmitter WT-501 and indicated by weight indicator WI-501. A level switch low LSL-502 is used in the hopper T-502 to transmit the status to a level alarm indicator LAL-502 when the amount of sorbent in the hopper T-502 is too low. Event controllers YC-503 and YC-504 are used to control the mechanical vibrators VIB-503 and VIB-504, respectively. Event controller YC-506 is used to control the rate of feed of the sorbent through a motor operated butterfly valve MOV-506 into the hopper T-502. Event controller YC-502 is used to control the motorized rotary valve RV-502 between the hopper T-502 and the solids feeder FDR-501 to regulate the rate of feed of the sorbent. Speed controller SC-501 and event controller YC-501 control the rate of the solids feeder FDR-501.

FIG. 20 is a diagram depicting instrumentation of an example embodiment Feed/Blend skid 130. Both feed/blend tanks are monitored for fill level. Each of the feed/blend tanks T-100 and T-101 has a level switch high LSH-100 and LSH-101 (respectively), equipped with interlock I2, and a level switch low LSL-100 and LSL-101 (respectively), equipped with interlock I3. Level switches high LSH-100 and LSH-101 are connected to level alarms high LAH-100 and LAH-101, respectively. Likewise, level switches low LSL-100 and LSL-101 are connected to level alarms low LAL-100 and LAL-101, respectively. Level switches indicate when the tank is too full or too low.

The level in each of the feed/blend tanks T-100 and T-101 is monitored by a pressure indicating transmitter PIT-103 and PIT-107 (respectively), each connected to a diaphragm. PIT-103 is connected to level switch indicator LSI-103, level switch high LSH-103, and level indicating controller LIC-103. LIC-103 is further connected to the first feed/blend pump P-150 controls. PIT-107 is connected to level indicator LI-107.

Downstream of the magnetic flow meter pH and turbidity are monitored by analyzer sensor AE-100, conductivity sensor CE-100, and analyzer sensor AE-101. Analyzer sensor AE-100 and conductivity sensor CE-100 are connected to conductivity transmitter CT-100 which is connected to analyzer indicator AI-100, temperature indicator TI-100, and conductivity indicator CI-100. Analyzer sensor AE-101 is connected to analyzer transmitter AT-101 which is connected to analyzer indicator AI-101.

FIG. 21 is a diagram depicting instrumentation of an example embodiment Solids Removal Filter skid 120. Conductivity is monitored before and after the filters with conductivity sensor CE-200 and conductivity transmitter CT-200 before the filters and conductivity sensor CE-201 after the filters. Conductivity sensor CE-200 and conductivity transmitter CT-200 are connected to conductivity indicator CI-200 and temperature indicator TI-200. Conductivity sensor CE-201 is connected to conductivity transmitter CT-200 which is connected to conductivity indicator CI-201 and temperature indicator TI-201. A leak detection transmitter LDT-202 is located on the gas purge line. When a leak is detected a local light is activated to indicate the leak. Turbidity is monitored at the second end of the skid. Analyzer sensor AE-200 is connected analyzer transmitter AT-200 which is connected analyzer indicator AI-200.

FIG. 22 is a diagram depicting instrumentation of an example embodiment Ultra Filter skid 110. Conductivity is monitored before and after the filters with conductivity sensor CE-300 and conductivity transmitter CT-300 before the filters and conductivity sensor CE-301 and conductivity transmitter CT-301 after the filters. Conductivity sensor CE-300 and conductivity transmitter CT-300 are connected to conductivity indicator CI-300 and temperature indicator TI-300. Conductivity sensor CE-301 and conductivity transmitter CT-301 after the filters are connected to conductivity indicator CI-301 and temperature indicator TI-301. A leak detection transmitter LDT-302 is located on the gas purge line. When a leak is detected a local light is activated to indicate the leak.

Figure 24:
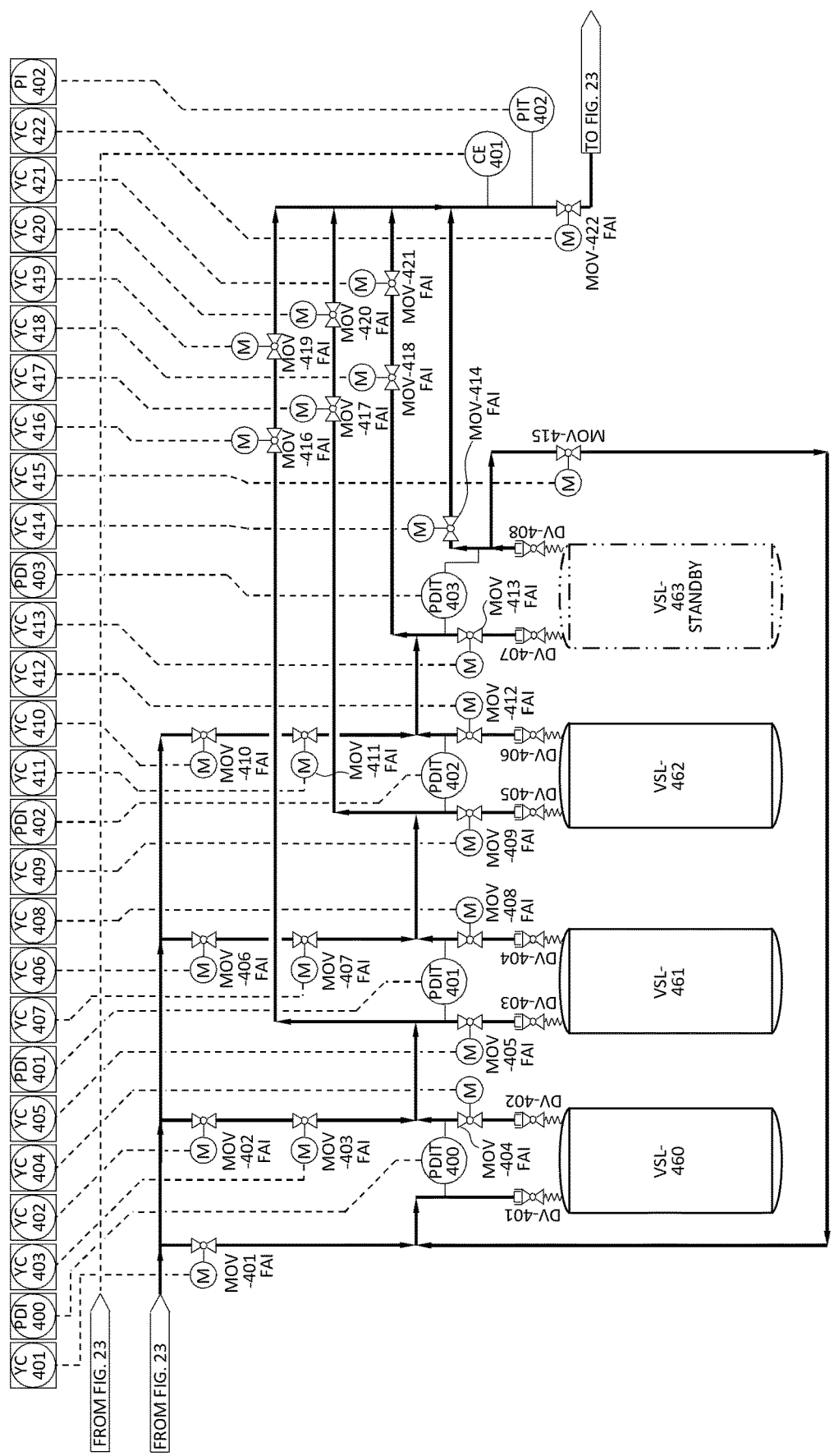
FIG. 24 is a diagram depicting instrumentation of the Ion Specific Media vessel portion of the example embodiment Ion Specific Media skid of FIG. 23.

FIGS. 23 and 24 are diagrams depicting instrumentation of an example embodiment Ion Specific Media skid 100. Just after the motor-operated ball valve MOV-400 a conductivity sensor CE-400 is connected to a conductivity transmitter CT-400 which is then connected to a conductivity indicator CI-400 and a temperature indicator TI-400. Additionally, the conductivity transmitter CT-400 is connected to a conductivity sensor CE-401 in the ISM vessel system and transmits the conductivity data to a conductivity indicator CI-401 and a temperature indicator TI-401.

Startup/Nominal Values

In an embodiment of a startup procedure, the piping system will be filled and vented by clean water injected through the flush connections. RO reject feed flow is started with second feed/blend pump P-152 and the powdered sorbent or ion exchange material feed is initiated. The first feed/blend tank T-100 is allowed to fill to its normal operating level. When the tank reaches the high level, the downstream pumps P-152, P-350, and P-450 are started in sequence. Second feed/blend pump P-152 is started initially with a permissive from a second feed/blend tank T-101 level set point and positive pressure at its suction. Ultra filter pump P-350 will then start when its suction pressure reaches a positive value through a permissive on its suction side pressure transmitter. ISM feed pump P-450 will then start when its suction pressure reaches a positive value through a permissive on its suction side pressure transmitter. Variable speed drives will be set for slow pump ramp up to a fixed speed. Once all pumps are up to speed, the system is transferred to automatic control and the normal operation sequence described above takes over.

Optimal System Operation

With consideration now for the projected number of filters and ISM vessels to be generated in the spent SRF, UF, and ISM vessels. The number of SRFs generated is related to how much powdered sorbent or ion exchange material is used. The baseline operation is to use 400 kg sorbent per 1,000 $m^3$ of water with the expectation of generating five spent SRFs per 5,000 $m^3$ of water. The sorbent usage could be as low 100 kg per 1,000 $m^3$, in which case there would be one or two spent SRFs. The UF loads only with the colloidal material that passes through the SRF. The expectation is that one spent UF is generated per 5,000 $m^3$ of water. ISM vessels are expected to be spent after five days of operation, thus generating 3.33 spent ISM vessels per 5,000 $m^3$ of water.

The MPS has been optimally designed to operate at an operational flow rate of 300 $m^3$/day (55 gpm) (flow rate when system is operating, excludes downtime for filter and media changes, for reconfiguration or repositioning, for scheduled and unscheduled maintenance, etc.) with a strontium decontamination factor (DF) of greater than 10. The optimized goal is a DF of 1,000 which will be achieved under a continuous improvement program following further operation, assessment, and adjustment.

The process system is designed for ease of transfer to from one site to another with flexibility for operating in different modes of filtration and ion removal. Top level process requirements for the inlet water specifications are assumed as shown in Table 2.

Top level process requirements for the inlet water specifications are assumed as shown in Table 2.

TABLE 2

Equipment Inlet Water Specifications

| | Unit | Range |
|---|---|---|
| pH | | 6.6 to 7.1 |
| Conductivity | μS/cm | ≤12,000 |
| Total Na | mg/L | ≤4,600 |
| Total Mg | mg/L | ≤400 |
| Total Ca | mg/L | ≤350 |
| Total Sr | mg/L | ≤2.3 |
| Total Cl | mg/L | ≤6,000 |
| Total $SO_4$ | mg/L | ≤570 |
| Suspended Solids (SS) | mg/L | ≤20 |
| Total Organic Carbon (TOC) | mg/L | ≤10 |
| Biochemical Oxygen Demand (BOD) | mg/L | <1 |
| Sr-90 | Bq/cc | 5E+4 to 4E+5 |
| Total β | Bq/cc | <8E+5 |
| Total γ | Bq/cc | <300 |
| SS Particle Size Distribution | | |
| >1 μm | wt % | >13 |
| 1 μm to 0.01 μm | wt % | >59 |
| <0.01 μm | wt % | <1 |
| Sr Activity Distribution | | |
| Ionic | % | 4 to 8 |
| Particles (>1 μm) | % | 13 to 37 |
| Particles (<1 μm) | % | 59 to 79 |

In an embodiment, the Control/Solids Feed skid 140 (FIGS. 7 and 19) is used to control the feed rate of sorbent to the Feed/Blend skid (FIGS. 8 and 20). The Feed/Blend skid 130 (FIGS. 8 and 20) accepts water from the site at a flow rate of 300 m³ per day (55 gpm). This rate accommodates the addition of chemicals in powder form over a range of 100 to 800 kg powder to 1000 m³ of water with chemical contact time of 40 minutes providing a continuous flow to the Solids Removal Filter skid 120 (FIGS. 9 and 21).

In an embodiment, the Solids Removal Filter skid 120 (FIGS. 9 and 21) accepts water from the Feed/Blend skid (FIGS. 8 and 20) to remove the powdered sorbent or ion exchange material solids and provides filtered water to the Ultra Filter skid 110 (FIGS. 10 and 22) achieving an absolute filtration of 2.0 μm (0.8 μm nominal).

In an embodiment, the Ultra Filter skid 110 (FIGS. 10 and 22) accepts water from the Solids Removal Filter skid 120 (FIGS. 9 and 21) for the removal of colloidal solids for providing filtered water to the Ion Specific Media skid 100 (FIGS. 11-12 and 23-24) with a capability of absolute filtration of 10,000 Dalton (Da). The Ion Specific Media skid 100 (FIGS. 11-12 and 23-24) accepts water from the Ultra Filter skid 110 (FIGS. 10 and 22) and is designed to provide a shielded ion-exchange process through a strontium specific granular media, and delivering processed water back to RO reject storage tanks at the rate of 300 m³/day.

Water Remediation

Reverse osmosis (RO) is a water purification technology that uses a semipermeable membrane to remove larger particles from drinking water. In reverse osmosis, an applied pressure is used to overcome osmotic pressure. Reverse osmosis can remove many types of molecules and ions from solutions, including bacteria, and is used in both industrial processes and the production of potable water. The result is that the solute is retained on the pressurized side of the membrane and the pure solvent is allowed to pass to the other side. Reverse osmosis is most commonly known for its use in drinking water purification from seawater, removing the salt and other effluent materials from the water molecules. Reverse Osmosis is well-known in the art of water remediation, both as an overall process and a highly mobile one. Thus, it is clear that the RO process could be included as a skid within the mobile processing system.

Another remediation process is isotope separation via helical screw conveyer. The helical screw ion exchange (HSIX) system transports media in either a parallel flow or counter-flow configurations wherein the contaminated water is mixed with ion exchange media to facilitate transfer of contaminants from the contaminated water yielding clean water and a contaminant laden slurry to be processed for further disposition. The HSIX system is detailed in application No. 62/152,521, filed Apr. 24, 2015, entitled HELICAL SCREW ION EXCHANGE AND DESSICATION UNIT FOR NUCLEAR WATER TREATMENT SYSTEMS, which is herein incorporated by reference in its entirety. The HSIX system may be used in place of, or in combination with, the ISM module, and may be contained in a skid for mobile, modular, and scalable operation similar to other skid system components as previously discussed in the disclosure.

Figure 25:
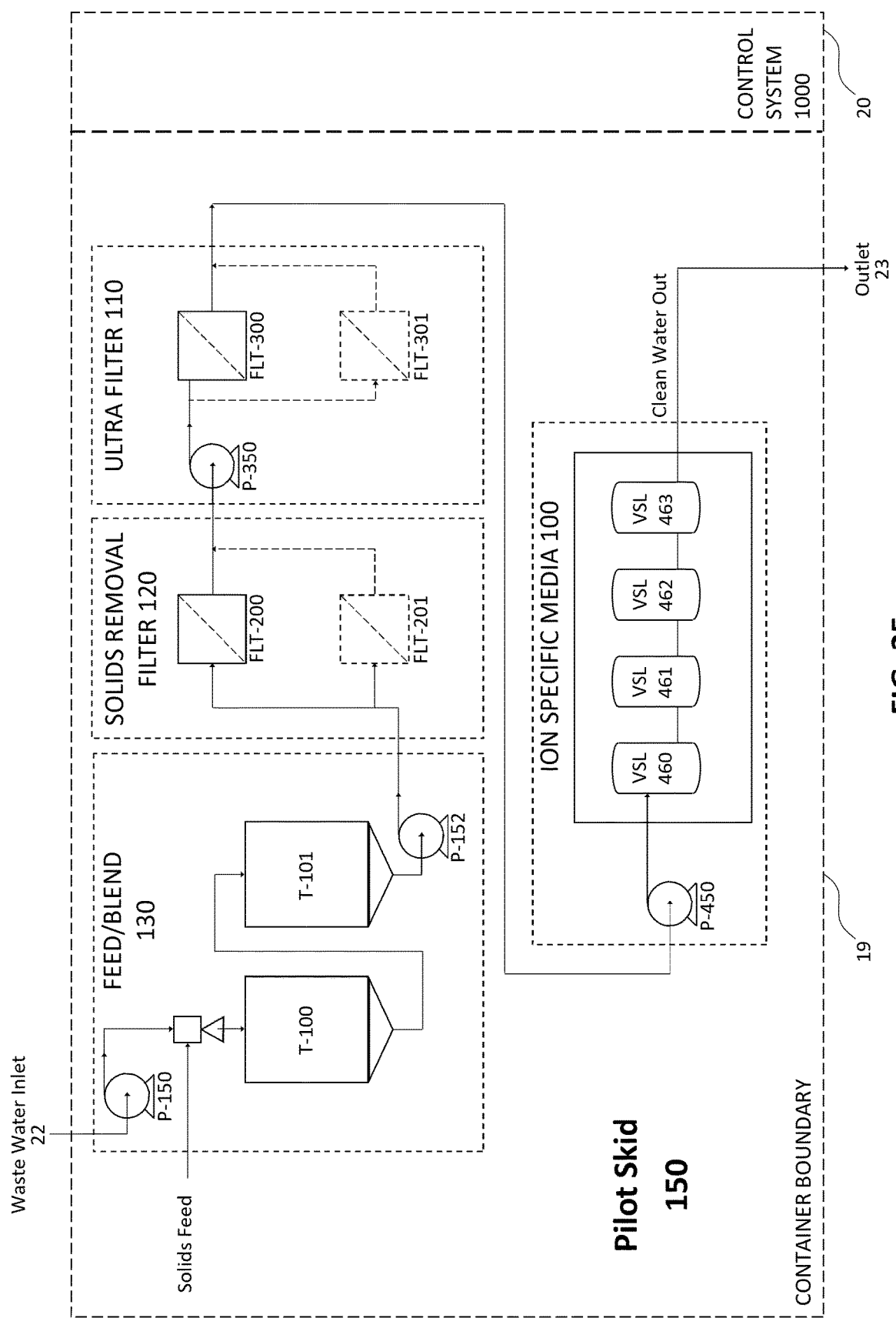
FIG. 25 represents an embodiment of the Pilot skid as a smaller scale complete system.
Figure 26C:
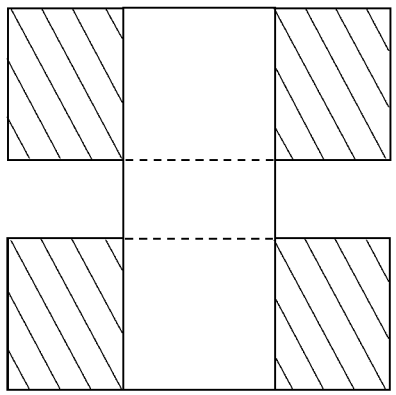
FIG. 26C depicts a top view of a possible stacking configuration using three skids.
Figure 26B:
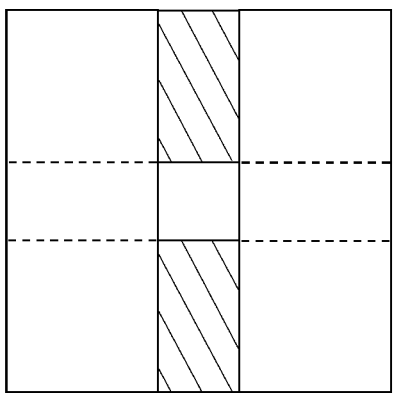
FIG. 26B depicts a top view of a possible stacking configuration using four skids.
Figure 26D:
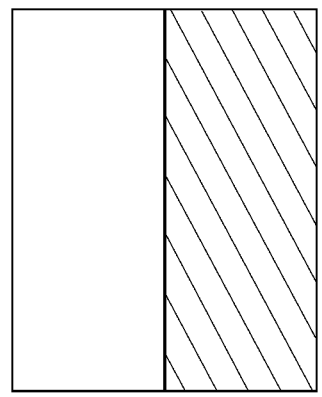
FIG. 26D depicts a side view of a possible stacking configuration using two skids stacked end-to-end.
Figure 26A:
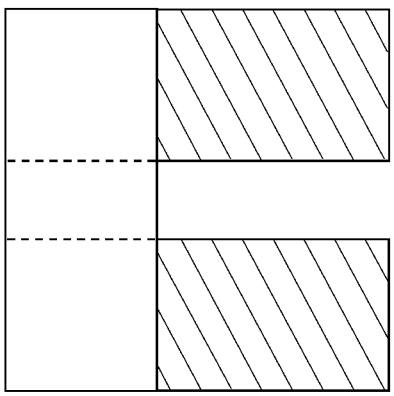
FIG. 26A depicts a top view of a possible stacking configuration using three skids.

FIG. 25 represents an embodiment of the Pilot skid 150 as a smaller scale complete system housing the functionalities as previously described for the Feed/Blend 130, Solids Removal Filter 120, Ultra Filter 110, and ISM 100 skids in a single container. The modules shown in the Pilot skid 150 are the same as depicted in FIG. 3. The container includes a main enclosure 19 and a secondary enclosure 20 housing a control system 1000. The Pilot skid 150 includes a waste water inlet 22 and a clean water outlet 23.

The following is a detail system description of a Pilot skid embodiment comprising:

A Feed Preparation and Blending to prepare waste feed for downstream operations, where the downstream operations include the steps of:
  Adding powdered sorbent or ion exchange material to accurately dose waste water,
  Mixing waste water and powder in batches up to 500 liters,
  Sampling waste water before and after powder addition and mixing, and
  Delivering feed to downstream processes at a nominal feed rate of 7.5 liters per minute.
A First Stage Filtering
  Absolute filtration of 2.0 μm (0.8 μm nominal) shall be achieved
  Simulate the production scale Solids Retention Filter (SRF)
A Second Stage Filtering
  Absolute filtration of 10,000 Dalton (Da) can be achieved
  Simulate the production scale Ultra-Filter (UF)
An ISM
  Removal of dissolved strontium
  Simulation of a production scale ISM
A control system for operation of skid equipment
Piping, pumps, valves, and instrumentation required to support pilot operations
HVAC to provide a suitable environment for equipment and personnel
Shielding to support operator involvement for routine operations such as setting valve line ups
Small footprint and portability
Seismic resistance consistent with the full scale MPS system The Pilot embodiment utilizes a site interface power is 460 V, 3 phase, 50 Hz that is provided to a location near the MPS. Non-potable clean water is provided to the MPS site via hoses for system flushing. Alternatively, clean water output from the system may be rerouted back through for routine flushing of the system. The flush volume will be approximately 1900 L (500 gallons). Mobile cranes will be used in routine production operations to remove and replace filters and ISMs. Process equipment and piping can be arranged to mitigate risk of damage due to incidental contact during these operations and guard rails and/or structures shall be provided if indicated.

The clean water exiting the MPS is sampled at various points throughout the separate modules to ensure that it meets environmental and health standards at the final outlet. Water may be sampled by at least one of manually and automatically. In some embodiments, the clean water is stored in storage tanks on site to await further disposition. In some embodiments the clean water is rerouted back through the system for system flushing operations.

The Mobile Processing System (MPS) design incorporates applicable codes and standards for the real-time processing of radioactive waste. Considerations for the systems design and equipment will meet or exceed:
- "JSME Nuclear Power Plant Design Standard Design and Construction Standard" (2005 or later),
- "JSME Nuclear Power Plant Design Standard Weld Standard" (2005 or later), and
- "JAEG Nuclear Power Plant Seismic Resistance Inspection Guideline."

Additional documentation will need to be developed including:
- "Implementation Plan Application of Special Nuclear Power Plant Facility",
- "Pre Use Inspection" and
- "Weld Inspection"

TABLE 3

Common Equipment Specifications

| Equipment | Wall Thickness | Operating Pressure | Pressure Rating (at 93.3 C. (200 F.) or less) | Materials |
|---|---|---|---|---|
| Piping, DN100 (4 in) | 6.02 mm (0.237 in, Sch 40S) | <1.34 MPa (195 psig) | 8.96 MPa (1300 psig) | 316L SST |
| Piping, DN 50 (2 in) | 3.91 mm (0.154 in, Sch 40S) | <1.34 MPa (195 psig) | 11.0 MPa (1600 psig) | 316L SST |
| Piping, DN 50 (1 in) | 3.38 mm (0.133 in, Sch 40S) | <1.34 MPa (195 psig) | 19.3 MPa (2800 psig) | 316L SST |
| Piping, DN 20 (¾ in) | 2.87 mm (0.113 in, Sch 40S) | <1.34 MPa (195 psig) | 24.1 MPa (3500 psig) | 316L SST |
| Tubing, 19 mm (¾ in) | 1.24 mm (0.049 in) | <1.34 MPa (195 psig) | 11.0 MPa (1600 psig) | 316L SST |
| Tubing, 13 mm (½ in) | 0.89 mm (0.035 in) | <1.34 MPa (195 psig) | 12.4 MPa (1800 psig) | 316L SST |
| Pipe Flanges | Varies | <1.34 MPa (195 psig) | 1.34 MPa (195 psig) | 316L SST |
| Pumps | Varies | <1.34 MPa (195 psig) | 2.50 MPa (363 psig) | Housing: CF8M SST Impeller: 316 SST |
| Feed/Blend Tanks | Upper Shell: 7.94 mm (5/16 in) Lower Shell: 7.94 mm (5/16 in) Top Head: 51 mm (2 in) Bottom Head: 6.35 mm (¼ in) | <1.34 MPa (195 psig) | −0.072 MPa to 0.128 MPa (−10.4 psig to 18.5 psig) | 316L SST |
| Solids Removal Filters | Top Head: 4.76 mm (3/16 in) Shell: 6.35 mm (¼ in) Bottom Head: 4.76 mm (3/16 in) | <1.34 MPa (195 psig) | 0.52 MPa (75 psig) | 316L SST |
| Ultra Filters | Top Head: 4.76 mm (3/16 in) Shell: 6.35 mm (¼ in) Bottom Head: 4.76 mm (3/16 in) | <1.34 MPa (195 psig) | 2.07 MPa (300 psig) | 316L SST |
| Ion Specific Media Vessels | Top Head: 44.5 mm (1¾ in) Shell: 9.53 in (⅜ in) Bottom Head: 44.5 mm (1¾ in) | <1.34 MPa (195 psig) | 0.97 MPa (140 psig) | 316L SST |
| fproject | Varies | <1.34 MPa (195 psig) | Flowtek: 1.72 MPa (250 psig) Swagelok: 10.3 MPa (1500 psig) | CF8M SST/UHMWPE |
| Pressure Relief Valves | Varies | <1.34 MPa (195 psig) | 1.34 MPa (195 psig) | CF3M SST |
| Hoses | 10.9 mm (0.43 in) | <1.34 MPa (195 psig) | 1.72 MPa (250 psig) | Tube: Black Nitrile synthetic rubber (Class A oil resistance) Cover: Black Chemivic™ synthetic |

TABLE 3-continued

Common Equipment Specifications

| Equipment | Wall Thickness | Operating Pressure | Pressure Rating (at 93.3 C. (200 F.) or less) | Materials |
|---|---|---|---|---|
| | | | | (corrugated) (vinyl reinforced nitrile) Reinforcement: Spiral-plied synthetic fabric with wire helix |

With a discussion now on materials selection and corrosion resistance, dual certified 316/316L stainless steel was selected for tanks and 316L for piping that will provide containment of tank water being processed. The quick letter water chemistry specification was used to evaluate anticipated bounding levels of chloride, conductivity and ionic content in tank water. 316L was selected because it is rated for use in this environment and is readily available. To further reduce the risk of corrosion the material will be passivated with nitric acid prior to delivery. Pipe spools will have welds cleaned and then the entire pipe spool will be passivated again after fabrication. Tank welds will be individually cleaned and passivated after fabrication.

Pumps will be made from 316L with impellers having a smooth finish that will reduce corrosion. Valve bodies will be composed of CF8M steel that is rated for seawater use. Kamvelok connectors will be composed of CF3M steel that is rated for seawater use.

304L stainless steel will be used for drip pans and structural steel that will not contact tank water. This material provides general environmental corrosion resistance, is readily available and has lower cost than 316/316L.

Considerations for radiation resistance have been incorporated by selecting polymer materials for use in the MPS, these are shown below with published radiation damage thresholds identified. Soft seats are preferred in valves to ensure leak tightness. Hoses were selected for pressure rating, bend radius, weight, and ease of handling. These properties are important to the process, but radiation resistance was emphasized in material selection. Fluoroelastomers (e.g., PTFE, Teflon) are common valve seat materials but were avoided due to their recognized low tolerance to radiation exposure.

TABLE 4

Radiation Resistance of Materials

| Material | Use in MPS | Approximate Damage Threshold (Gy) |
|---|---|---|
| UHMWPE | Ball valves | $1 \times 10^4$ to $5 \times 10^5$ |
| EPDM | Kamvaloks, check valves, surge suppressors | $5 \times 10^5$ to $1 \times 10^6$ |
| EPR | Pressure relief valves | $5 \times 10^5$ to $1 \times 10^6$ |
| Nitrile Rubber | Hoses | $1 \times 10^6$ |

Further, structural strength and seismic safety are included in Tables 5, 6, and 7 below.

TABLE 5

Structural Strength Results of the MPS Vessels

| Equipment Name | Assessed Part | Maximum Internal Working Pressure (MPa) | Required Thickness for Internal Pressure [mm] | Maximum External Working Pressure (MPa) | Required Thickness for External Pressure (mm) | Actual Thickness [mm] |
|---|---|---|---|---|---|---|
| ISM Vessel | Plate thickness | 0.986 | 5.3 | Does not apply to this vessel | | 9.5 |
| Feed/Blend Vessel | Plate Thickness | 0.128 | 2.9 | 0.072 | 3.8 | 7.9 |
| | | | 3.1 | | 3.8 | 7.9 |
| | | | 2.0 | | 3.0 | 7.9 |

TABLE 6

MPS's Seismic Safety Assessment Results

| Equipment Name | Assessed Part | Assessment item | Horizontal Seismic Coefficient | Calculated Value | Allowable Value | Unit |
|---|---|---|---|---|---|---|
| Feed Blend Skid | Main body | Overturn | 0.36 | 290 | 341 | kN · m |
| UF Skid | | | | 355 | 454 | |
| SRF Skid | | | | 355 | 454 | |
| ISM Skid Control and Solids Feed Skid | | | | 288 | 398 | |

TABLE 7

Results of the Pipes' Structural Strength Assessment

| Assessed Part | Diameter | Sch. | Material | Maximum Working Pressure (MPa) | Maximum Working Temperature (C.) | Required Thickness (mm) | Actual Thickness (mm) |
|---|---|---|---|---|---|---|---|
| Pipe (1) | 2" | 40S | JIS G 3459 316LTP | 1.03 | 66 | 0.5 | 3.9 |
| Pipe (2) | 4" | 40S | JIS G 3459 316LTP | 1.03 | 66 | 0.8 | 6.0 |

Since radiation protection is of paramount importance, filters and ISM vessels that accumulate radioactive material are enclosed in shielding. The SRF and UF filters are enclosed in 51 mm of shielding carbon steel and the ISM vessels have 25 mm of carbon steel shielding. Dose rate calculations have been performed and the goal is to limit on-contact dose rates to 5 mSv/hr. Dose calculations were based on a source term two standard deviations above the average source term from characterization data and fully loaded filter cartridges. Calculated dose rates are shown in the table below. Each vessel will have a radiation monitoring probe and operating areas will have general area radiation monitors. Radiation detection will be monitored at both the local control skid and remote monitoring station.

TABLE 8

Radiation Shielding Specifications

| | Shielding Thickness | Contact Dose Rate |
|---|---|---|
| Feed/Blend Tank | 0 mm (0 in) | 0.24 mSv/hr |
| Solids Removal Filter | 51 mm (2 in) | 1.4 mSv/hr |
| Ultra Filter | 51 mm (2 in) | 4.8 mSv/hr |
| ISM Vessels | 25 mm (1 in) | 0.59 mSv/hr |

Temperature control for spent SRFs, UFs, and ISM vessels caused by self-heating due to captured Sr-90 along with the result of MPS operation have been considered. The self-heating from the Sr-90 collected in an SRF filter (21.5 watts), the Ultra Filter (249.4 watts), and the ISM vessel (1.3 watts) has been evaluated. When ambient temperature is 40° C., the following results are obtained for the temperature of shielding exposed to ambient air, and for the internal filter canisters in wet and dry storage, and for ISM vessels in dry storage:

Solids Removal Filter
  Shielding temperature exposed to ambient conditions 41.75° C.
  Canister centerline temperature dry storage not more than 63.8° C.
  Canister centerline temperature wet storage not more than 47.3° C.
Ultra Filter
  Shielding temperature exposed to ambient conditions 52.4° C.
  Canister centerline temperature dry storage not more than 106.3° C.
  Canister centerline temperature wet storage not more than 87.4° C.
ISM
  Shielding temperature exposed to ambient conditions 40.22° C.
  ISM bed centerline temperature not more than 43° C.

When spent filters and ISM vessels are stored in the sun, there is potential for additional heating of external surfaces due to solar radiation. Heating by solar radiation was not included in the above calculations. The precise amount of heating from solar radiation is difficult to assess because it is highly dependent on weather conditions. When incident solar radiation is 700 watts per $m^2$, and there is a moderate wind of 5 m/s, plate metal can heat to 19° C. above ambient temperature. When the wind is 1 m/s, plate metal may heat to 37° C. above ambient air temperature. Similar increases in canister centerline temperature can be expected since the internal heating must now dissipate through the shielding that is solar heated as well as being heated from inside. These temperatures will not compromise the containment boundary provided by the filter canisters or the ISM vessel. The heat from all the Sr-90 stored in the process when water is flowing at 208 L/min will raise the temperature of the water by 0.019° C. When flow is interrupted, the UF canisters heat at 13° C./day and SRF canisters heat at a rate of 0.89° C./day.

Leak Prevention/Environmental Considerations/Safety

The system is designed so as to prevent leaks, damage to the environment, and injury to on-site operators.

In an embodiment, the system design includes a local control room and communication for remote operations during normal run time and interconnections between MPS units that are integrated into the control system allowing all system operations to be performed by the central control station. Further this allows immediate response to conditions with pump shutdown or failure guaranteeing unit isolation as needed to satisfy leak and radiological protection requirements.

Additional considerations for the pilot embodiment can be made to reduce the radioactive operator dose by installing shield, maintenance frequency reduction, radiation monitoring, and installation of the remote operation.

The design prevents the radioactive material from leaking to the environment; however, should any radioactive material be released from the train, the dam installation, leak detector installation, and piping installed outside the building, etc. has been designed to prevent any leaked radioactive material from defusing, to include leak protection of the joints etc. All process lines between skids consist of hoses with secondary containment for the prevention of spills to the environment. All filter vessels are provided with adequate shielding.

Check valves are used through the system to prevent flow from flowing backwards. Many of the valves are motor operated to allow for quick shutoff or open as necessary to prevent leaks or reduce pressure. All pressure gauges in the system display locally and most display in the control room as well for careful monitoring of system pressure. Pressure relief valves are located in each skid to automatically release pressure when the system pressure exceeds a predetermined value. The motor operated valves are designed to fail as-is, open, or closed depending on their location in the system to minimize damage and environmental hazards in the event of failure. Redundant valves are used throughout the system to provide additional control and increase the factor of safety of the system, again reducing the possibility of leakage to the environment in the event of a failure. Instrument interlocks are used to prevent operators and/or machinery from being harmed in the event of a leak or other failure.

In an embodiment, process equipment and piping can be arranged to mitigate risk of damage due to incidental contact during these operations and guard rails and/or structures shall be provided if indicated. Additionally, seismic resistance is consistent with the full scale MPS system.

Further, the design prevents the retention of flammable gas if such retention is a matter of concern. Hydrogen control is a concern from an explosion hazard; therefore a hydrogen venting capability is provided. The approach to controlling hydrogen in the MPS is based on dilution to prevent a hydrogen concentration in air from exceeding a lower flammability limit (LFL). When connected to the process system the filters will have vent line with inert gas purge capability to safely vent hydrogen out of the ISO container. For filters in storage calculations and testing of filter characteristics needed to demonstrate that passive venting of the filters will effectively control hydrogen have not been completed. Active venting by forced air circulation similar to the vacuum pumping initially used on the cesium ISM vessels may be required until effectiveness of passive venting is demonstrated.

In an embodiment, the instrumentation and control systems are designed to provide for fully automatic normal operations of the system through the use of fully redundant fault tolerant programmable logic controllers (PLC); any off-normal operations are not automatically controlled, however the system implements a "graceful" shut down with provision for manual intervention at any point in the process cycle. The system design includes a local control room and communication for remote operations during normal run time and interconnections between MPS units that are integrated into the control system allowing all system operations to be performed by the central control station. Further this allows immediate response to conditions with pump shutdown or failure guaranteeing unit isolation as needed to satisfy leak and radiological protection requirements.

Stacking

In some embodiments skids may be stacked on top of other skids to reduce system footprint. The depicted configurations, FIGS. 26A-26D are example embodiments using twenty foot standard intermodal shipping containers. Hatching within the depicted figures indicates containers that are in contact with the ground. Example stacking embodiments as shown depict containers stacked two-high. Additional stacking configurations, not shown, are possible, including stacking of three or more skids high. Other skid sizes may be used. Additionally, configurations involving two or more differently sized skids are possible, for instance: a forty foot intermodal container stacked on top of two twenty foot intermodal containers. In some embodiments, additional structural supports, coupling mechanisms, and/or access points are included in anticipation of various stacking configurations.

Elevated access platforms may be installed to allow disconnect of filters and ISM vessels for replacements, hydrogen venting, sampling, access to the control room, and placement of interconnecting hoses. Crane access may be required for routine operational replacement of solids removal filters, ultra filters, and ISM vessels. Alternatively, openings in the sidewalls, roofs, and/or floors of the skids, with or without doors, may be provided to afford access to filters and ISM vessels for the purpose of routine operational replacement.

Figures 27A, 27B:
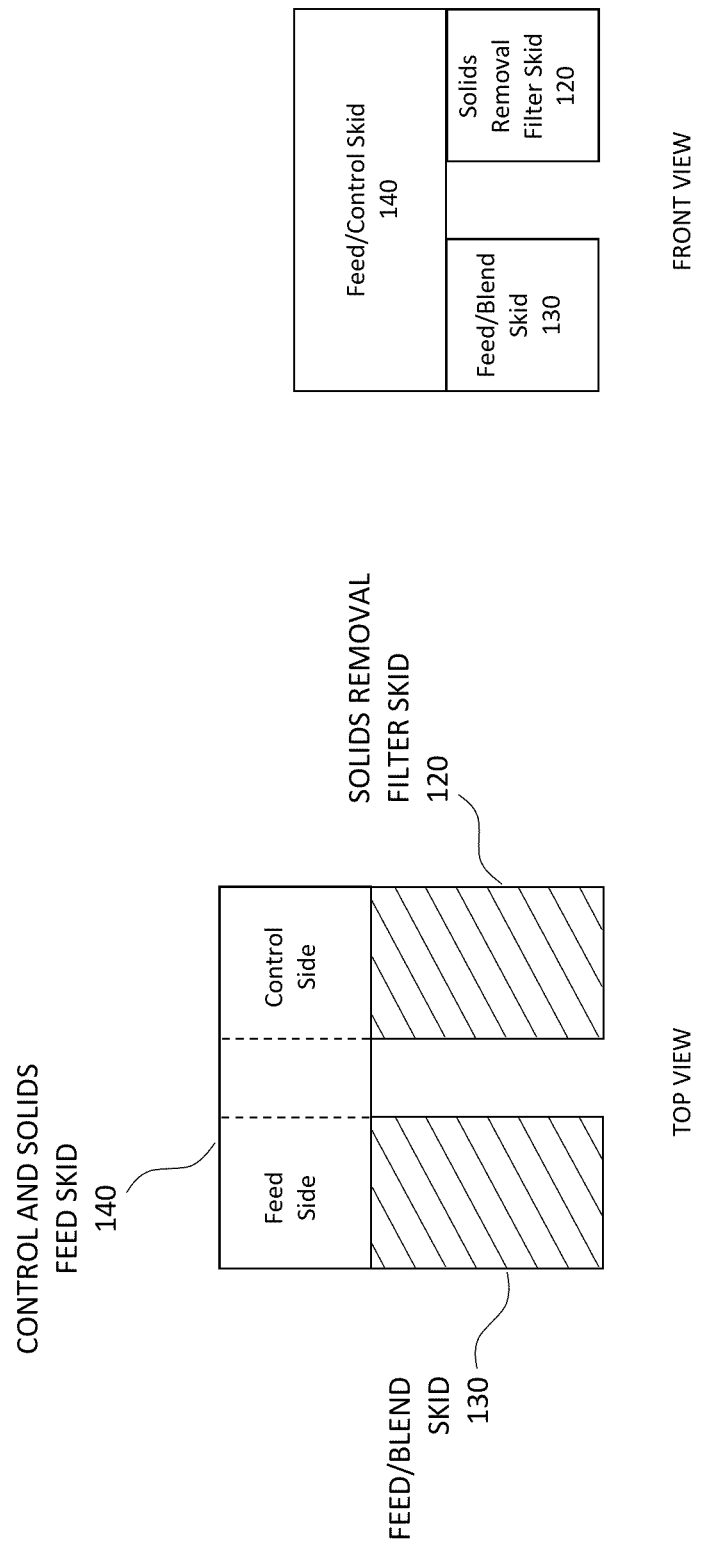
FIG. 27A depicts a top view of an example skid stacking configuration according to FIG. 26A.
FIG. 27B depicts a front view of the configuration of FIG. 27A.

FIG. 27 depicts an example embodiment wherein a Control and Solids Feed skid 140 is stacked on top of a Feed/Blend skid 130 and a Solids Removal Filter skid 120. In the depicted embodiment, the feed side of the Control and Solids Feed skid 140 may be situated atop the Feed/Blend skid 130 wherein the solids may be fed via gravity through the floor of the Control and Solids Feed skid 140 directly into the Feed/Blend skid 130. The control side of the Control and Solids Feed skid 140 may be situated above the Solids Removal Filter skid 120. The Solids Removal Filter skid 120 may be situated so as to allow easy access to the filters from the top of the skid. The control room may be accessible to personnel by ladder or stairs (not shown).

ADDITIONAL EMBODIMENTS

Figure 28:
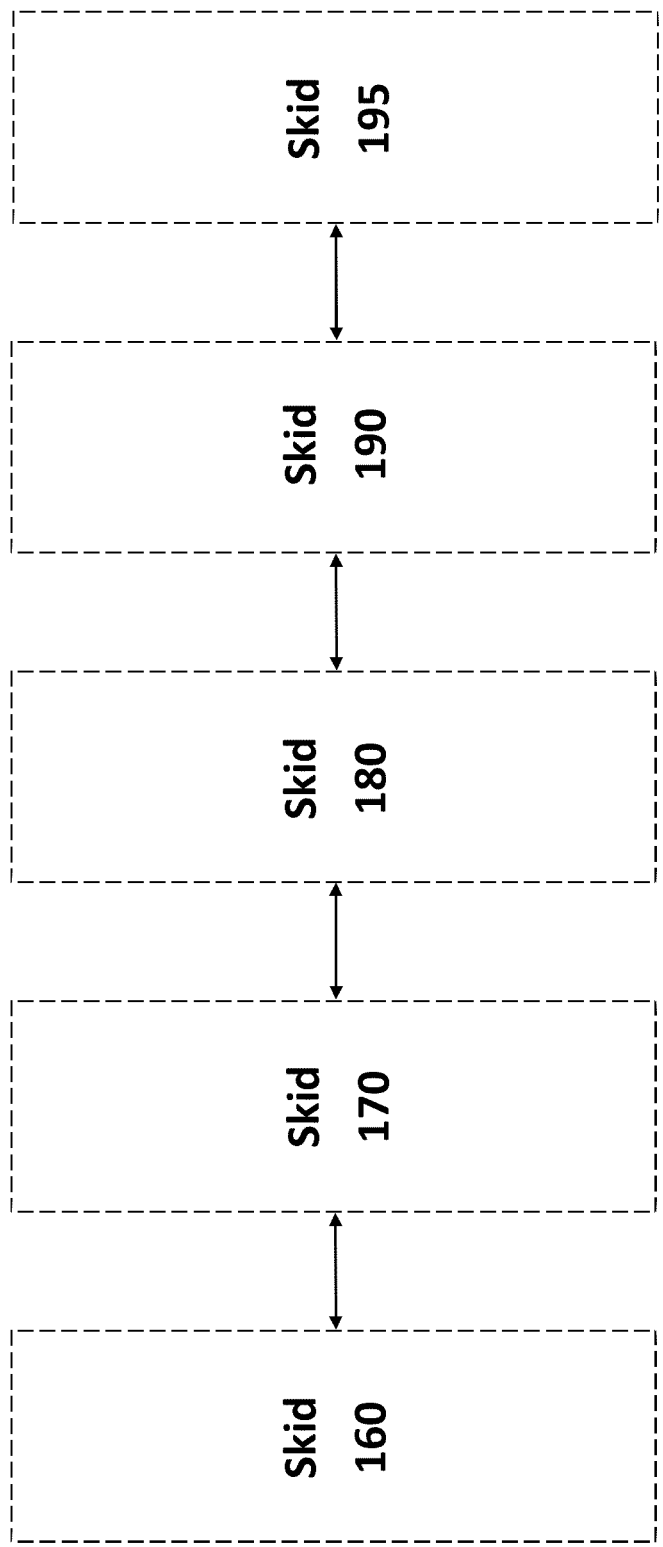
FIG. 28 depicts another embodiment of a mobile processing system.

FIG. 28 shows a skid 160 (first container), a skid 170 (second container), a skid 180 (third container), a skid 190 (fourth container), and a skid 195 (fifth container), which are operably connected together. The skids 160, 170, 180, 190, 195 can include various different modules that perform different forms of waste water remediation. For example, each of the skids 160, 170, 180, 190, 195 can include any one of the Control module, the Solids Feed module, the Feed/Blend module, the Solids Removal Filter module, the Ultra Filter module, and/or Ion Specific Media (ISM) 100 module. The modules can be connected together in parallel and/or in series in order to perform all of the remediation requirements for any given site.

P1. A mobile nuclear waste processing system, the system comprising: a first intermodal shipping container including a main enclosure, an inlet leading into the main enclosure, and an outlet leading out of the main enclosure; a solids removal module disposed within the main enclosure, the solids removal module including a filter configured to receive a flow of fluid and remove at least some solids from the fluid; a first conduit extending through the inlet of the main enclosure and configured to direct the fluid from a fluid supply tank to the solids removal module; a second conduit extending through the outlet of the main enclosure and configured to direct the fluid from the solids removal module out of the main enclosure; and a control system configured to monitor flow of the fluid through solids removal module.

P2. The mobile nuclear waste processing system of paragraph P1, wherein the control system is housed in a second intermodal shipping container.

P3. The mobile nuclear waste processing system of paragraph P1, further comprising an ion specific media module including an ion specific media vessel, the ion specific media module positioned downstream of the solids removal module and configured to receive fluid from the solids removal module.

P4. The mobile nuclear waste processing system of paragraph P3, wherein the ion specific media module is housed in a second intermodal shipping container, and wherein the second conduit extends out of the first intermodal shipping container to direct fluid outside of the first intermodal shipping container and into the second intermodal shipping container.

P5. The mobile nuclear waste processing system of paragraph P3, wherein the first intermodal shipping container includes a secondary enclosure, and wherein the ion specific media module is housed in the second enclosure.

P6. The mobile nuclear waste processing system of paragraph P1, further comprising a feed blend module positioned upstream of the solids removal module, the feed blend module including a feed blend tank configured to receive the fluid and at least one of powdered sorbent and an ion exchange material capable of sorbing at least some contaminants from the fluid.

P7. The mobile nuclear waste processing system of paragraph P6, wherein the feed blend module is housed in a second intermodal shipping container, and wherein the second conduit extends out of the first intermodal shipping container to direct fluid outside of the first intermodal shipping container and into the second intermodal shipping container.

P8. The mobile nuclear waste processing system of paragraph P6, wherein the first intermodal shipping container includes a secondary enclosure, and wherein the feed blend module is housed in the second enclosure.

P9. The mobile nuclear waste processing system of paragraph P1, further comprising a second intermodal shipping container operatively connected to the first intermodal shipping container, the second intermodal shipping container including at least a portion of a waste water treatment system.

P10. The mobile nuclear waste processing system of paragraph P1, wherein the first intermodal shipping container further includes a pump configured to pump the fluid through at least one of the first conduit and the second conduit.

P11. The mobile nuclear waste processing system of paragraph P1, wherein the first intermodal shipping container further includes at least one of a drain, piping, and a fluid control valve.

P12. The mobile nuclear waste processing system of paragraph P1, wherein the first intermodal shipping container further includes a ventilation system.

P13. The mobile nuclear waste processing system of paragraph P1, wherein the first intermodal shipping container further includes a climate control system for monitoring or regulating the climate inside of the first intermodal shipping container.

P14. The mobile nuclear waste processing system of paragraph P1, wherein the first intermodal shipping container further includes an access platform.

P15. The mobile nuclear waste processing system of paragraph P1, wherein the first intermodal shipping container further includes wheels.

P16. A mobile nuclear waste processing system for removing contaminants from a flow of fluid, the fluid including at least some solid particles, the system comprising: a first mobile container defining a first enclosure; a first filter disposed within the first enclosure of the first mobile container, the first filter configured to receive a flow of fluid and remove at least some solids from the fluid; a second mobile container defining a second enclosure; a second filter disposed within the second enclosure of the second mobile container, the second filter configured to receive the flow of fluid exiting the first filter and remove at least some solids from the fluid, the second filter providing finer filtration than the first filter; a conduit extending between the first mobile container and the second mobile container to transfer fluid from the first mobile container to the second mobile container, the conduit directing the flow of fluid exiting the first filter towards the second filter; and a control system configured to monitor flow of the fluid through the first and second filters.

P17. The mobile nuclear waste processing system of paragraph P16, wherein the first mobile container and the second mobile container are selectively disengageable from one another.

P18. The mobile nuclear waste processing system of paragraph P16, wherein at least one of the first mobile container and the second mobile container is a custom designed enclosure.

P19. The mobile nuclear waste processing system of paragraph P16, wherein at least one of the first mobile container and the second mobile container includes an integral transport power source and wheels to allow the mobile container to be self-transportable.

P20. The mobile nuclear waste processing system of paragraph P16, further comprising a third mobile container, wherein the first, second, and third mobile containers are each selectively couplable to the others of the first, second, and third mobile containers.

P21. The mobile nuclear waste processing system of paragraph P20, wherein the first, second, and third mobile containers are arrangeable into different configurations relative to one another to operate the mobile nuclear waste processing system according to different operational configurations.

P22. The mobile nuclear waste processing system of paragraph P16, further comprising a third mobile container defining a third enclosure and an ion specific media system disposed within the third enclosure, the ion specific media system including an ion specific media vessel.

P23. The mobile nuclear waste processing system of paragraph P16, further comprising a feed blend system positioned upstream of the first filter, the feed blend system including a feed blend tank configured to receive the flow of fluid and at least one of powdered sorbent and an ion exchange material capable of sorbing at least some contaminants from the fluid.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the invention as claimed.

The invention claimed is:
1. A mobile nuclear waste processing system, the system comprising:
 a first container including a main enclosure, an inlet leading into the main enclosure, and an outlet leading out of the main enclosure;
 a solids removal filter module disposed within the main enclosure, the solids removal filter module including a filter configured to receive a flow of fluid and remove at least some solids from the fluid resulting in a filtered fluid, wherein the flow of fluid contains one or more radioactive contaminants;

a first hose coupled to the inlet and configured to direct the fluid from a fluid supply tank to the first container;

an ion specific media module disposed within the main enclosure, wherein the ion specific media module is configured to receive the filtered fluid from the solids removal filter module and remove the one or more radioactive contaminants from the filtered fluid resulting in a processed fluid;

a second hose coupled to the outlet and configured to direct the processed fluid out of the first container;

a radiation sensor positioned in the first container to monitor radiation levels associated with at least one of the fluid, the filtered fluid, or the processed fluid; and an electronic controller communicatively linked to the radiation sensor and programmed to monitor radiation levels of at least one of the fluid, the filtered fluid, or the processed fluid, and wherein the electronic controller is housed in a second container.

2. The mobile nuclear waste processing system of claim 1, further comprising a feed blend module positioned upstream of the solids removal filter module, the feed blend module including a feed blend tank configured to receive the fluid and at least one of powdered sorbent or an ion exchange material capable of sorbing at least some contaminants from the fluid.

3. The mobile nuclear waste processing system of claim 1, further comprising a third container operably connected to at least one of the first container or the second container, the third container comprising at least one of powdered sorbents or ion exchange materials.

4. The mobile nuclear waste processing system of claim 3, wherein at least one of the first container or the third container further comprises one or more pumps configured to pump the fluid through the mobile nuclear waste processing system.

5. The mobile nuclear waste processing system of claim 3, wherein at least one of the first container or the third container further includes at least one of a drain, piping, or a fluid control valve.

6. The mobile nuclear waste processing system of claim 3, wherein the third container further includes a ventilation system.

7. The mobile nuclear waste processing system of claim 1, wherein the ion specific media module comprises one or more ion exchange vessels.

8. The mobile nuclear waste processing system of claim 7, wherein the ion specific media module comprises three ion exchange vessels.

9. A mobile nuclear waste processing system, the system comprising:
a first container including a main enclosure, an inlet leading into the main enclosure, and an outlet leading out of the main enclosure;
a solids removal filter module disposed within the main enclosure, the solids removal filter module including a filter configured to receive a flow of fluid and remove at least some solids from the fluid resulting in a filtered fluid, wherein the flow of fluid contains one or more radioactive contaminants;
a first hose coupled to the inlet and configured to direct the fluid from a fluid supply tank to the first container;
an ion specific media module disposed within the main enclosure, wherein the ion specific media module is configured to receive the filtered fluid from the solids removal filter module and remove the one or more radioactive contaminants from the filtered fluid resulting a processed fluid;
a second hose coupled to the outlet and configured to direct the processed fluid out of the first container;
a radiation sensor positioned in the first container to monitor radiation levels associated with at least one of the fluid, the filtered fluid, or the processed fluid;
an electronic controller communicatively linked to the radiation sensor and programmed to monitor radiation levels of at least one of the fluid, the filtered fluid, or the processed fluid, and wherein the electronic controller is housed in a second container; and
a third container operably connected to at least one of the first container or second container.

10. The mobile nuclear waste processing system of claim 9, further comprising a feed blend module positioned upstream of the solids removal filter module, the feed blend module including a feed blend tank configured to receive the fluid and at least one of powdered sorbent or an ion exchange material capable of sorbing at least some contaminants from the fluid.

11. The mobile nuclear waste processing system of claim 9, wherein at least one of the first container or the third container further comprises one or more pumps configured to pump the fluid through the mobile nuclear waste processing system.

12. The mobile nuclear waste processing system of claim 9, wherein at least one of the first container or the third container further includes at least one of a drain, piping, and a fluid control valve.

13. The mobile nuclear waste processing system of claim 9, wherein the third container further includes a ventilation system.

14. The mobile nuclear waste processing system of claim 9, wherein at least one of the first container or the third container further includes an access platform.

15. The mobile nuclear waste processing system of claim 9, wherein at least one of the first container, second container, or the third container further includes wheels.

16. The mobile nuclear waste processing system of claim 9, wherein the ion specific media module comprises one or more ion exchange vessels.

17. The mobile nuclear waste processing system of claim 16, wherein the ion specific media module comprises three ion exchange vessels.

18. The mobile nuclear waste processing system of claim 8,
wherein the first container comprises:
a floor including a sump defined by a sump boundary;
a roof;
sidewalls extending vertically between the floor and the roof, the sidewalls including doors;
wherein the first hose is a double containment hose and the second hose is a double containment hose;
wherein the solids removal filter module includes at least two filters configured to receive the flow of fluid and remove at least some solids from the fluid resulting in a filtered fluid, the at least two filters being configured to operate with one of the at least two filters online while another one of the at least two filters is on standby;
wherein the electronic controller is communicatively linked to a leak detector positioned to detect the fluid, the filtered fluid, and/or the processed fluid in the sump; and
wherein each of the three ion exchange vessels is positioned adjacent to one of the doors in the sidewalls of the first container to provide forklift access to each of the three ion exchange vessels.

19. The mobile nuclear waste processing system of claim 18, further comprising:
an access platform positioned adjacent or coupled to an exterior of the first container to provide access to the first container, the access platform being elevated relative to the floor of the first container;
wherein each of the three ion exchange vessels includes titanosilicate ion specific media configured to remove the one or more radioactive contaminants from the filtered fluid;
wherein each of the three ion exchange vessels includes shielding to reduce a radiation dose rate;
wherein the electronic controller is communicatively linked to a pressure sensor, the pressure sensor being positioned to measure a differential pressure associated with at least one of the at least two filters; and
wherein each of the at least two filters is positioned adjacent to one of the doors in the sidewalls of the first container to provide exterior access to the filter.

20. A mobile processing system for treating nuclear wastewater, the mobile processing system comprising:
a plurality of transportable containers including a first container comprising:
a floor including a sump defined by a sump boundary;
a roof;
sidewalls extending vertically between the floor and the roof, the sidewalls including doors;
an inlet process line leading to the first container, the inlet process line including a double containment hose configured to route the nuclear wastewater to the first container;
an outlet process line leading away from the first container, the outlet process line including a double containment hose configured to route the nuclear wastewater away from the first container;
solids removal filters positioned in the first container, the solids removal filters being configured to remove suspended solids from the nuclear wastewater, the solids removal filters being configured to operate with one of the solids removal filters online while another one of the solids removal filters is on standby;
ion exchange vessels positioned in the first container downstream from the solids removal filters and connected in series, the ion exchange vessels being configured to remove one or more radioactive contaminants from the nuclear wastewater; and
an electronic controller communicatively linked to a leak detector positioned to detect the nuclear wastewater in the sump;
wherein each of the ion exchange vessels is positioned adjacent to one of the doors in the sidewalls of the first container to provide forklift access to each of the ion exchange vessels.

21. The mobile processing system of claim 20, further comprising:
an access platform positioned adjacent or coupled to an exterior of the first container to provide access to the first container, the access platform being elevated relative to the floor of the first container;
wherein each of the ion exchange vessels includes titanosilicate ion specific media configured to remove the one or more radioactive contaminants from the nuclear wastewater;
wherein each of the ion exchange vessels includes shielding to reduce a radiation dose rate;
wherein the electronic controller is communicatively linked to a radiation sensor and a pressure sensor, the radiation sensor being positioned to measure radiation levels associated with the nuclear wastewater, the pressure sensor being positioned to measure a differential pressure associated with at least one of the solids removal filters;
wherein each of the solids removal filters is positioned adjacent to one of the doors in the sidewalls of the first container to provide exterior access to each of the solids removal filters; and
wherein the plurality of transportable containers includes a second container and the electronic controller is positioned in the second container.

22. The mobile processing system of claim 20, wherein the first container further comprises:
a main enclosure including at least a portion of the sump, the solids removal filters, and the ion exchange vessels; and
a secondary enclosure;
wherein the doors adjacent to the ion exchange vessels open into the main enclosure.

23. A method for processing the nuclear wastewater with the mobile processing system of claim 20, the method comprising
filtering at least some of the suspended solids from the nuclear wastewater with the solids removal filters;
removing the one or more radioactive contaminants from the nuclear wastewater with the ion exchange vessels;
determining with the electronic controller that a differential pressure associated with the solids removal filter that is online has reached or exceeded a limit;
changing the solids removal filter that is online to offline and changing the solids removal filter that is on standby to online based at least in part on the determination that the differential pressure associated with the solids removal filter that is online has reached or exceeded the limit; and
replacing at least one of the ion exchange vessels loaded with radioactive contaminants by moving it out of the door adjacent to the ion exchange vessel loaded with radioactive contaminants with a forklift and moving a new ion exchange vessel into the first container with the forklift.

* * * * *